(12) United States Patent
Parker et al.

(10) Patent No.: US 9,501,540 B2
(45) Date of Patent: Nov. 22, 2016

(54) INTERACTIVE VISUALIZATION OF BIG DATA SETS AND MODELS INCLUDING TEXTUAL DATA

(71) Applicant: BigML, Inc., Corvallis, OR (US)

(72) Inventors: Charles Parker, Corvallis, OR (US); Adam Ashenfelter, Corvallis, OR (US)

(73) Assignee: BIGML, INC., Corvallis, OR (US)

( * ) Notice: Subject to any disclaimer, the term of this patent is extended or adjusted under 35 U.S.C. 154(b) by 0 days.

(21) Appl. No.: 14/497,102

(22) Filed: Sep. 25, 2014

(65) Prior Publication Data
US 2015/0019569 A1 Jan. 15, 2015

Related U.S. Application Data

(63) Continuation-in-part of application No. 14/495,802, filed on Sep. 24, 2014, and a continuation-in-part of application No. 13/667,542, filed on Nov. 2, 2012.

(60) Provisional application No. 61/881,566, filed on Sep. 24, 2013, provisional application No. 61/555,615, filed on Nov. 4, 2011.

(51) Int. Cl.
G06F 17/30 (2006.01)
(52) U.S. Cl.
CPC .............................. *G06F 17/30572* (2013.01)
(58) Field of Classification Search
None
See application file for complete search history.

(56) References Cited

U.S. PATENT DOCUMENTS

| | | | |
|---|---|---|---|
| 6,038,561 A * | 3/2000 | Snyder | G06F 17/30011 |
| 6,278,464 B1 | 8/2001 | Kohavi et al. | |
| 6,301,579 B1 | 10/2001 | Becker | |
| 6,496,208 B1 | 12/2002 | Bernhardt et al. | |
| 6,519,599 B1 | 2/2003 | Chickering et al. | |
| 7,386,835 B1 | 6/2008 | Desai | |
| 7,735,051 B2 | 6/2010 | VanHuben | |
| 8,229,917 B1 | 7/2012 | Aneas | |
| 8,364,613 B1 | 1/2013 | Lin et al. | |
| 8,495,210 B1 | 7/2013 | Natarajan | |
| 9,098,326 B1 | 8/2015 | Martin | |
| 9,269,054 B1 | 2/2016 | Martin | |
| 2001/0054032 A1 | 12/2001 | Goldman | |
| 2004/0162814 A1 | 8/2004 | Bergholz | |
| 2005/0049986 A1 | 3/2005 | Bollacker | |
| 2005/0097070 A1 | 5/2005 | Enis | |
| 2006/0242090 A1 | 10/2006 | Matsuda | |

(Continued)

OTHER PUBLICATIONS

BigML Developers Documentation; published by BigML on Apr. 25, 2013, retrieved on Jan. 28, 2016 from the Internet Archive WayBack Machine from: https://web.archive.org/web/20130731144559/https://bigml.com/developers/.*

(Continued)

*Primary Examiner* — Alex Gofman
*Assistant Examiner* — Umar Mian
(74) *Attorney, Agent, or Firm* — Schwabe, Williamson & Wyatt P.C.

(57) ABSTRACT

Systems and processes are disclosed for advanced text analysis in the field of big data analytics and visualization: Users can now factor text into their predictive models, alongside regression, time/date and categorical information. This is ideal for building models where text content may play a prominent role (e.g., social media or customer service logs). Multiple data types, including text fields, may be combined together in datasets and models, and may be presented in various interactive visualization displays.

18 Claims, 47 Drawing Sheets

(56) References Cited

U.S. PATENT DOCUMENTS

| | | |
|---|---|---|
| 2006/0288031 A1 | 12/2006 | Lee |
| 2006/0294058 A1 | 12/2006 | Zabback et al. |
| 2007/0094060 A1 | 4/2007 | Apps |
| 2007/0179966 A1 | 8/2007 | Li |
| 2007/0208497 A1 | 9/2007 | Downs |
| 2008/0168011 A1 | 7/2008 | Steinberg |
| 2008/0307369 A1 | 12/2008 | Liu |
| 2009/0013216 A1 | 1/2009 | Abrashkevich |
| 2009/0063389 A1 | 3/2009 | Crawford |
| 2009/0064053 A1 | 3/2009 | Crawford |
| 2009/0160859 A1* | 6/2009 | Horowitz ............. G06T 11/206 345/440 |
| 2009/0178019 A1 | 7/2009 | Bahrs |
| 2009/0198725 A1 | 8/2009 | Lee |
| 2009/0276379 A1 | 11/2009 | Tzoref et al. |
| 2009/0313208 A1 | 12/2009 | Helfman |
| 2010/0313118 A1* | 12/2010 | Acquaviva ........ G06F 17/30734 715/254 |
| 2011/0184884 A1 | 7/2011 | Lyons et al. |
| 2011/0316856 A1 | 12/2011 | Poston et al. |
| 2012/0166156 A1 | 6/2012 | Meng |
| 2012/0240064 A1 | 9/2012 | Ramsay |
| 2012/0310785 A1 | 12/2012 | Poulin |
| 2013/0031041 A1 | 1/2013 | Maciejewski |
| 2013/0117280 A1 | 5/2013 | Donaldson |
| 2013/0144819 A1 | 6/2013 | Lin et al. |
| 2013/0159502 A1 | 6/2013 | Thompson |
| 2014/0195531 A1* | 7/2014 | Diament ........... G06F 17/30958 707/736 |
| 2015/0019569 A1 | 1/2015 | Parker |
| 2015/0081685 A1 | 3/2015 | Ashenfelter |

OTHER PUBLICATIONS

"Data Model"; Computer Desktop Encyclopedia; The Computer Language Company; retrieved on Jan. 29, 2015 from: http://lookup.computerlanguage.com/host_app/search?cid=C999999 &term=data+model&lookup.x=0&lookup.y=0.*

"About Tooltip Controls"; Windows Dev Center; Microsoft Corporation; published on: Sep. 25, 2011; retrieved from the Internet Archive WayBack Machine on Jul. 22, 2015 from: https://web.archive.org/web/20110925063821/http://msdn.microsoft.com/en-us/library/windows/desktop/bb760250(v=vs.85).aspx.*

"Iris Data Set"; UCI Machine Learning Repository; Center for Machine Learning and Intelligent Systems; published on: Jul. 5, 2013; retrieved from the Internet Archive WayBack Machine on Jan. 29, 2016 from: https://web.archive.org/web/20130705132622/http://archive.ics.uci.edu/ml/datasets/Iris.*

Red Lion Data; www.RedLionData.com; Jan. 8, 2012; retrieved online Mar. 30, 2016; 6 pages.

Zhang, Q. et al; "Cloud computing: state of the art and research challenges"; Journal of Internet services and applications 1.1; (2010) pp. 7-18.

"Data Model"; Computer Desktop Encyclopedia; The Computer Language Company; retrieved on Jan. 29, 2015 from <http://lookup.computerlanguage.com/host_app/search?cid=C999999 &term=data+model&lookup.x=0&lookup.y=0.

Stasko et al.; "An Evaluation of Space-Filing Information Visualizations for Depicting Hierarchical Structures"; International Journal of Human-Computer Studies; vol. 53, iss 5; Nov. 2000; pp. 663-694.

Haim et al. "A Streaming Parallel Decision Tree Algorithm," Journal of Machine Learning Research 11 (2010) 849-872, Feb. 2010; 24 pages.

Daniel D. Corkill, "Blackboard Systems"; Blackboard Technology Group, Inc.; Al Expert 6(9): 40-47, Sep. 1991; 19 pages.

Panda et al. "PLANET: Massively Parallel Learning of Tree Ensembles with MapReduce," Proceedings of the 35th International Conference on Very Large Data Bases (VLDB-2009); 12 pages.

Ned Horning: "Introduction to decision trees and random forests", Mar. 19, 2011, pp. 1-14, (http://ebookbrowse.com/decisiontrees-randomforest-v2-pdf-d82430890 [retrieved on Feb. 13, 2013] pp. 2, 3, 7.

Stef Van Den Elzen et al: "BaobabView: Interactive Construction and Analysis of Decision Trees", Visual Analytics Science and Technology (VAST), 2011 IEEE Conference on, IEEE, Oct. 23, 2011, 10 pages.

J.R. Quinlan: "Simplifying decision trees", International Journal of Man-Machine Studies, vol. 27, No. 3, Sep. 1987; 14 pages.

Tyree et al: "Parallel Boosted Regression Trees for Web Search Ranking", WWW 2011, Mar. 28-Apr. 1, 2011, Hyderabad, India; 10 pages.

Microsoft; "About Tooltip Controls"; Windows Dev. Center; Sep. 25, 2011; retrieved from Internet Archive WayBack Machine on Jul. 22, 2015: https://web.archive.org/web/20110925963821/http://msdn.microsoft.com/en-us/library/windows/desktop/bb760250(v=vs.85)/aspx.

International Search Report for PCT/US12/063300; Mailing Date: Mar. 8, 2013; 3 pages.

* cited by examiner

| Name | Type | Instance 1 | Instance 2 | Instance 3 |
|---|---|---|---|---|
| Sepal length | 123 | 5.1 | 4.9 | 4.7 |
| Sepal width | 123 | 3.5 | 3.0 | 3.2 |
| Petal length | 123 | 1.4 | 1.4 | 1.3 |
| Petal width | 123 | 0.2 | 0.2 | 0.2 |
| Species | ABC | Iris-setosa | Iris-setosa | Iris-setosa |

FIG. 33

INTERACTIVE VISUALIZATION OF BIG DATA SETS AND MODELS INCLUDING TEXTUAL DATA

RELATED APPLICATIONS

This application is a continuation-in-part of Ser. No. 14/495,802 filed Sep. 24, 2014 entitled INTERACTIVE VISUALIZATION SYSTEM AND METHOD which is herein incorporated by reference in its entirety.

The present disclosure additionally claims priority to and is a continuation-in-part of patent application Ser. No. 13/667,542, filed Nov. 2, 2012, published May 9, 2013, and entitled METHOD AND APPARATUS FOR VISUALIZING AND INTERACTING WITH DECISION TREES, which, in turn, claims priority to U.S. provisional patent application Ser. No. 61/555,615, filed Nov. 4, 2011, and entitled VISUALIZATION AND INTERACTION WITH COMPACT REPRESENTATIONS OF DECISION TREES, which are herein incorporated by reference in their entirety.

COPYRIGHT NOTICE

© 2014 BigML, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever, 37 CFR §1.71(d).

TECHNICAL FIELD

The present disclosure pertains to systems and methods for visualizing and interacting with datasets and decision trees that include textual data.

BACKGROUND OF THE INVENTION

Machine Learning uses a number of statistical methods and techniques to create predictive models for classification, regression, clustering, manifold learning, density estimation and many other tasks. A machine-learned model summarizes the statistical relationships found in raw data and is capable of generalizing them to make predictions for new data points. Machine-learned models have been and are used for an extraordinarily wide variety of problems in science, engineering, banking, finance, marketing, and many other disciplines. While many datasets and models comprise numeric and categorical data types, there is room for improvement in analysis and visualization of data that includes text.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In one aspect, a process according to the present disclosure includes accessing a digital source data file comprising a plurality of rows or records, each record comprising at least one data field; processing the source data file on a computing device to recognize a data type for each of the data fields; in the case of recognizing a text data type, matching the text to a human language; for each one of the recognized text fields in the source data file, applying a stemming process corresponding to the matched human language, thereby tokenizing the text data fields; and utilizing the tokenized data fields in forming a dataset.

In other features, various interactive graphical displays are provided for visualizing a dataset, as well as various models. The visualizations support user-friendly exploration of data, including text data, and the role that textual data plays in predictions.

In some embodiments, the visualizations may include summary displays including text data, histograms that summarize textual content, and various pop-up panels to display additional details of the data, and of predictions, responsive to user input. Automated processes hide the complexities of text processing (for example, stemming, language recognition, etc.) from the user, as well as implementing textual data into modeling, decision trees, and other data analytics.

Additional aspects and advantages of this invention will be apparent from the following detailed description of preferred embodiments, which proceeds with reference to the accompanying drawings.

BRIEF DESCRIPTION OF THE DRAWINGS

FIG. 33 illustrates an example of a data source for Iris Flower Classification.

DETAILED DESCRIPTION OF PREFERRED EMBODIMENTS

Figure 1:
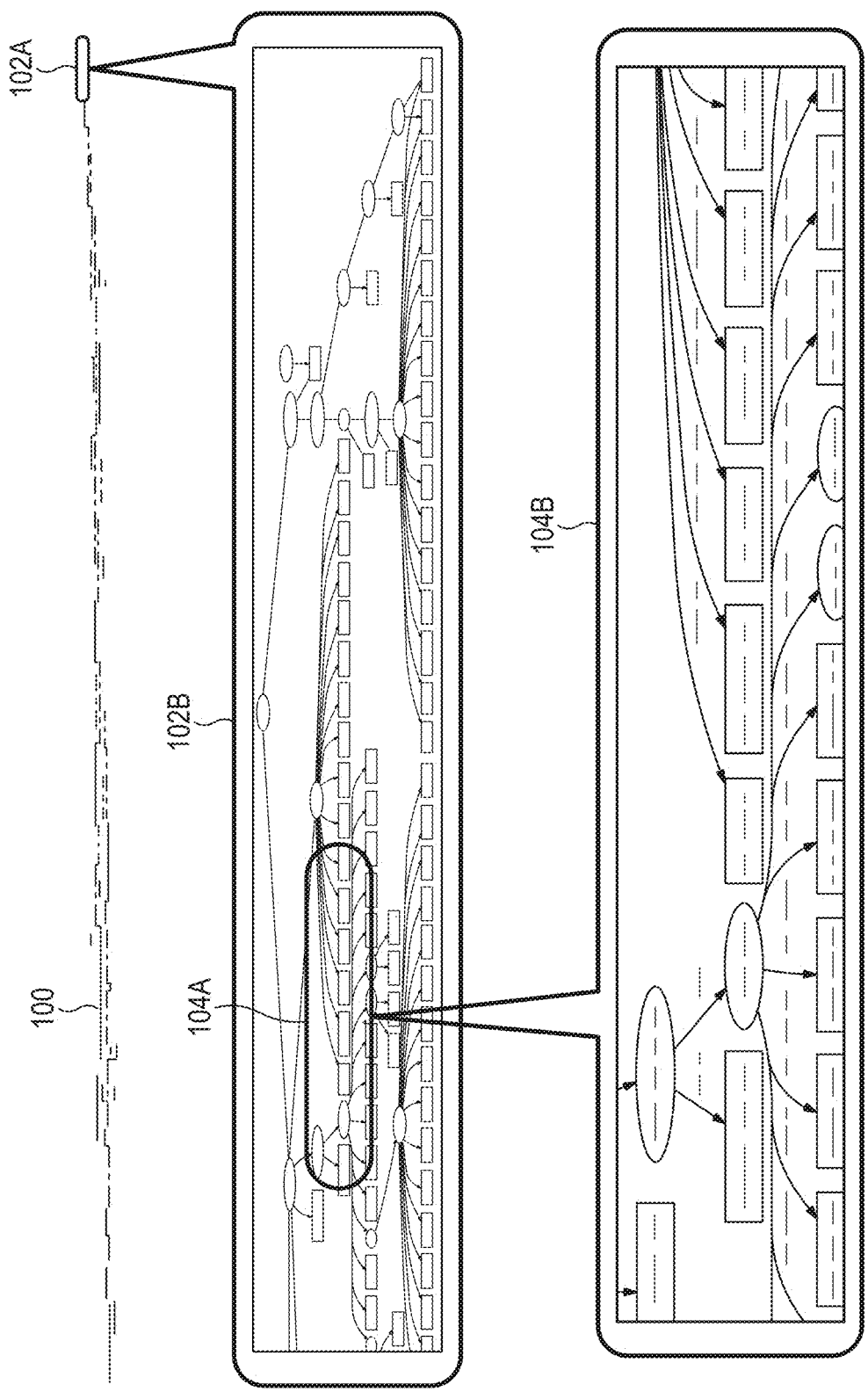
FIG. 1 depicts a non-filtered decision tree.
Figure 2:
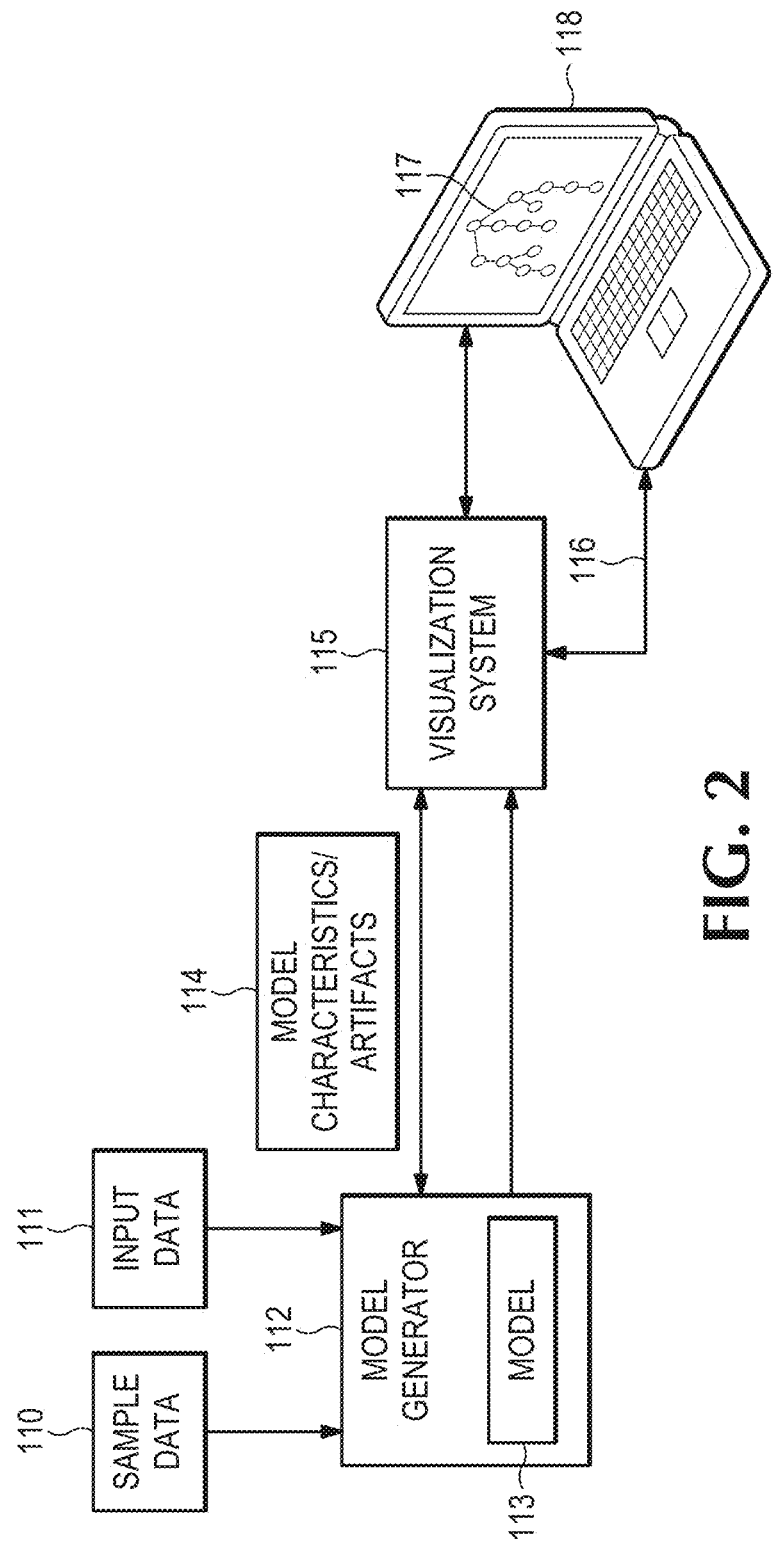
FIG. 2 depicts a decision tree visualization system.

FIG. 2 depicts an example of a visualization system 115 that improves the visualization and understandability of decision trees. A model generator 112 may generate a data model 113 from sample data 110. For example, sample data 110 may comprise census data that includes information about individuals, such as education level, gender, family income history, address, etc. Of course this is just one example of any model that may be generated from any type of data. Sample data may comprise any kind of data hierarchical or otherwise from which model generator 112 may create a data model 113.

Model generator 112 may generate a decision tree 117 that visually represents model 113 as a series of interconnected nodes and branches. The nodes may represent questions and the branches may represent possible answers to the questions. Model 113 and the associated decision tree 117 can then be used to generate predictions or answers for input data 111. For example, model 113 and decision tree 117 may use financial and educational data 111 about an individual to predict a future income level for the individual or generate an answer regarding a credit risk of the individual. Model generators, models, and decision trees are known to those skilled in the art and are therefore not described in further detail.

As explained above, it may be difficult to clearly display decision tree 117 in an original raw form. For example, there may be too many nodes and branches, and too much text to clearly display the entire decision tree 117. A user may try to manually zoom into specific portions of decision tree 117 to more clearly view a subset of nodes and branches. However, zooming into a specific area may prevent a viewer from seeing other more important decision tree information and visually comparing information in different parts of the decision tree.

Visualization system 115 may automatically prune decision tree 117 and only display the most significant nodes and branches. For example, a relatively large amount of sample data 110 may be used for generating or training a first portion of decision tree 117 and a relatively small amount of sample data 110 may be used for generating a second portion of decision tree 117. The larger amount of sample data may allow the first portion of decision tree 117 to provide more reliable predictions than the second portion of decision tree 117.

Visualization system 115 may only display the nodes from decision tree 117 that receive the largest amounts of sample data. This allows the user to more easily view the key questions and answers in decision tree 117. Visualization system 115 also may display the nodes in decision tree in different colors that are associated with node questions. The color coding scheme may visually display node-question relationships, question-answer path relationships, or node-output relationships without cluttering the decision tree with large amounts of text. More generally, visualization system 115 may display nodes or branches with different design characteristics depending on particular attributes of the data. In an embodiment, visualization system 115 may show nodes or branches in different colors depending on an attribute of sample data 110 or input data 111, e.g., age or may show nodes or branches with different design characteristics, e.g., hashed, dashed, or solid lines or thick or thin lines, depending on another attribute of the data, e.g., sample size, number of instances, and the like.

Visualization system 115 may vary how decision tree 117 is pruned, color coded, and generally displayed on a computer device 118 based on model artifacts 114 and user inputs 116. Model artifacts 114 may comprise any information or metrics that relate to model 113 generated by model generator 112. For example, model artifacts 114 may identify the number of instances of sample data 110 received by particular nodes within decision tree 117, the fields and outputs associated with the nodes, and any other metric that may indicate importance levels for the nodes.

Instances may refer to any data that can be represented as a set of attributes. For example, an instance may comprise a credit record for an individual and the attributes may include age, salary, address, employment status, etc. In another example, the instance may comprise a medical record for a patient in a hospital and the attributes may comprise age, gender, blood pressure, glucose level, etc. In yet another example, the instance may comprise a stock record and the attributes may comprise an industry identifier, a capitalization value, and a price to earnings ratio for the stock.

Figure 3:
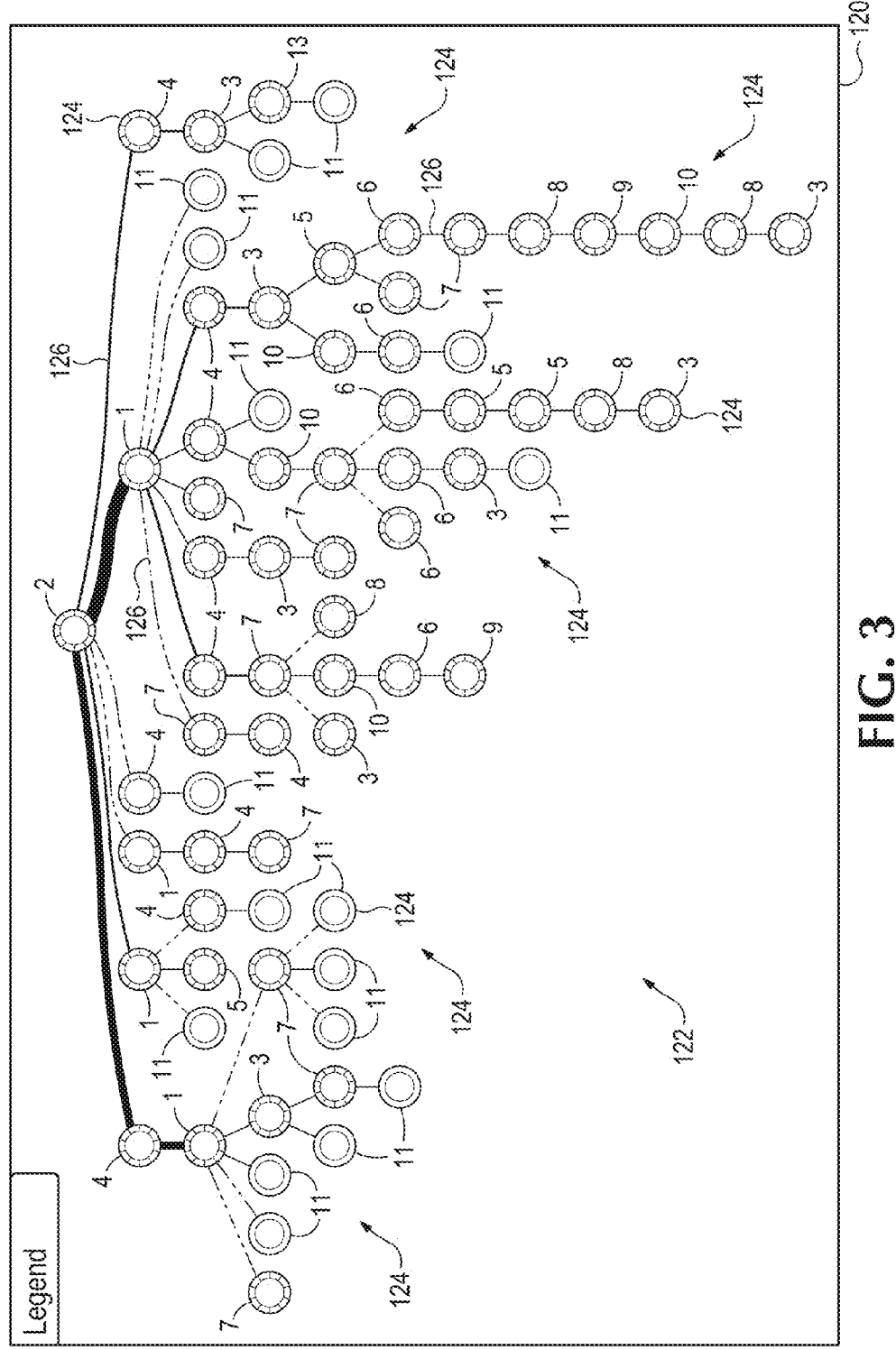
FIG. 3 depicts a decision tree using colors to represent node questions.

FIG. 3 depicts an example decision tree 122 generated by the visualization system and displayed in an electronic page 120. The decision tree 122 may comprise a series of nodes 124 connected together via branches 126. Nodes 124 may be associated with questions, fields and/or branching criteria and branches 126 may be associated with answers to the node questions. For example, a node 124 may ask the question is an individual over the age of 52. A first branch 126 connected to the node 124 may be associated with a yes answer and a second branch 126 connected to the node 124 may be associated with a no answer.

For explanation purposes, any field, branching criteria, or any other model parameters associated with a node may be referred to generally as a question and any parameters, data or other branching criteria used for selecting a branch will be referred to generally as an answer.

As explained above, the visualization system 115 may automatically prune decision tree 122 and not show all of the nodes and branches that originally existed in the raw non-modified decision tree model. Pruned decision tree 122 may include fewer nodes than the original decision tree but may be easier to understand and display the most significant portions of the decision tree. Nodes and branches for some decision tree paths may not be displayed at all. Other nodes may be displayed but the branches and paths extending from those nodes may not be displayed.

For example, the model generator may generate an original decision tree from sample data containing records for 100 different individuals. The record for only one individual may pass through a first node in the original decision tree. Dozens of records for other individuals may pass through other nodes in the original decision tree. The visualization system 115 may automatically prune the first node from decision tree 122.

In addition to being too large, raw decision trees may be difficult to interpret because of the large amounts of textual information. For example, the textual information may identify the question, field, and/or branching criteria associated with the nodes. Rather than displaying text, the visualization system may use a series of colors, shades, images, symbols, or the like, or any combination thereof to display node information.

For illustrative purposes, reference numbers are used to represent different colors. For example, some nodes 124 may be displayed with a color 1 indicating a first question/field/criteria. A second set of nodes 124 may be displayed with a color 2 indicating a second question/field/criteria, etc.

Nodes 124 with color 1 may ask a same first question, such as the salary of an individual and all of nodes 124 with color 2 may ask a same second question, such as an education level of the individual. Nodes 124 with the same color may have different thresholds or criteria. For example, some of nodes 124 with color 1 may ask if the salary for the individual is above $50K per year and other nodes 124 with color 1 may ask if the salary of the individual is above $80K.

The number of node colors may be limited to maintain the ability to discriminate between the colors. For example, only nodes 124 and associated with a top ten key questions may be assigned colors. Other nodes 124 may be displayed in decision tree 122 but may be associated with questions that did not receive enough sample data to qualify as one of the top ten key questions. Nodes 124 associated with the non-key questions may all be assigned a same color or may not be assigned any color.

Instead of being associated with questions, some nodes 124 in decision tree 124 may be associated with answers, outcomes, predictions, outputs, etc. For example, based on the questions and answers associated with nodes along a path, some nodes 124 may generate an answer "bad credit" and other nodes may generate an answer "good credit." These nodes 124 are alternatively referred to as terminal nodes and may be assigned a different shape and/or color than the branching question nodes.

For example, the center section of all terminal nodes 124 may be displayed with a same color 11. In addition, branching nodes 124 associated with questions may be displayed with a hatched outline while terminal nodes 124 associated with answers, outcomes, predictions, outputs, etc. may be displayed with a solid outline. For explanation purposes, the answers, outcomes, predictions, outputs, etc. associated with terminal nodes may be referred to generally as outputs.

Figure 4:
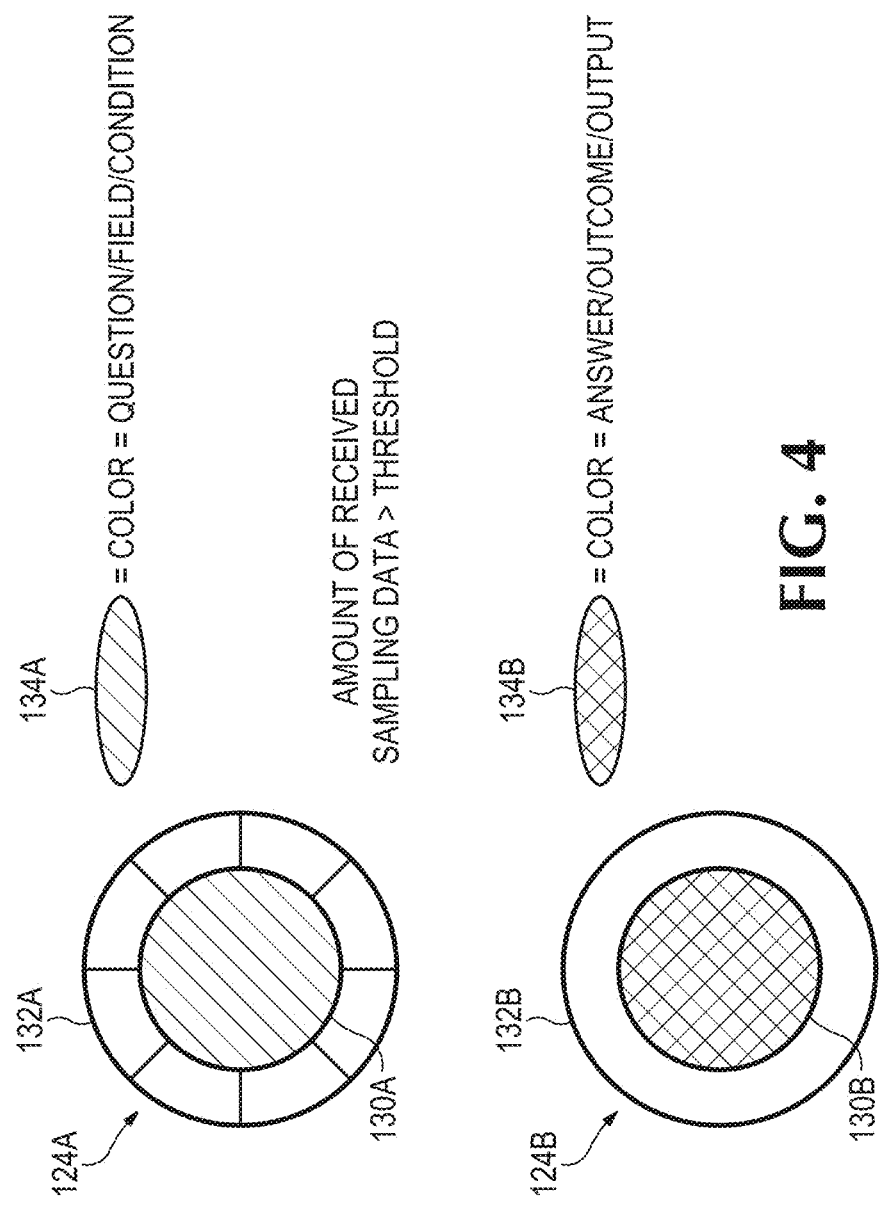
FIG. 4 depicts how colors and associated node questions may be represented in the decision tree.

FIG. 4 depicts in more detail examples of two nodes 124 that may be displayed in decision tree 122 of FIG. 3. A branching node 124A may comprise a dashed outer ring 132A with a hatched center section 130A. The dashed outer ring 132A may visually indicate node 124A is a branching node associated with a question, field and/or condition. A color 134A within center section 130A is represented by hatched lines and may represent the particular question, field, and/or criteria associated with node 124A. For example, the question or field may be age and one example of criteria for selecting different branches connected to the node may be an age of 52 years.

Color 134A not only visually identifies the question associated with the node but also may visually identify the question as receiving more than some threshold amount of the sample data during creation of the decision tree model. For example, only the nodes associated with the top ten model questions may be displayed in decision tree 122. Thus, each of nodes 124A in the decision tree will be displayed with one of ten different colors.

A terminal node 124B may comprise a solid outer ring 132B with a cross-hatched center section 130B. A color 134B within center section 130B is represented by the cross-hatched lines. The solid outer ring 132B and color 130B may identify node 124B as a terminal node associated with an answer, outcome, prediction, output, etc. For example, the output associated with terminal node 124B may comprise an income level for an individual or a confidence factor a person is good credit risk.

Figure 5:
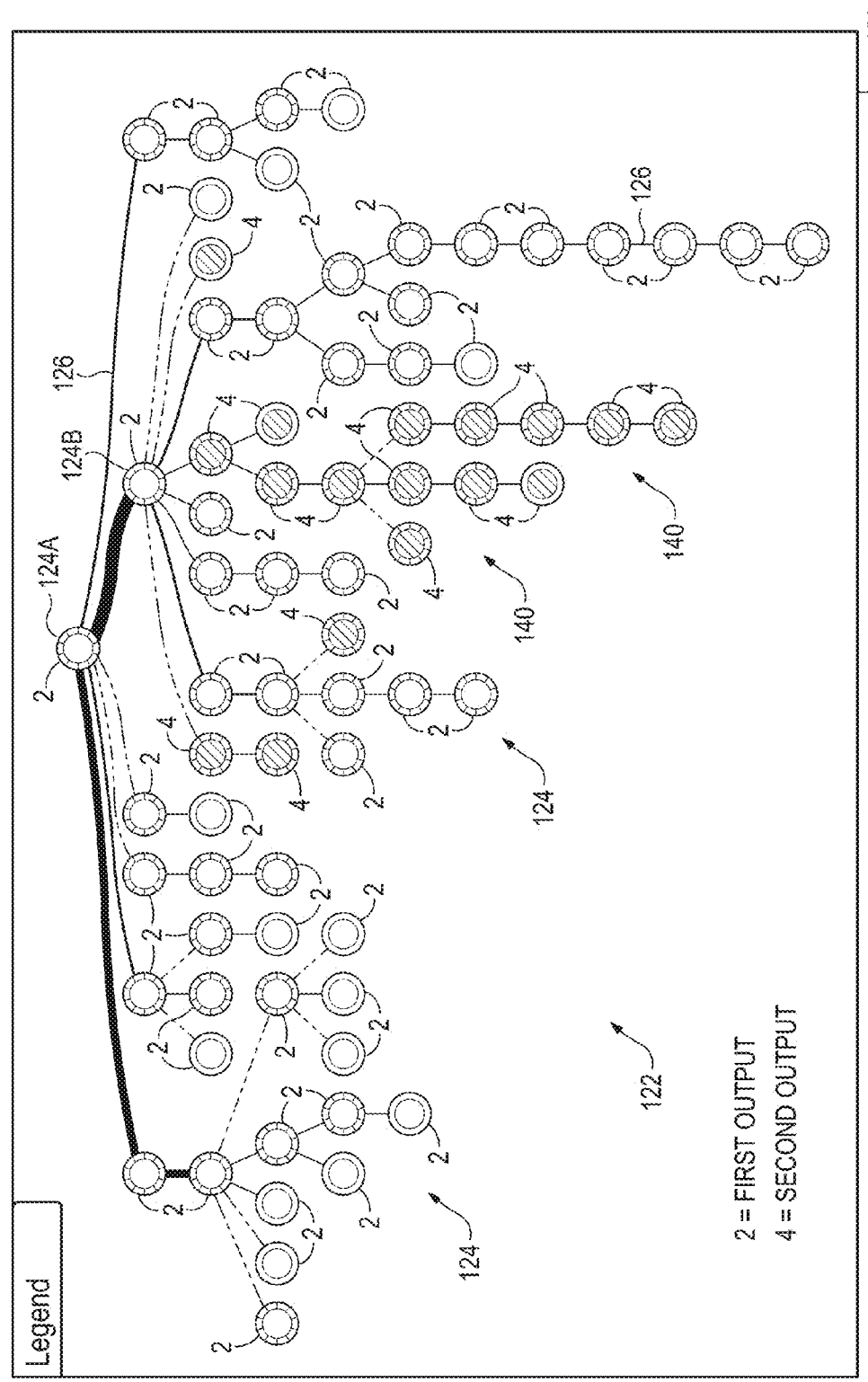
FIG. 5 depicts a decision tree using colors to represent outputs.

FIG. 5 depicts another example decision tree visualization generated by the visualization system. In this example, a second visualization mode is used for encoding model information. The visualization system may initially display decision tree 122 with the color codes shown in FIG. 3. In response to a user input, the visualization system may toggle to display decision tree 122 with the color codes shown in FIG. 5.

Decision tree 122 in FIG. 5 may have the same organization of nodes 124 and branches 126 previously shown in FIG. 3. However, instead of the colors representing questions, the colors displayed in FIG. 5 may be associated with answers, outcomes, predictions, outputs, etc. For example, a first set of nodes 124 may be displayed with a first color 2 and a second set of nodes 124 may be displayed with a second color 4. Color 2 may be associated with the output "good credit" and color 4 may be associated with the output "bad credit." Any nodes 124 within paths of decision tree 122 that result in the "good credit" output may be displayed with color 2 and any nodes 124 within paths of decision tree 122 that result in the "bad credit" output may be displayed with color 4.

A cluster 140 of bad credit nodes with color 4 are displayed in a center portion of decision tree 122. A user may mouse over cluster 140 of nodes 124 and view the sequence of questions that resulted in the bad credit output. For example, a first question associated with node 124A may be related to employment status and a second question associated with a second lower level node 124B may be related to a credit check. The combination of questions for nodes 124A and 124B might identify the basis for the bad credit output associated with node cluster 140.

The visualization system may generate the colors associated with the outputs based on a percentage of sample data instances that resulted in the output. For example, 70 percent of the instances applied to a particular node may have resulted in the "good credit" output and 30 percent of the instances through the same node may have resulted in the "bad credit" output. The visualization system may assign the color 2 to the node indicating a majority of the outputs associated with the node are "good credit."

In response to a second user input, the visualization system may toggle back to the color coded questions shown in FIG. 3. The visualization system may display other information in decision tree 122 in response to preconfigured parameters or user inputs. For example, a user may direct the visualization system to only display paths in decision tree 122 associated with the "bad credit" output. In response to the user input, the visualization system may filter out all of the nodes in decision tree 122 associated with the "good credit" output. For example, only the nodes with color 4 may be displayed.

Figure 6:
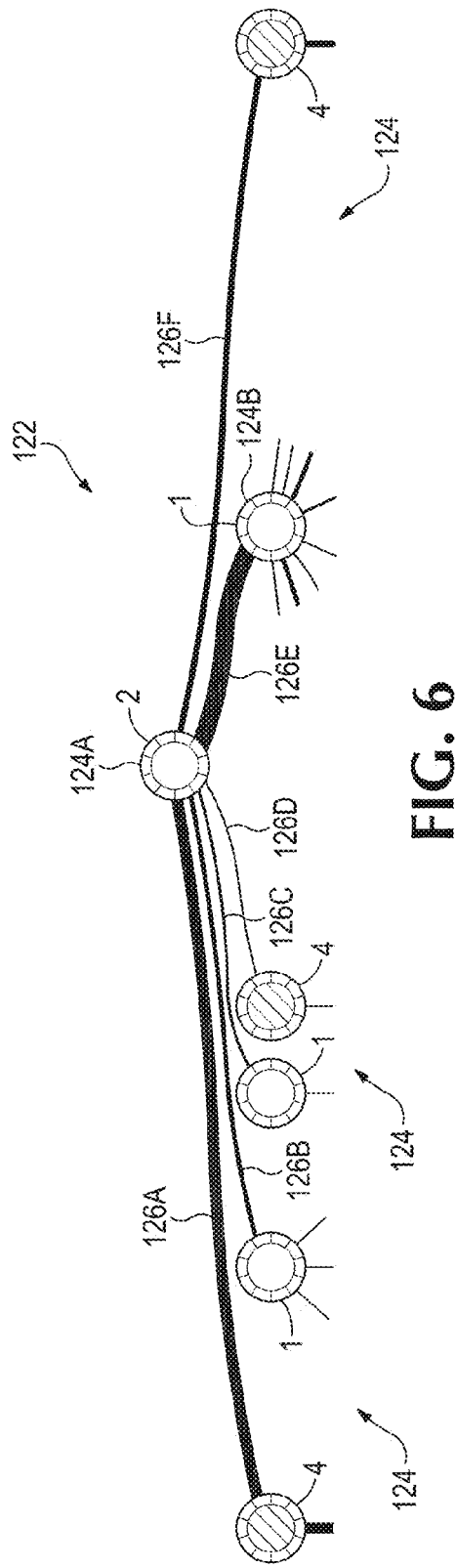
FIG. 6 depicts a cropped version of a decision tree that uses branch widths to represent instances of sample data.

FIG. 6 depicts an example of how the visualization system displays amounts of sample data used for creating the decision tree. As discussed above, decision tree 122 may be automatically pruned to show only the most significant nodes 124 and branches 126. The visualization system may vary the width of branches 126 based on the amounts of sample data received by different associated nodes 124.

For example, a root level of decision tree 122 is shown in FIG. 6 and may have six branches 126A-126F. An order of thickest branch to thinnest branch comprises branch 126E, branch 126A, branch 126F, branch 126B, branch 126C, and branch 126D. In this example, the most sample data may have been received by node 124B. Accordingly, the visualization system displays branch 126E as the widest or thickest branch.

Displaying the branch thicknesses allow users to more easily extract information from the decision tree 122. For example, node 124A may be associated with an employment question, node 124B may be associated with a credit question, and branch 126E may be associated with an answer of being employed for less than 1 year. Decision tree 122 shows that the largest amount of the sample data was associated with persons employed for less than one year.

The thickness of branches 126 also may visually indicate the reliability of the outputs generated from different branches and the sufficiency of the sample data used for generating decision tree 122. For example, a substantially larger amount of sample data was received by node 124B through branch 126E compared with other nodes and branches. Thus, outputs associated with node 124B and branch 126E may be considered more reliable than other outputs.

A user might also use the branch thickness to identify insufficiencies with the sample data. For example, the thickness of branch 126E may visually indicate 70 percent of the sample data contained records for individuals employed less than one year. This may indicate that the decision tree model needs more sample data for individuals employed for more than one year. Alternatively, a user may be confident that the sample data provides an accurate representation of the test population. In this case, the larger thickness of branch 126E may simply indicate that most of the population is usually only employed for less than one year.

Figure 7:
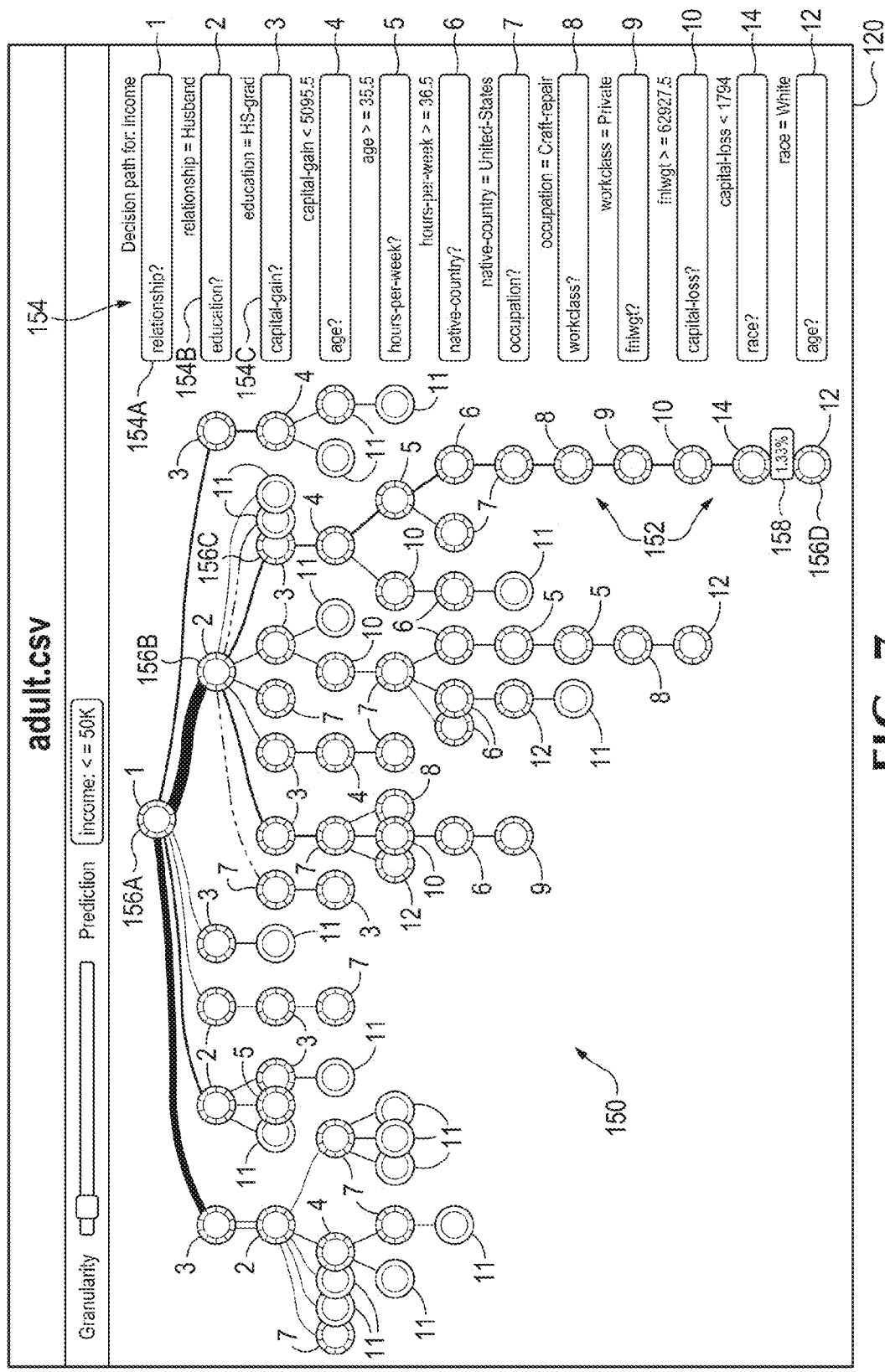
FIG. 7 depicts a decision tree displayed with a legend that cross references colors with node questions.

FIG. 7 depicts a scheme for displaying a path through of a decision tree. The colorization schemes described above allow quick identification of important questions. However, a legend 154 also may be used to visually display additional decision tree information.

For example, a user may select or hover a cursor over a particular node within a decision tree 150, such as node 156D. The visualization system may identify a path 152 from selected node 156D to a root node 156A. The visualization system then may display a color coded legend 154 on the side of electronic page 120 that contains all of the questions and answers associated with all of the nodes within path 152.

For example, a relationship question 154A associated with root node 156A may be displayed in box with color 1 and node 156A may be displayed with color 1. An answer of husband to relationship question 154A may cause the model to move to a node 156B. The visualization system may display question 154B associated with node 156B in a box with the color 2 and may display node 156B with color 2. An answer of high school to question 154B may cause the model to move to a next node 156C. The visualization system may display a capital gain question 154C associated with node 156C with the color 3 and may display node 156C with color 3.

The visualization system may display other metrics or data values 158. For example, a user may reselect or continue to hover the cursor over node 156D or may select a branch connected to node 156D. In response to the user selection, the visualization system may display a popup window that contains data 158 associated with node 156D. For example, data 158 may indicate that 1.33% of the sample data instances reached node 156D. As mentioned above, instances may comprise any group of information and attributes used for generating decision tree 150. For example, an instance may be census data associated with an individual or may be financial information related to a stock.

Thus, legend 154 displays the status of all the records at a split point along path 152, such as relationship=Husband. Legend 154 also contains the question/field to be queried at the each level of decision tree path 152, such as capital-gain.

Fields commonly used by decision tree 150 and significant fields in terms of maximizing information gain that appear closer to root node 156A can also be quickly viewed.

Figure 8:
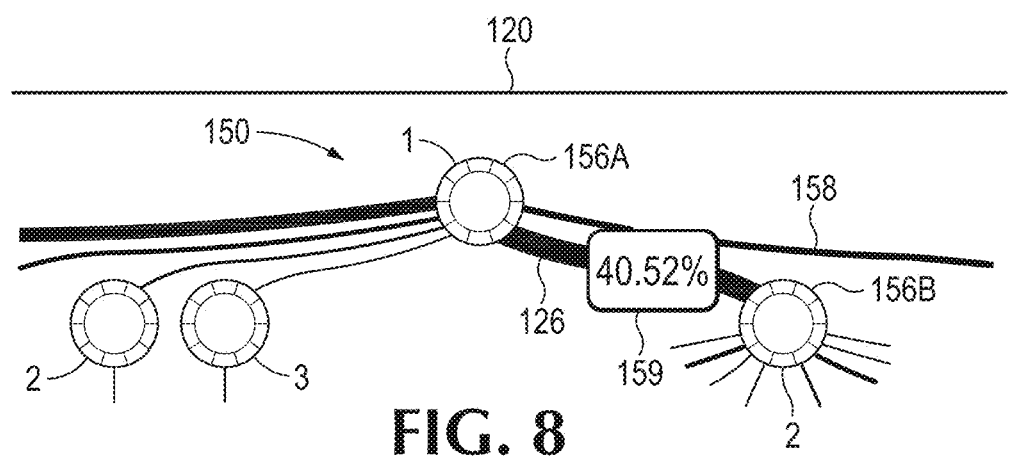
FIG. 8 depicts a popup window displaying a percent of sample data passing through a node.

FIG. 8 depicts another example of how the visualization system may display metrics associated with a decision tree. As described above in FIG. 7, the visualization system may display a contextual popup window 159 in response to a user selection, such as moving a cursor over a node 156B or branch 126 and pressing a select button. Alternatively, the visualization system may display popup window 159 when the user hovers the cursor over node 156B or branch 126 for some amount of time or selects node 156B or branch 126 via a keyboard or touch screen.

Popup window 159 may display numeric data 158 identifying a percentage of records (instances) in the sample data that passed through node 156B during the model training process. The record information 158 may help a user understand other aspects of the underlying sample data. Data 158 may correspond with the width of branch 126. For example, the width of branch 126 visually indicates node 156B received a relatively large percentage of the sample data. Selecting node 156B or branch 126 causes the visualization system to display popup window 159 and display the actual 40.52% of sample data that passed through node 156B.

Any other values or metrics can be displayed within popup window 159, such as average values or other statistics related to questions, fields, outputs, or attributes. For example, the visualization system may display a dropdown menu within popup window 159. The user may select different metrics related to node 156B or branch 126 for displaying via selections in the dropdown menu.

Figure 9:
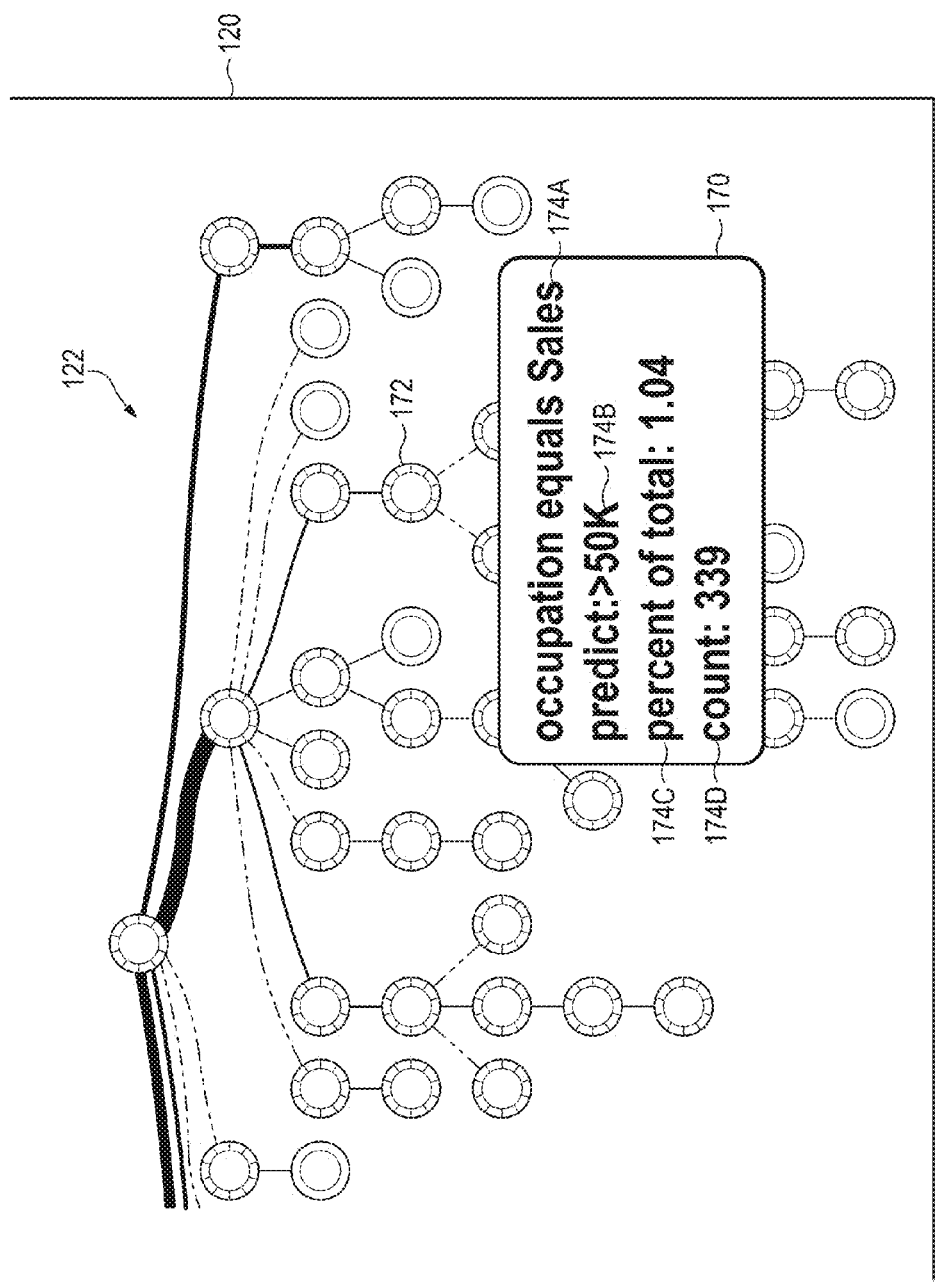
FIG. 9 depicts a popup window showing node metrics.

FIG. 9 depicts another popup window 170 that may be displayed by the visualization system in response to the user selecting or hovering over a node 172. Popup window 170 may display text 174A identifying the question associated with node 172 and display text 174B identifying a predicted output associated with node 172. Popup window 170 also may display text 174D identifying a number of sample data instances received by node 172 and text 174C identifying a percentage of all sample data instances that were passed through node 172.

Figure 10:
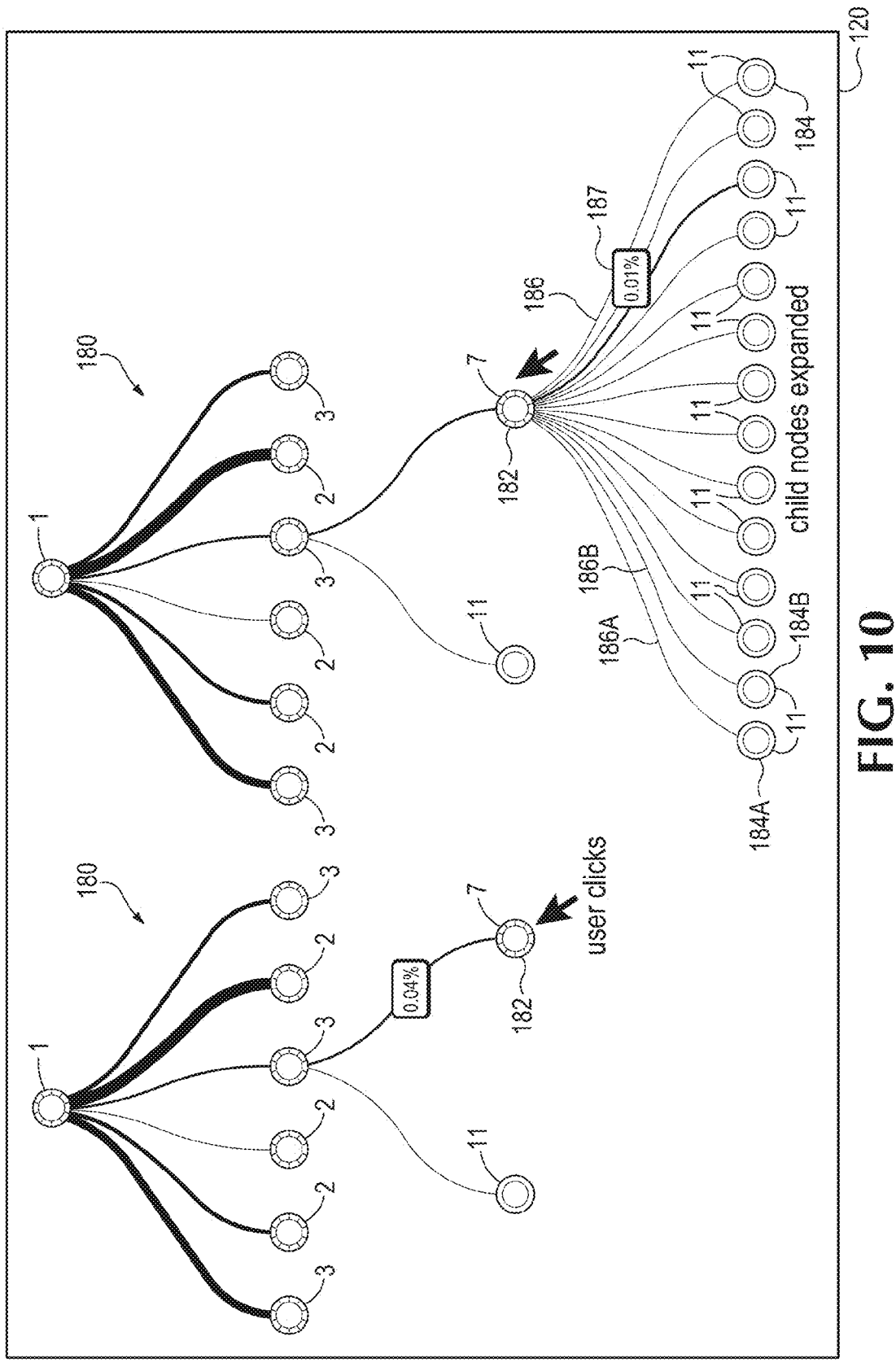
FIG. 10 depicts a technique for expanding a selected decision tree node.

FIG. 10 depicts how the visualization system may selectively display different portions of a decision tree. As described above, the visualization system may initially display a most significant portion of a decision tree 180. For example, the visualization system may automatically prune decision tree 180 by filtering child nodes located under a parent node 182. A user may wish to expand parent node 182 and view any hidden child nodes.

In response to the user selecting or clicking node 182, the visualization system may display child nodes 184 connected below parent node 182. Child nodes 184 may be displayed with any of the color and/or symbol coding described above. In one example, the visualization system may isolate color coding to child nodes 184. For example, the top ranked child nodes 184 may be automatically color coded with associated questions. The visualization system also may display data 187 related to child nodes 184 in popup windows in response to the user selecting or hovering over child nodes 184 or selecting branches 186 connected to child nodes 184.

In order to keep the decision tree from getting too dense, branches 186 of the child node subtree may be expanded one at a time. For example, selecting parent node 182 may display a first branch 186A and a first child node 184A. Selecting parent node 182 a second time may display a second branch 186B and a second child node 184B.

Figure 11:
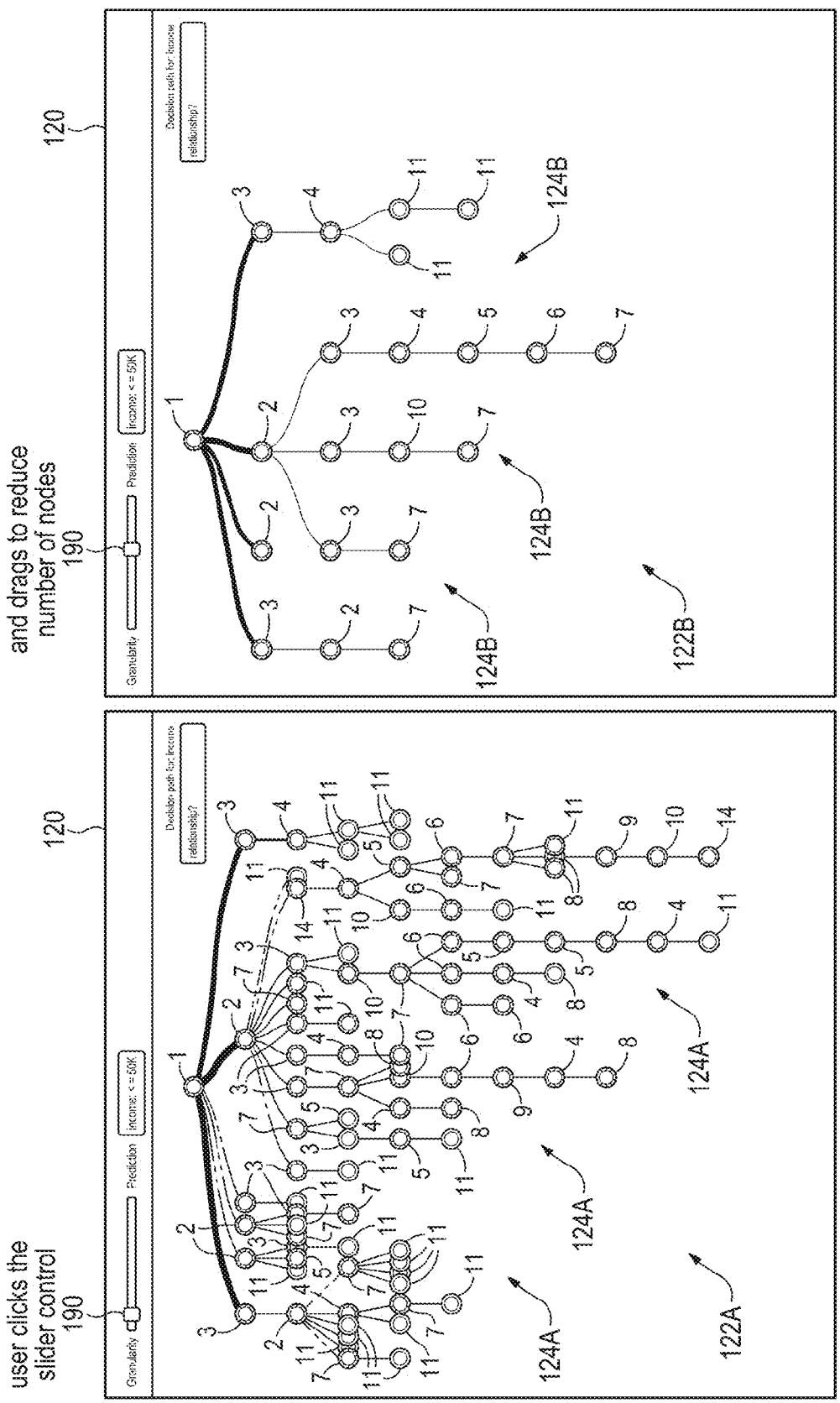
FIG. 11 depicts a technique for selectively pruning a decision tree.

FIG. 11 depicts another example of how the visualization system may selectively prune a decision tree. The visualization system may display a preselect number of nodes 124A in decision tree 122A. For example, the visualization system may identify 100 nodes from the original decision tree that received the highest amounts of sample data and display the identified nodes 124A in decision tree 122A.

A user may want to selectively prune the number of nodes 124 that are displayed in decision tree 122B. This may greatly simplify the decision tree model. An electronic image or icon represents a slider 190 and may be used for selectively varying the number of nodes displayed in the decision tree. As mentioned above, the top 100 nodes 124A may be displayed in decision tree 122A. Moving slider 190 to the right may cause the visualization system to re-pruned decision tree 124A into decision tree 124B with a fewer nodes 124B.

For example, the visualization system then may identify a number of nodes to display in decision tree 122B based on the position of slider 190, such as 20 nodes. The visualization system may then identify the 20 nodes and/or 20 questions that received the largest amount of sample data and display the identified nodes 124B in decision tree 122B. The visualization system may display nodes 124B with colors corresponding with the associated node questions. The visualization system also may display any of the other information described above, such as color coded outputs and/or popup windows that display other mode metrics.

Figure 12:
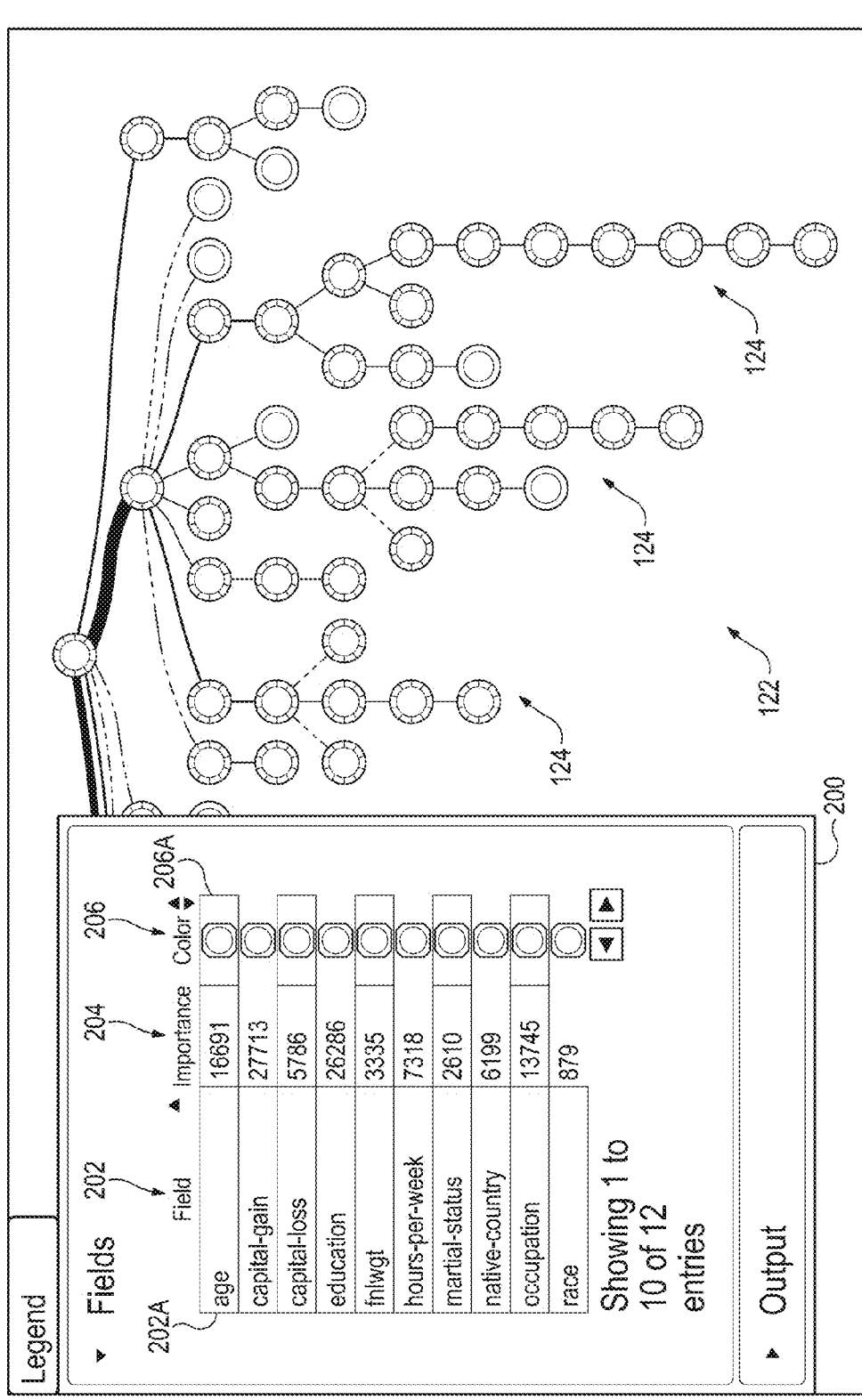
FIG. 12 depicts a legend cross referencing node fields with importance values and colors.

FIG. 12 depicts another example of how the visualization system may display a decision tree. The colorization techniques described above allow the important fields to be quickly identified. The visualization system may display a legend 200 that shows the mapping of colors 206 with corresponding fields 202. Legend 200 may be used for changing colors 206 assigned to specific questions/fields 202 or may be used to change an entire color scheme for all fields 202. For example, selecting a particular field 202A on legend 200 may switch the associated color 206A displayed for nodes 124 associated with field 202A.

Legend 200 also may display values 204 associated with the importance 204 of different fields/questions/factors 202 used in a decision tree 122. For example, decision tree 122 may predict salaries for individuals. Field 202A may have an importance value of 16691 which appears to have the third highest importance within fields 202. Thus, age field 202A may be ranked as the third most important question/field in decision tree 122 for predicting the salary of an individual. Any statistics can be used for identifying importance values 204. For example, importance values 204 may be based on the confidence level for fields 202.

Figure 13:
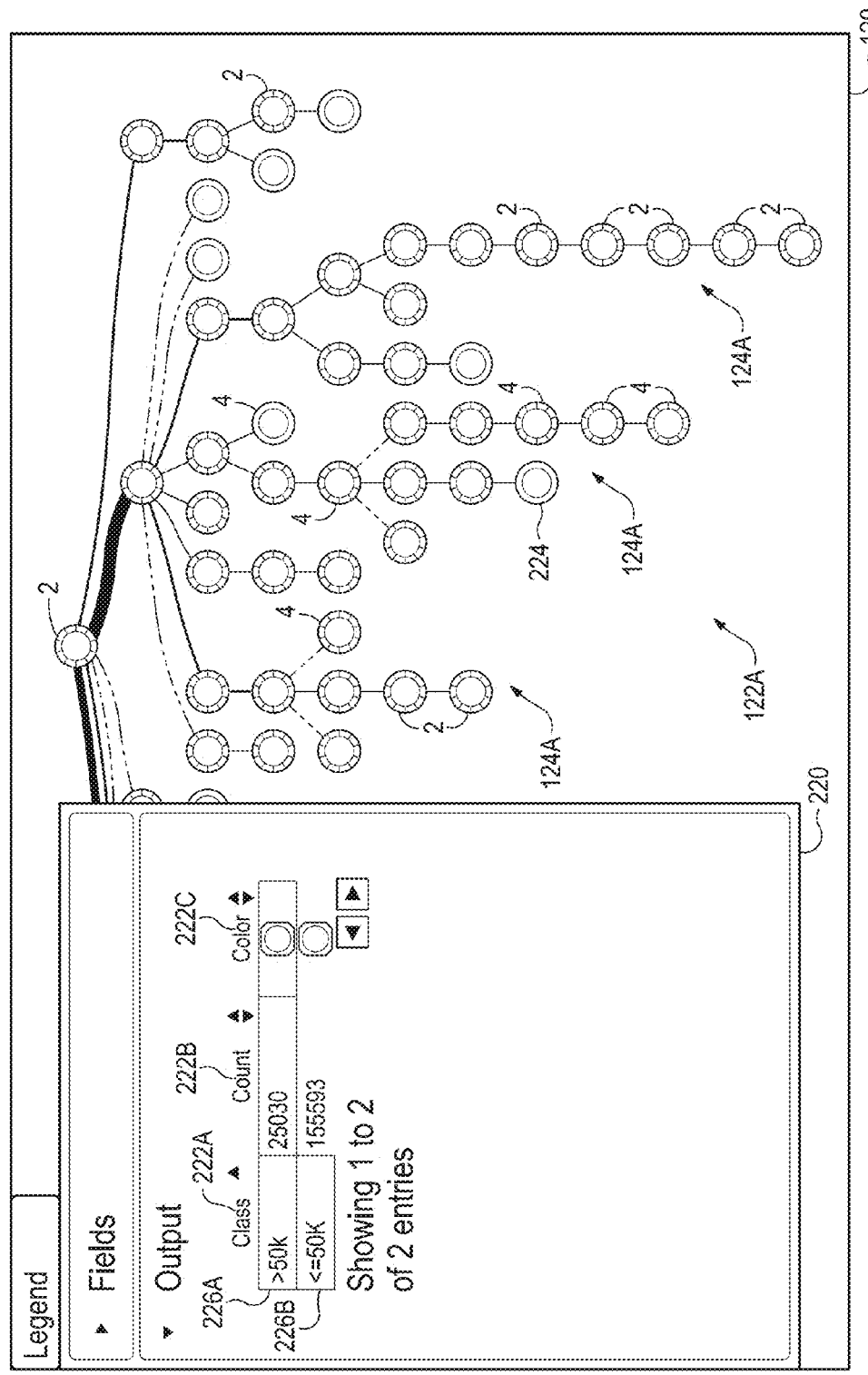
FIG. 13 depicts a legend cross referencing node outputs with data count value and colors.

FIG. 13 depicts another example of how output information may be displayed with a decision tree. A legend 220 may be displayed in response to a user selecting a given node. In this example, the user may have selected a node 224 while operating in the output mode previously described in FIG. 5. Accordingly, the visualization system may display legend or window 220 containing output metrics associated with node 224.

For example, legend 220 may display outputs or classes 222A associated with node 224 or the output associated with node 224, a count 222B identifying a number of instances of sample data that generated output 222A, and a color 222C associated with the particular output. In this example, an output 226A of >50K may have a count 222B of 25030 and an output 226B of <50K may have a count 222B of 155593.

Figure 14:
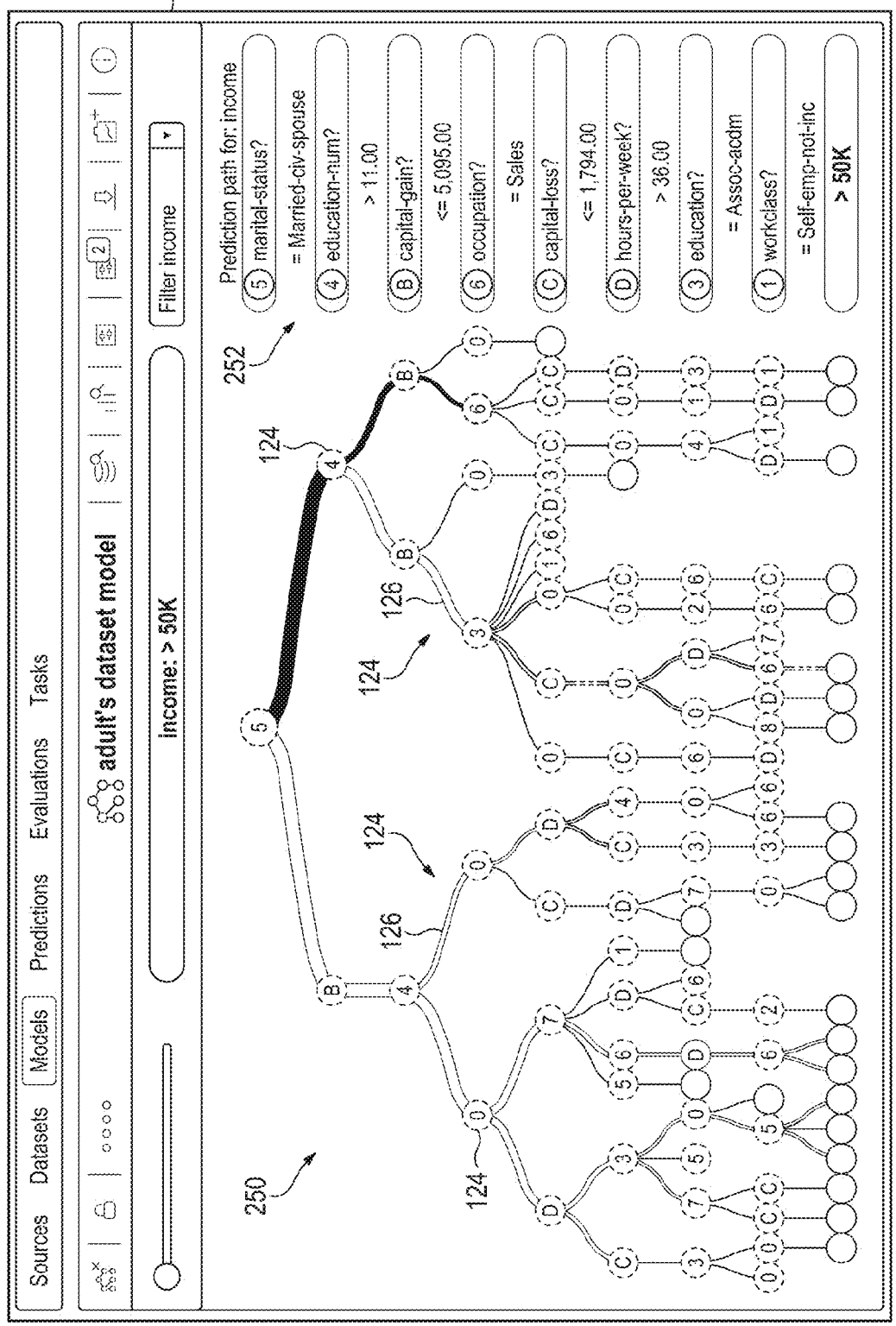
FIG. 14 depicts a decision tree using alpha-numeric characters to represent node questions.

FIG. 14 depicts an alternative example of how questions and answers may be visually displayed in a decision tree 250. In this example, instead of colors, numbers and/or letters may be displayed within nodes 124. The alphanumeric characters may represent the questions, fields, conditions and/or outputs associated with the nodes and associated branches 126. A legend 252 may be selectively displayed on the side of electronic page 120 that shows the mappings between the alphanumeric characters and the questions, fields, answers, and outputs. Dashed outlines circles again may represent branching nodes and solid outlined circles may represent terminal/output nodes.

Hardware and Software

Figure 15:
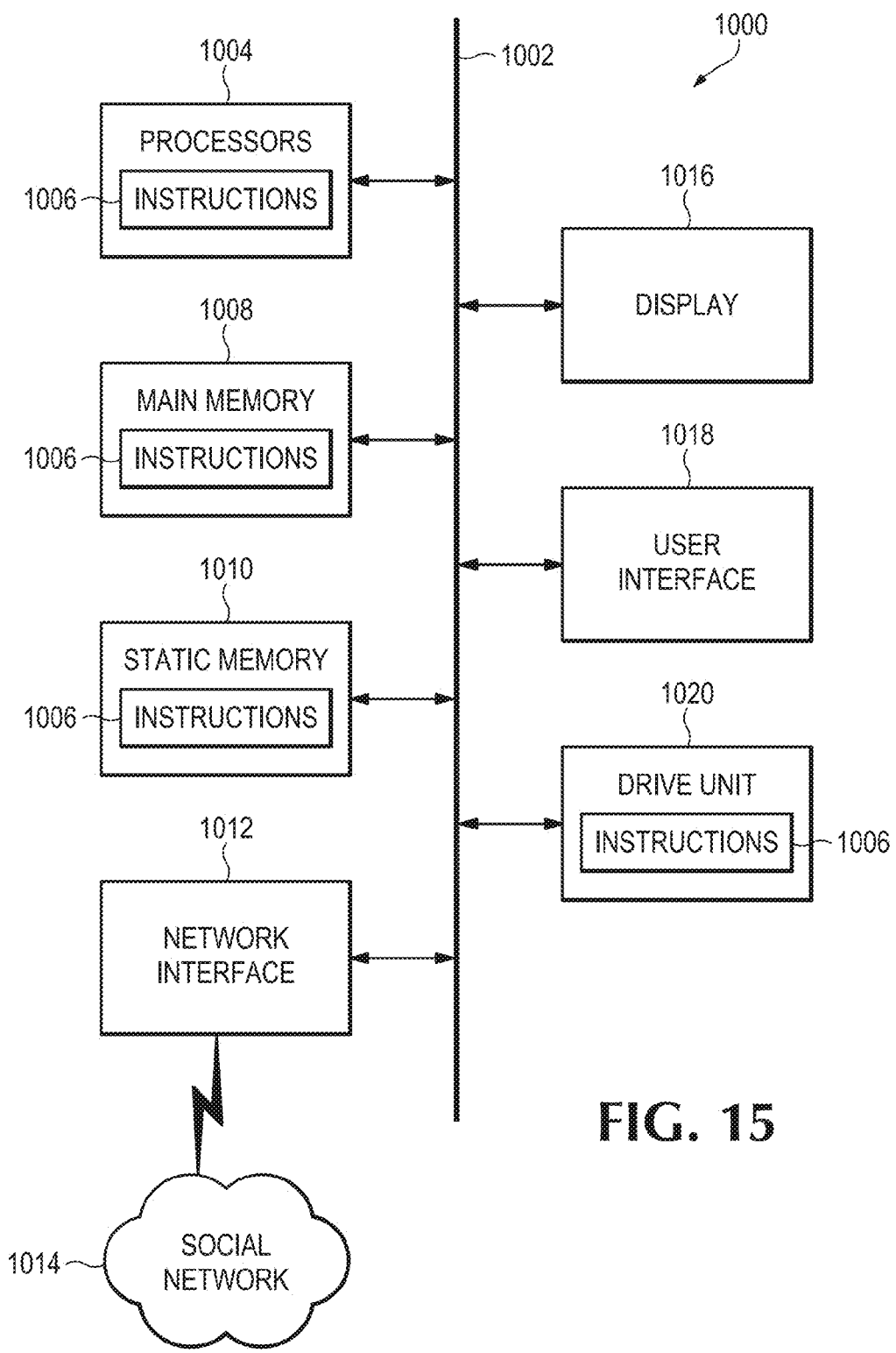
FIG. 15 depicts an example computing device for implementing the visualization system.

FIG. 15 shows a computing device 1000 that may be used for operating the visualization system and performing any combination of the visualization operations discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise a storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program, or operation with unclear boundaries.

Graphical visualization methods have evolved to assist in the analysis of large datasets that can be particularly challenging to display visually in a meaningful manner. Graphic visualization methods may be interactive based on user input and may include tree visualizations as well as space-filling visualizations, e.g., sunburst, tree map, and icicle visualizations.

An embodiment of the present invention may include a method for interactive visualization of a dataset including accessing a decision tree model of a dataset and generating a space-filling visualization display of the decision tree model. The space-filling visualization may comprise a sunburst which is a radial layout of segments corresponding to nodes (or subset of nodes) of a prediction tree. Each segment in the sunburst has an angular dimension and a color each corresponding or proportional to a metric, e.g., confidence, attribute, and the like, of the corresponding node.

A fundamental element of any visualization is a data source, which may be organized as a table that includes rows that represent a field or a feature. By default, the last field is considered the feature to be predicted termed an objective field. A first row of a data source may be used as a header, i.e., to provide field names or to identify instances. A field can be numerical, categorical, textual, date-time, or otherwise.

For example, a data source for iris flower classification as shown in FIG. 33, may include rows identifying fields, e.g., sepal length, sepal width, petal length, petal width, species, and the like. Each field may have a corresponding type, e.g., numerical, categorical, textual, date-time, or otherwise. For example, sepal length is a numerical field type, while species is a categorical type. Each field may have associated there-with data items corresponding to one or more instances. For example, instance 1 has a sepal length of 5.1 and a sepal width of 3.5 while instance 2 has a petal length of 1.4 and petal width of 0.2.

A dataset, for its part, is a structured version of one or more data sources where each field has been processed and serialized according to its type. A dataset may comprise a histogram for each numerical, categorical, textual, or date-time field. A dataset may show a number of instances, missing values, errors, and a histogram for each field in the dataset. In an embodiment, selecting a histogram by any means, e.g., by clicking on a node using any kind of mouse, hovering over a node for a predetermined amount of time using any kind of cursor, touching a node using any kind of touch screen, gesturing on a gesture sensitive system and the like, may result in display of a pop up window with additional specific information about the selected histogram. In an embodiment, the pop up window over a histogram may show, for each numeric field, the minimum, the mean, the median, maximum, and the standard deviation.

Figure 34:
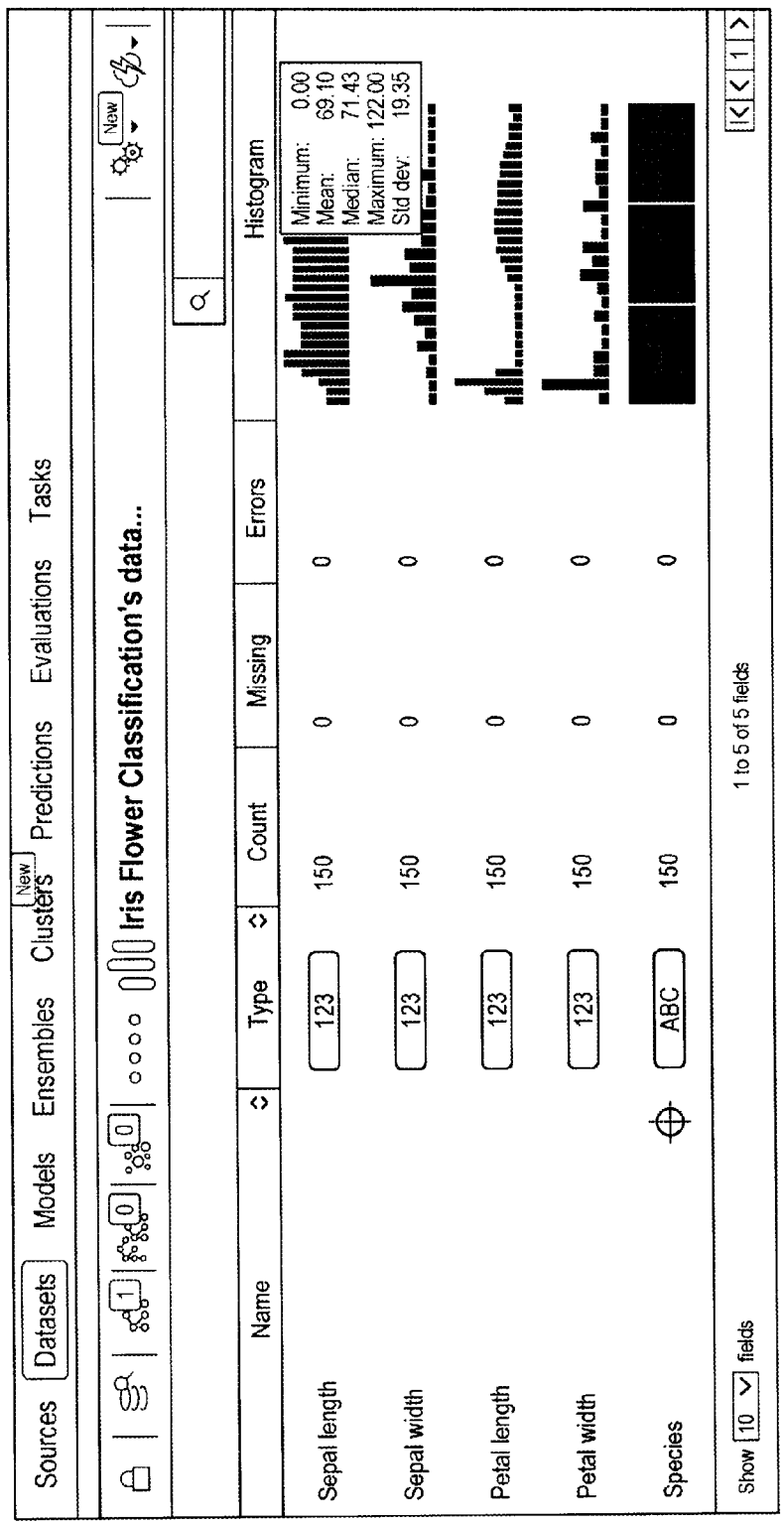
FIG. 34 illustrates an example of a dataset for Iris Flower Classification.

FIG. 34 is an example of a dataset for iris flower classification.

Note that a unique symbol or icon ❖ in FIG. 34, denotes the species row as the objective field, or the field to be predicted using the model created based on the dataset shown in FIG. 33.

Figure 16A:
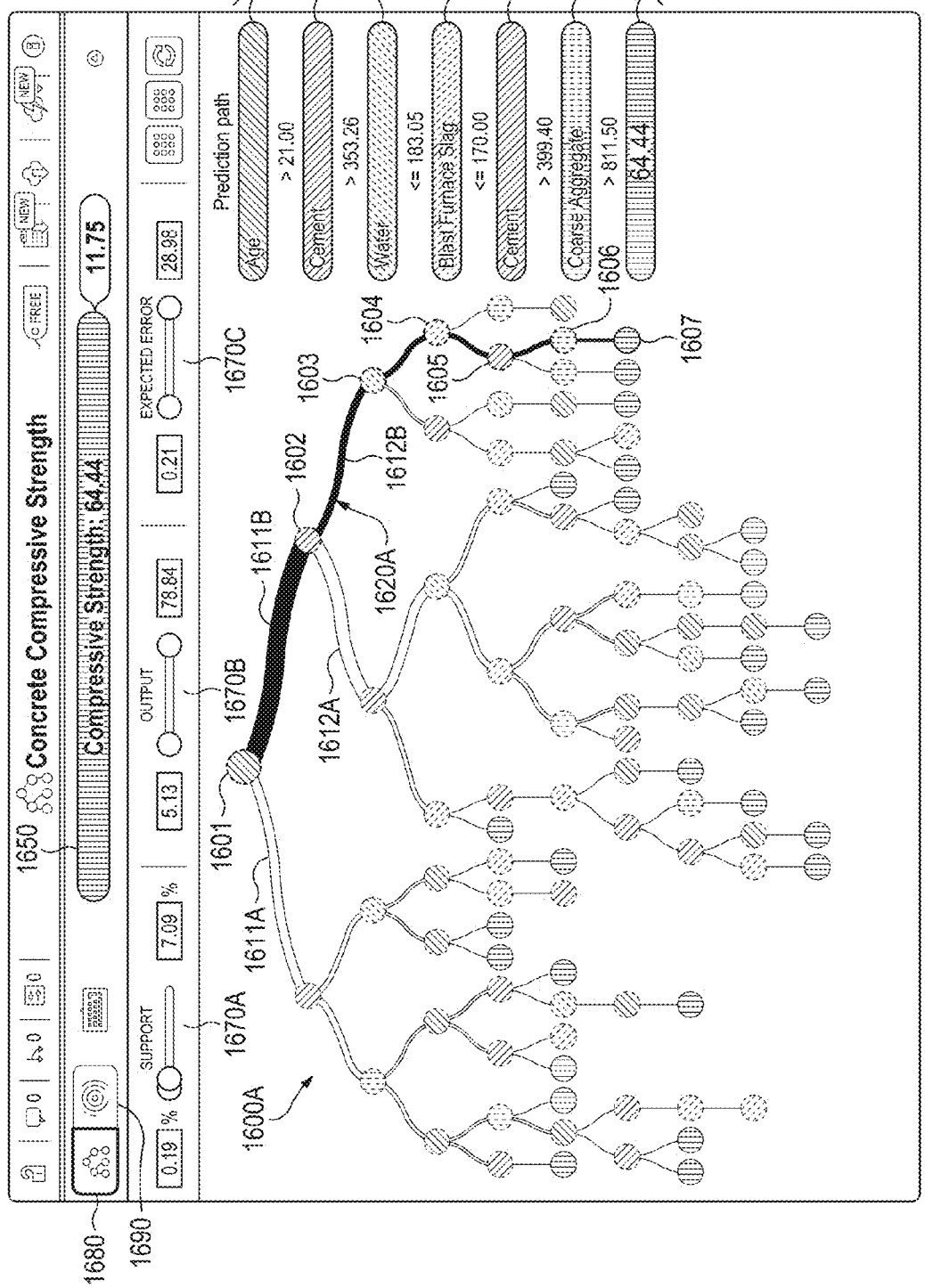
FIG. 16A is an embodiment of a prediction tree according to the present invention.

FIG. 16A is an embodiment of a prediction tree 1600A according to the present invention. Referring to FIGS. 2 and 16A, model generator 112 may generate a model 113 based at least in part a dataset comprising a plurality of data sources, e.g., input data 111 and sample data 110. Visualization system 115, in turn, may generate prediction tree 1600A based on model 113 and, optionally, model characteristics or artifacts 114. In an embodiment, model 113 may predict an objective field, which is a last row of the dataset by default but other rows or columns may be designated as the objective field. A prediction tree may show the most relevant patterns in the data but may also be used to generate predictions for new data instances.

Prediction tree 1600A may include a plurality of nodes, e.g., nodes 1601, 1602, 1603, 1604, 1605, 1606, and 1607, and a plurality of branches, e.g., branches 1611, 1612, and 1613. At every node, visualization system 115 may display prediction tree 1600A together with a prediction of an objective field, e.g., compression strength. Visualization system 115 may display the prediction at an information box 1650, legend 1654, or pop up window 1640 (e.g., FIG. 16C) together with additional information relating to the prediction, e.g., level of confidence or an expected error, in response to a user selecting a particular node by any means known to a person of ordinary skill in the art, e.g., a user clicking on a node using any kind of mouse, a user hovering over a node for a predetermined amount of time using any kind of cursor, a user touching a node using any kind of touch screen, a user using any kind of gesturing on a gesture sensitive system, and the like.

Prediction tree 1600A may have a binary structure meaning that at most, two branches emanate from each node. For example, root node 1601 may include branches 1611A and 1611B, while node 1602 may include branches 1612A and 1612B, and the like. Prediction tree 1600A may include a root node 1601 and any number of terminal nodes, e.g., node 1607.

Each node in prediction tree 1600A may be displayed with a corresponding visual characteristic that differentiates the display of one node from another by visually indicating particular fields. Visual characteristics may include color, cross hatching, or any other characteristic capable of visually differentiating the display of one node from another. For example, root node 1601 may be associated with a first color or cross hatching that indicates an "age" field while node 1602 may be associated with a second color or cross hatching that indicates a "cement" field.

Each branch of prediction tree 1600A may represent a number of data items in the dataset associated with the particular field or attribute represented by the node from which it emanates. In an embodiment, a width of each branch may visually indicate a number of data items associated with the associated branch. For example, branch 1611B is wider than branch 1611A to indicate that a larger number of instances of data items correspond to branch 1611B than correspond to branch 1611A.

Visualization system 115 may visually highlight a prediction path associated with a particular node in response to receiving an indication that a user has selected the particular node. For example, visualization system 115 may prediction path 1620 that includes root node 1601, nodes 1602, 1603, 1604, 1605, and 1606, and terminal node 1607 in response to receiving an indication that a user has selected terminal node 1607. In an embodiment, visualization system 115 may receive an indication that a user has selected a node through any input mechanism known to a person of ordinary skill in the art, including clicking on a node using any kind of mouse, hovering over a node for a predetermined amount of time using any kind of cursor, touching a node using any kind of touch screen, gesturing on a gesture sensitive system, and the like. Prediction path 1620 may be a path from the root node 1601 to the selected particular selected node, e.g., terminal node 1607.

Visualization system 115 may display prediction tree 1600A with a legend 1654 that may display additional information about the nodes and branches in prediction tree 1600A. Legend 1654 may comprise a plurality of boxes, e.g., box 1654A, 1654B, 1654C, and field values, e.g., >21, >355.26, and <=183.05, respectively. Each box and field value, in turn, corresponds to a particular node in prediction tree 1600A. For example, selecting root node 1601 will display box 1654A that indicates the corresponding field as "age." For another example, selecting node 1602 will display box 1654A indicating a field "age" with a split value of ">21" and a box 1654B indicating a field "cement." For yet another example, selecting terminal node 1607 will display box 1654A indicating a field "age" with a split value of ">21," box 1654B indicating a field "cement" with a split value of ">353.26," box 1654C indicating a field "water" with a split value of "<=183.05," box 1654D indicating a field "blast furnace slag" with a split value of "<=170.00," box 1654E indicating a field "cement" with a split value of ">399.40," box 1654F indicating a field "coarse aggregate" with a split value of ">811.50," and a prediction box 1654G indicating a prediction for concrete compressive strength for prediction path 1620 of "64.44."

Visualization system 115 may display legend boxes with a visual characteristic matching the corresponding node, e.g., the cross hatching on box 1654A is the same as that used in root node 1601.

Visualization system 115 may display one or more filtering or pruning mechanisms 1670A, 1670B, and 1670C in which to filter or prune prediction tree 1600A based on various predictive outcomes. Filtering mechanisms 1670A, 1670B, and 1670C are shown as graphical sliders that can be manipulated to show only those nodes and branches associated with particular predictive outcomes. For example, filtering mechanism 1670A is shown as a support slider to show all nodes and branches having data support between 0.19% and 7.09%, filtering mechanism 1670B is an output slider to show all nodes and branches that support compressive strength output between 5.13 and 78.84, and filtering mechanism 1670C is an expected error slider to show the expected error in the compressive strength output between 0.21 and 28.98. Note that in circumstances where the objective field is a categorical field, filtering mechanism 1670C is a confidence level slider to show a confidence level percentage in a particular categorical outcome. Filtering mechanisms 1670A, 1670B, and 1670C may be in any form capable of receiving input for values that may filter or prune prediction tree 1600A.

Visualization system 115 may display a tree visualization icon 1680 and a sunburst visualization icon 1690 that may be used to switch between display of prediction tree 1600A and sunburst 1700 (FIG. 17).

Figure 16B:
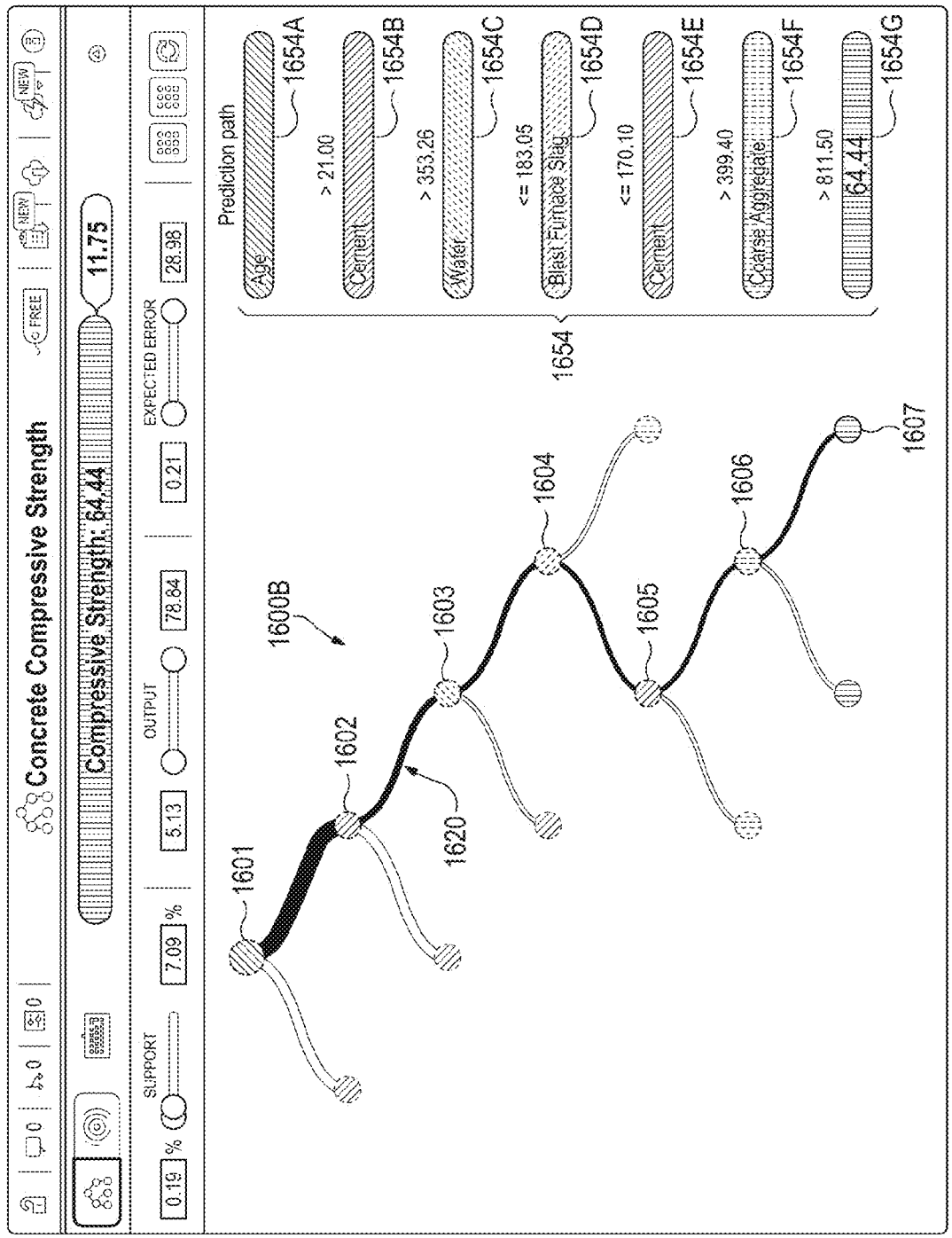
FIG. 16B is an embodiment of a pruned prediction tree according to the present invention.

FIG. 16B is an embodiment of a pruned prediction tree 1600B according to the present invention. Referring to FIG. 16B, visualization system 115 may receive an indication of a user selecting a particular node, e.g., terminal node 1607. In response, visualization system 115 may redraw, re-render, or otherwise redisplay prediction tree 1600A as pruned prediction tree 1600B in which nodes and branches that are not associated with prediction path 1620 from terminal node 1607 to root node 1601 are hidden or otherwise not visible to improve analysis of prediction tree 1600A. Visualization system 115 may resize pruned prediction tree 1600B such that it occupies a substantial portion of the display area. Visualization system 115 may additionally display legend 1654 including boxes 1654A-1654G corresponding to root node 1601, nodes 1602, 1603, 1604, 1605, and 1606, and terminal node 1607 of pruned prediction tree 1600B.

Figure 16C:
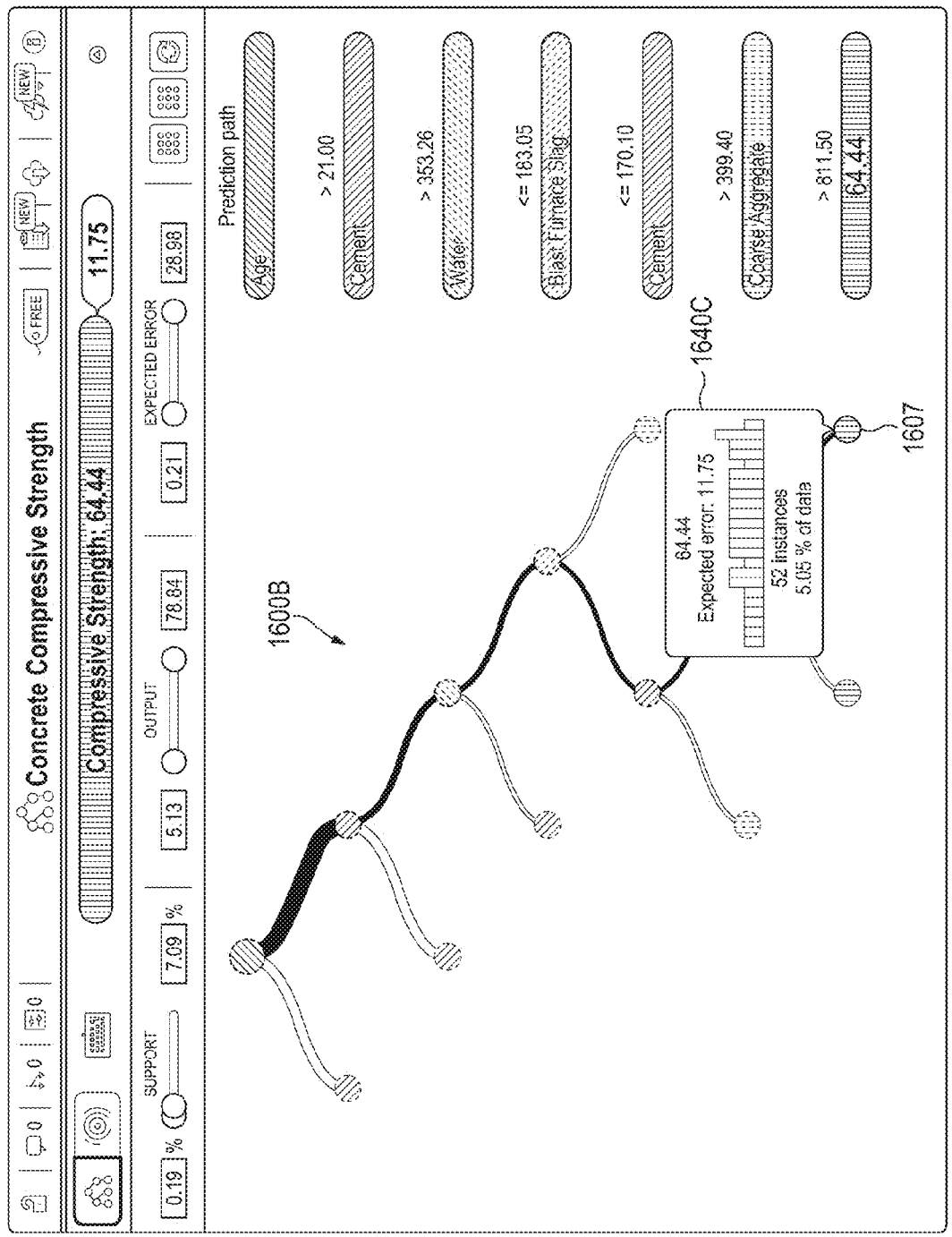
FIG. 16C is an embodiment of the pruned prediction tree shown in FIG. 16B showing a pop up window according to the present invention.

Further in response to receiving an indication of a user selecting a particular node, e.g., terminal node 1607, visualization system 115 may display a pop up window 1640C as shown in FIG. 16C. Pop up window 1640C may display information associated with terminal node 1607, e.g., predicted value (i.e., compressive strength), expected error, histogram of data item instances, number of instances, and a percentage of data represented by the number of instances.

Figure 16D:
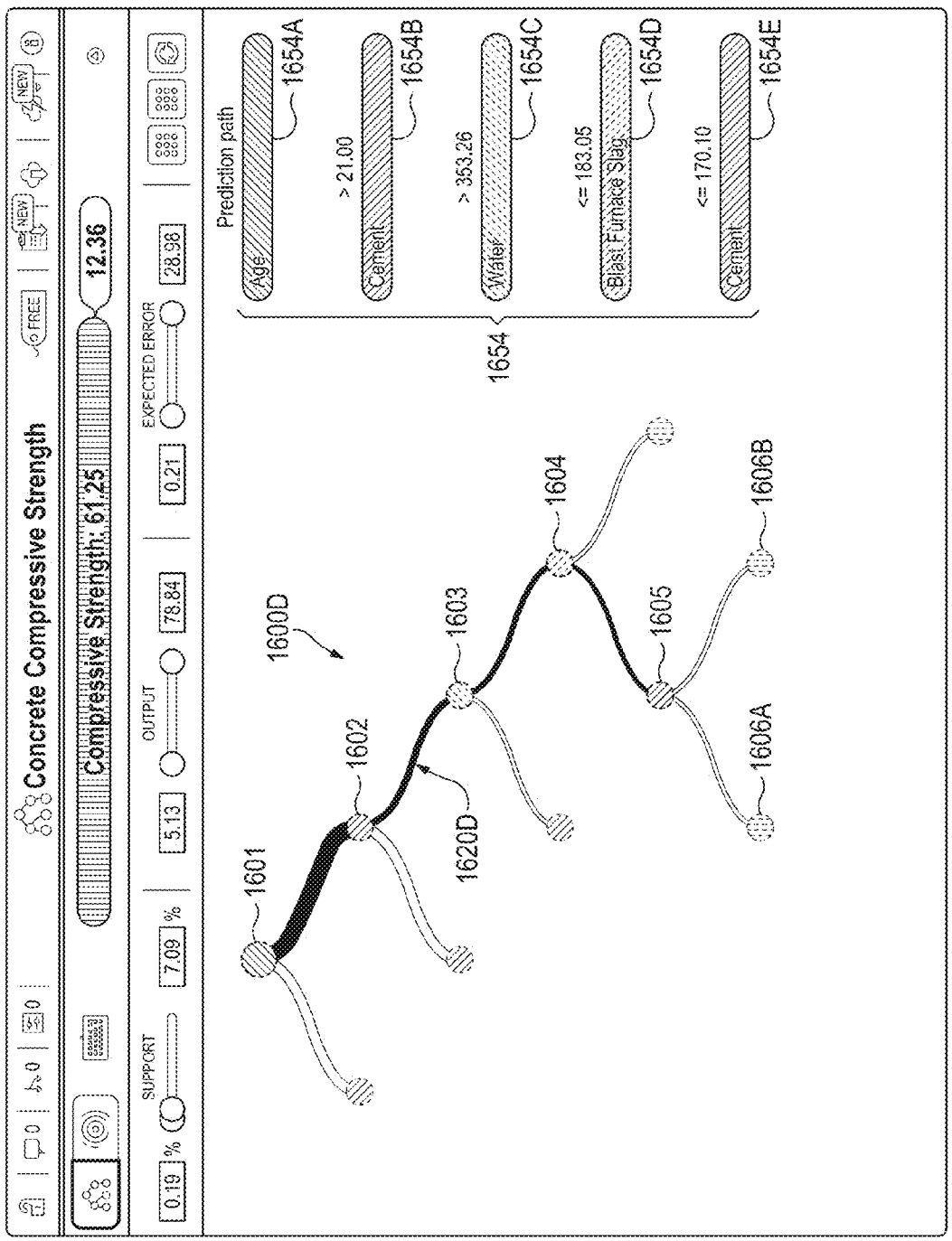
FIG. 16D is an embodiment of a further pruned prediction tree according to the present invention.

FIG. 16D is an embodiment of a further pruned prediction tree 1600D according to the present invention. Referring to FIG. 16D, visualization system 115 may receive an indication of a user's selection of a particular node, e.g., node 1605. In response, visualization system 115 may redraw, re-render, or otherwise redisplay pruned prediction tree 1600B as further pruned prediction tree 1600D in which nodes and branches that are not associated with a prediction path 1620D from node 1605 (and optionally child nodes 1606A and 1606B) to root node 1601 are hidden or otherwise not visible. Visualization system 115 may resize further pruned prediction tree 1600D relative to pruned prediction tree 1600A or pruned prediction tree 1600B such that it occupies a substantial portion of the display area. Visualization system 115 may additionally display legend 1654 including boxes 1654A-1654E corresponding to root node 1601, nodes 1602, 1603, 1604, 1605, 1606A, and 1606B of pruned prediction tree 1600D.

Figure 16E:
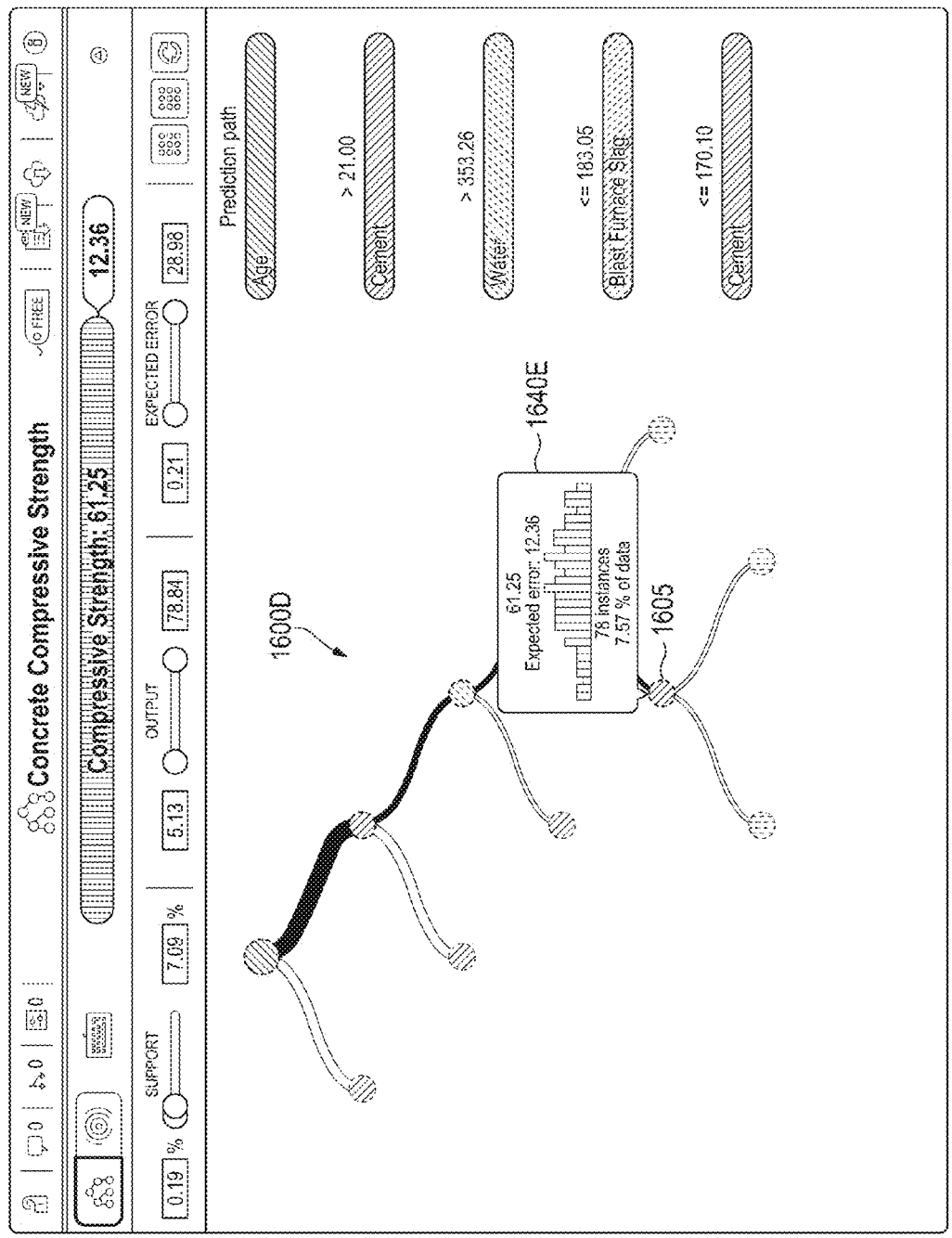
FIG. 16E is an embodiment of the further pruned prediction tree shown in FIG. 16D showing a pop up window according to the present invention.

Further in response to receiving an indication of a user's selection of a particular node, e.g., node 1605, visualization system 115 may display a pop up window 1640E as shown in FIG. 16E. Pop up window 1640E may display information associated with a selected node, e.g., node 1605. Pop up window 1640E may display information, e.g., predicted value (i.e., compressive strength), expected error, histogram of data item instances, number of instances, and a percentage of data represented by the number of instances.

Figure 16F:
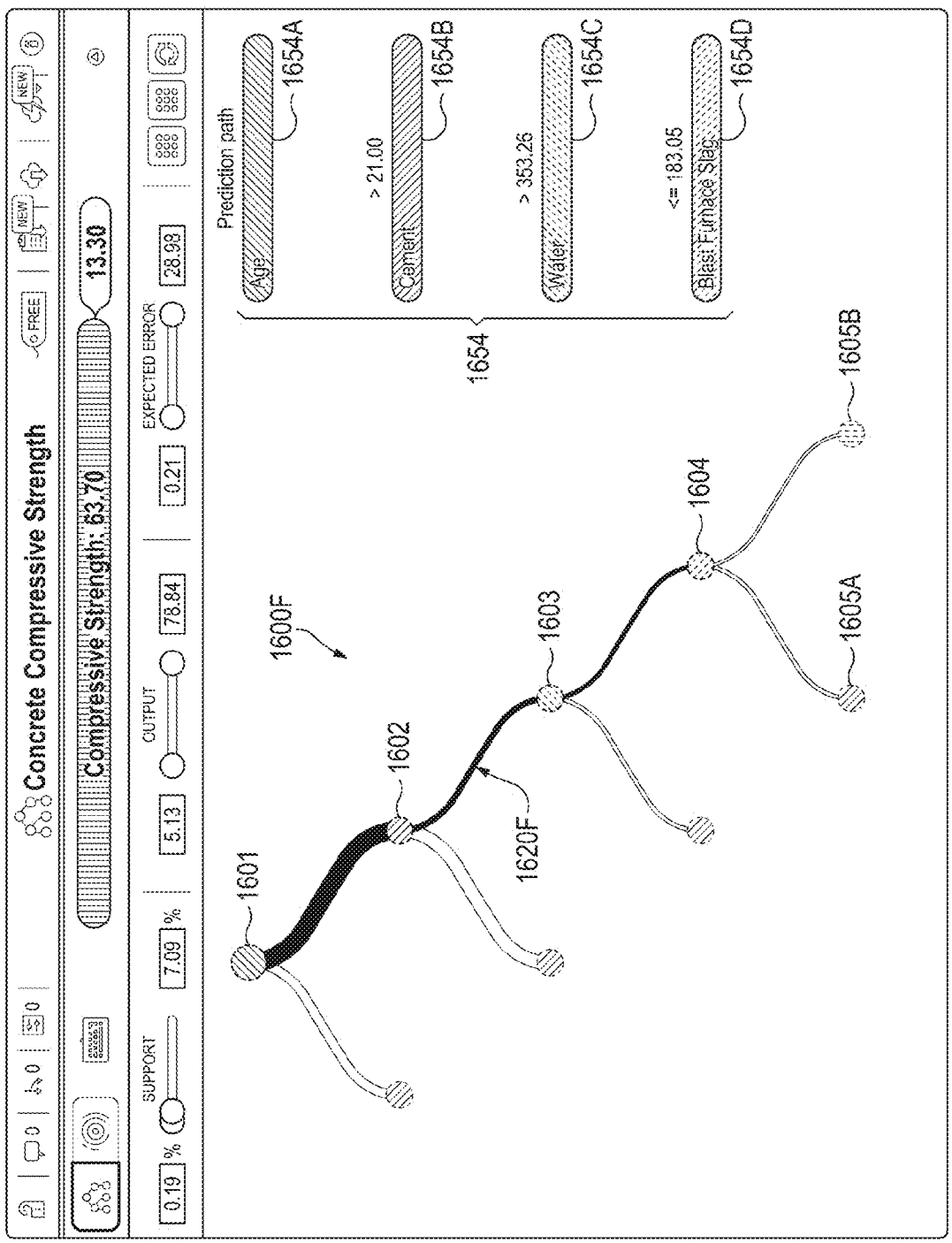
FIG. 16F is an embodiment of an even further pruned prediction tree according to the present invention.

FIG. 16F is an embodiment of a further pruned prediction tree 1600F according to the present invention. Referring to FIG. 16F, visualization system 115 may receive an indication of a user's selection of a particular node, e.g., node 1604. In response, visualization system 115 may redraw, re-render, or otherwise redisplay pruned prediction tree 1600D as further pruned prediction tree 1600F in which nodes and branches that are not associated with a prediction path 1620F from node 1604 (and optionally child nodes 1605A and 1605B) to root node 1601 are hidden or otherwise not visible. Visualization system 115 may resize further pruned prediction tree 1600F relative to prediction tree 1600A or pruned prediction trees 1600B or 1600D such that it occupies a substantial portion of the display area. Visualization system 115 may additionally display legend 1654 including boxes 1654A-1654D corresponding to root node 1601, nodes 1602, 1603, 1604, 1605A, and 1605B of pruned prediction tree 1600D.

Figure 16G:
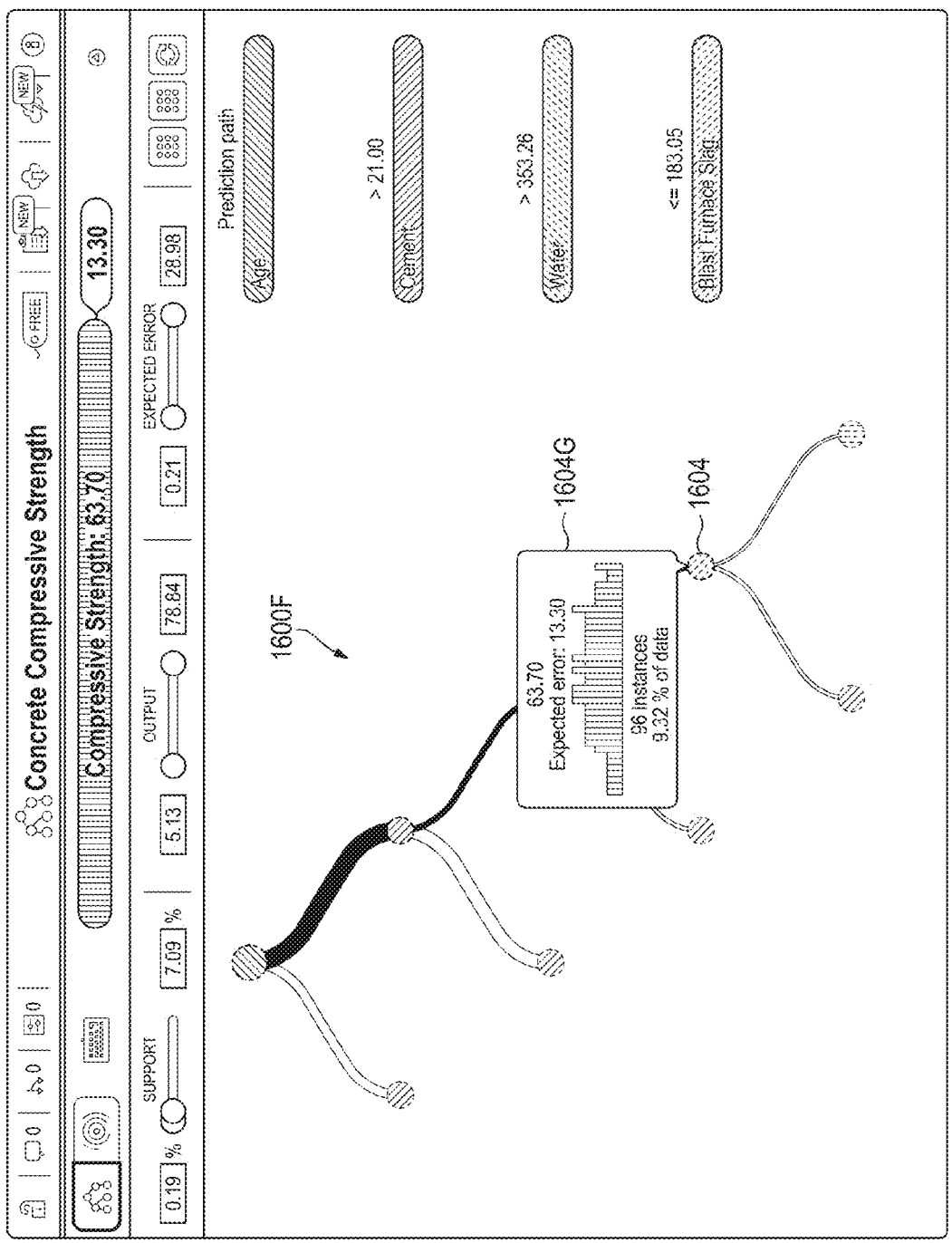
FIG. 16G is an embodiment of the even further pruned decision tree shown in FIG. 16F showing a pop up window according to the present invention.

Further in response to receiving an indication of selection of a particular node, e.g., node 1604, visualization system 115 may display a pop up window 1640G as shown in FIG. 16G. Pop up window 1640G may display information associated with a selected node, e.g., node 1604. Pop up window 1640G may display information, e.g., predicted value (i.e., compressive strength), expected error, histogram of data item instances, number of instances, and a percentage of data represented by the number of instances.

Figure 17A:
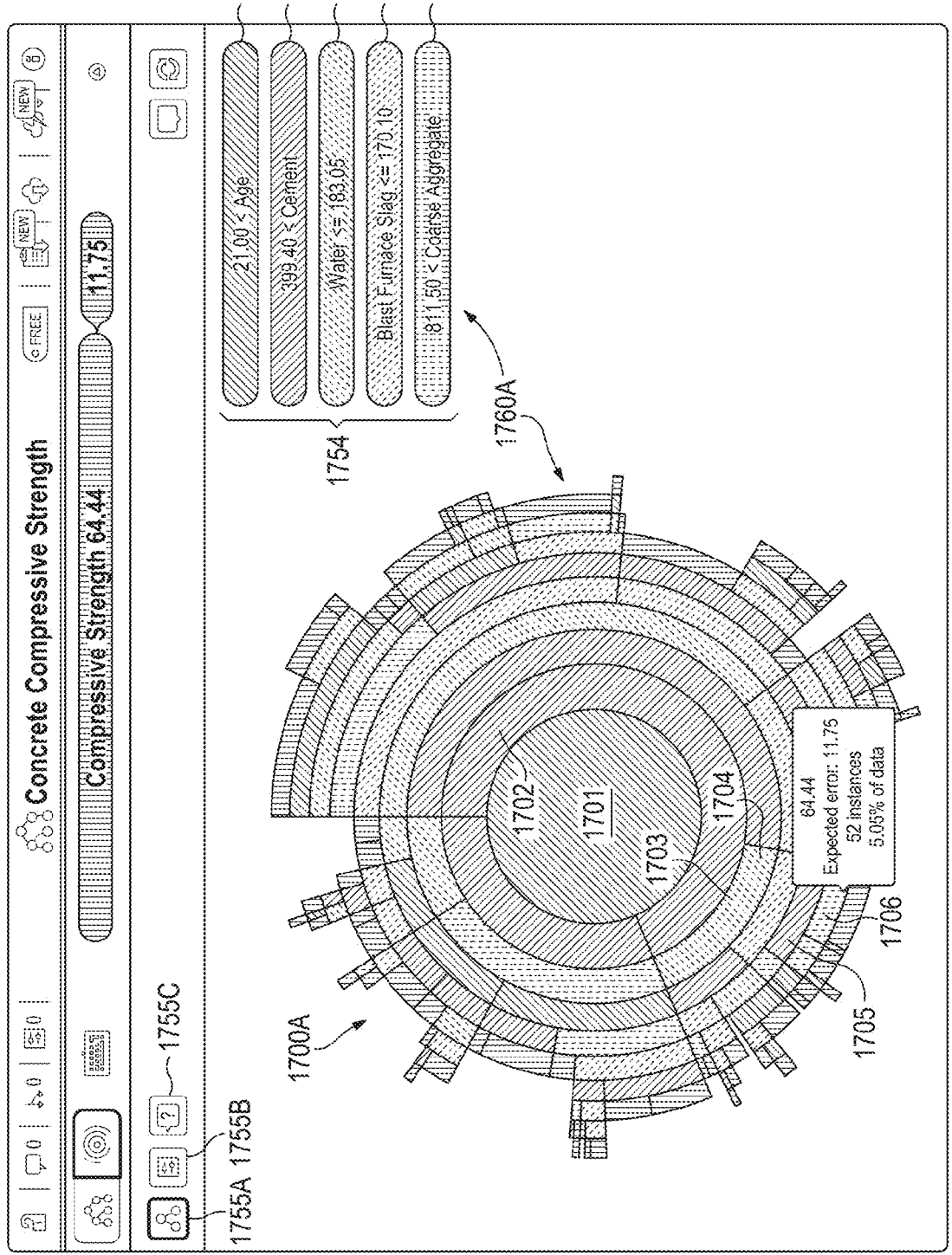
FIG. 17A is an embodiment of a split field sunburst according to the present invention.

FIG. 17A is an embodiment of a split field sunburst visualization according to the present invention. A sunburst is a space-filling graphical visualization that is an alternative to displaying large datasets as trees with nodes and branches. It is termed space-filling to denote the visualization's use of space on a display or otherwise to represent the distribution of attributes in hierarchical data.

In a sunburst, fields of data items in a hierarchy are laid out as radial segments, with the top of the hierarchy shown as a center segment and deeper levels shown as segments farther away from the center segment. The angle swept out by a segment may correspond to an attribute of the dataset and a color of a segment may correspond to another attribute of the dataset.

Referring to FIG. 17A, split field sunburst 1700A comprises a plurality of segments, e.g., a center segment 1701 and segments 1702, 1703, 1704, 1705, and 1706 arranged radially around center segment 1701. Sunburst 1700A may have a binary structure meaning that at most, two segments emanate from each (parent) segment in the hierarchy. Each segment in sunburst 1700 may have an associated width to represent the hierarchy in the dataset. For example, the wider segments are closer to center segment 1701 and are thus higher up in the hierarchy.

Sunburst 1700A may have an associated color scheme 1760A that comprises an arrangement of visual characteristics applied to the plurality of segments in response to a type of sunburst visualization. Visual characteristics may comprise color, cross-hatching, and any other characteristic capable of visually distinguishing one segment from another or one type of sunburst from another. Each segment may have a particular visual characteristic in the arrangement depending on a type of information to be graphically conveyed with the particular visual characteristic.

The type of sunburst visualization may comprise split field, prediction, or confidence (or expected error for numerical field values) and may be selected using split field icon 1755A, prediction icon 1755C, or confidence/expected error icon 1755B, respectively. Legend 1754 may display fields and/or values of each segment. Legend may include boxes, e.g., boxes 1754A-E that reflect the color scheme 1760A applied to sunburst 1700A. For example, box 1754A displays field ("age") and value (">21") information corresponding to center segment 1701 and box 1754B displays field ("cement") and value (">399.40") information corresponding to segment 1702, and so on.

Sunburst 1700A is a split field sunburst where color scheme 1760A may include an arrangement of colors (indicated as cross-hatching in FIG. 17A) to indicate fields in the dataset. Each segment in sunburst 1700A may be represented with a particular color in color scheme 1760A.

Figure 17B:
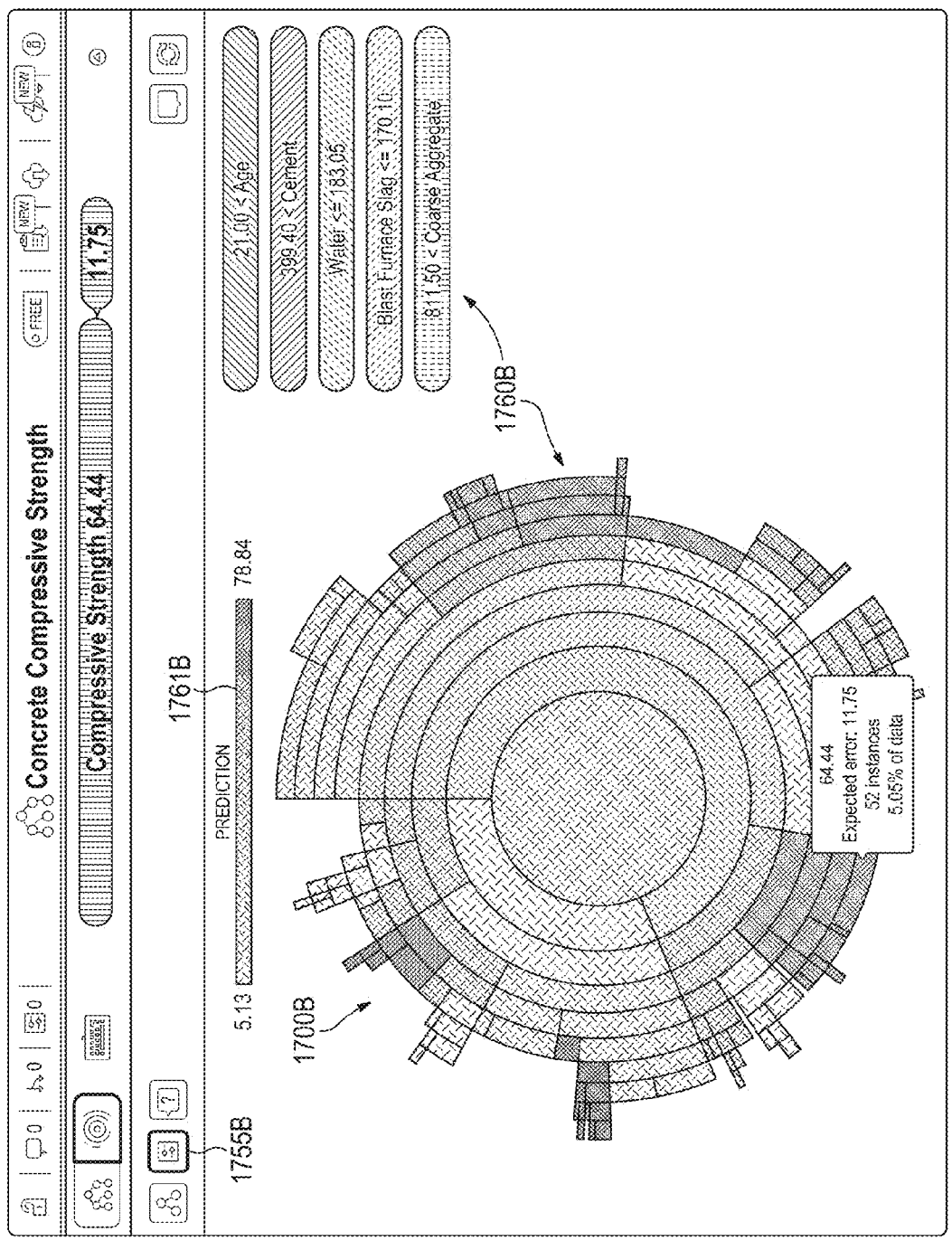
FIG. 17B is an embodiment of a prediction sunburst according to the present invention.
Figure 17C:
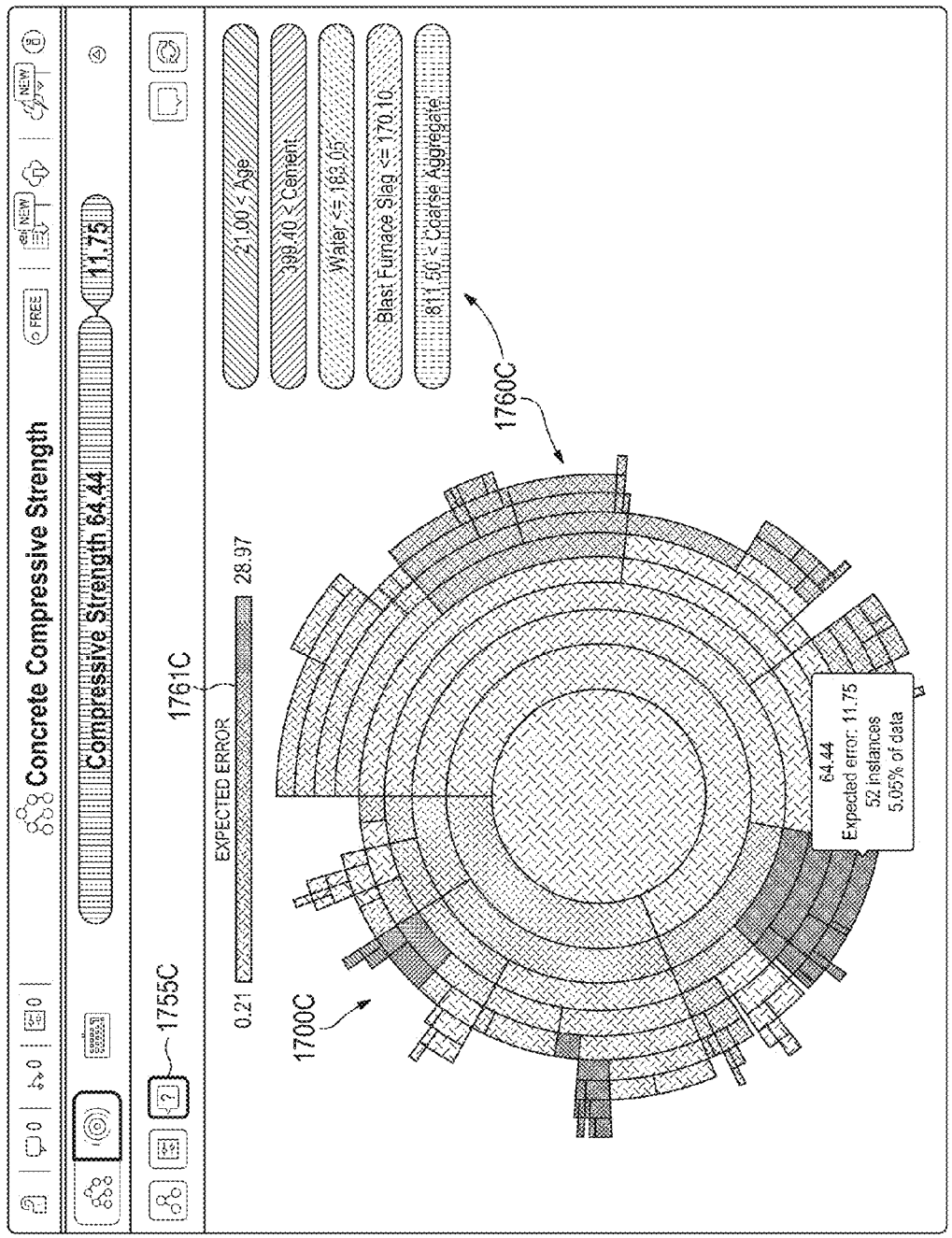
FIG. 17C is an embodiment of an expected error sunburst according to the present invention.

By selecting prediction icon 1755B, visualization system 115 may display a prediction sunburst 1700B with color scheme 1760B as shown in FIG. 17B. By selecting confidence/expected error icon 1755C, visualization system 115 may display a confidence sunburst 1700C with color scheme 1760C as shown in FIG. 17C. Note that the sunbursts 1700A, 1700B, and 1700C have an identical arrangement of segments with a different color scheme 1760A, 1760B, and 1760C to convey different information, e.g., split field values (split field), predictive value (prediction), or confidence level or expected error in the prediction (confidence), respectively. As shown in FIG. 17B, a range of predictive compressive strength is shown in color-coded bar 1761B that is consistent with color scheme 1760B. Similarly in FIG. 17C, an expected error (or conversely, a confidence level in the case of categorical values) is shown in color-coded bar 1761C.

Figure 18A:
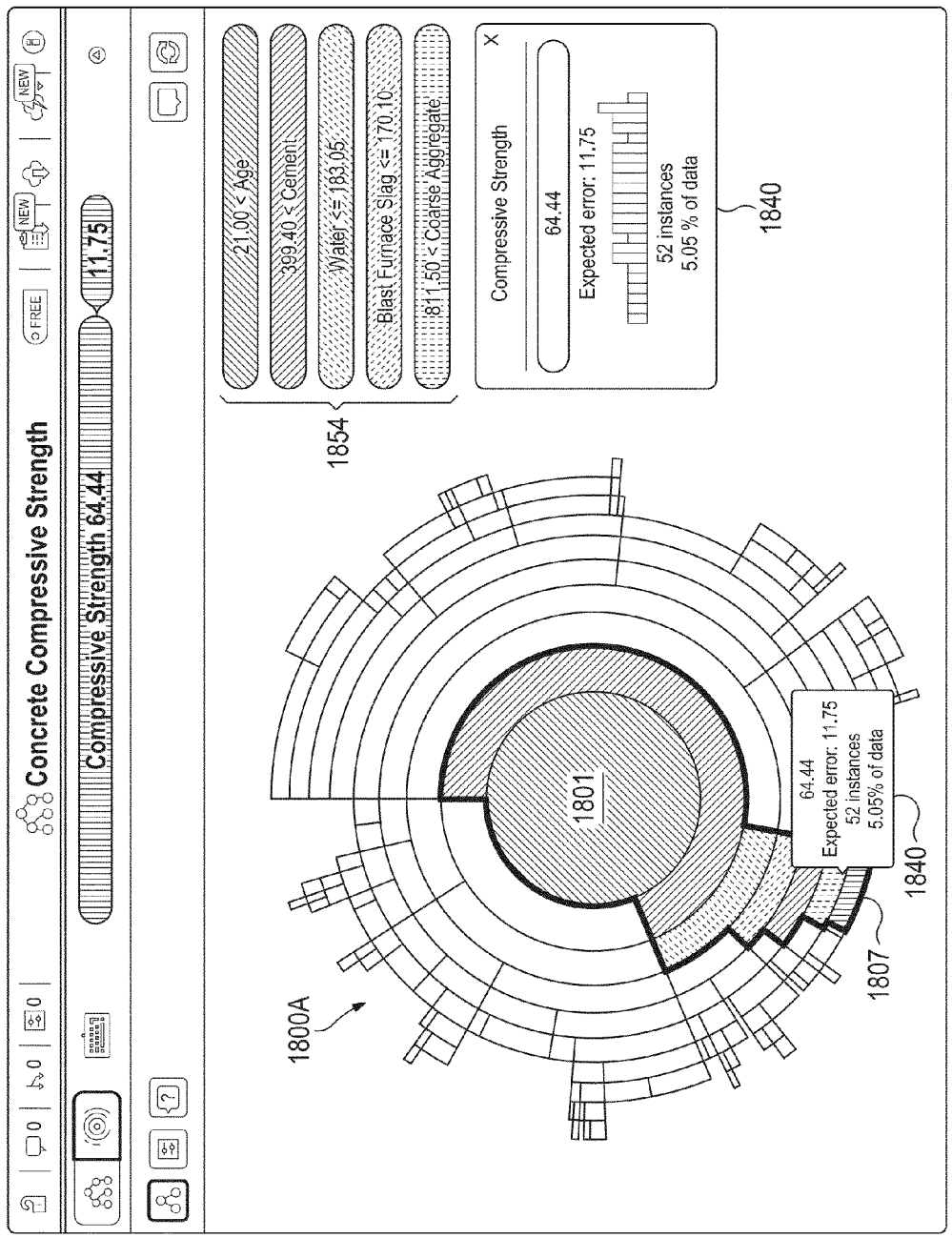
FIG. 18A is an embodiment of a split field showing a highlighted prediction path sunburst according to the present invention.

FIG. 18A is an embodiment of a split field sunburst 1800A according to the present invention. Referring to FIG. 18A, visualization system 115 may receive an indication that a user has selected a particular segment, e.g., segment 1807, on sunburst 1800A. The user may indicate selection of segment 1807 by any means known to a person of ordinary skill in the art including clicking on segment 1807 using any kind of mouse, hovering over segment 1807 for a predetermined amount of time using any kind of cursor, touching segment 1807 as displayed using any kind of touch screen, gesturing over segment 1807, and the like. In response to receiving the indication that the user has selected segment 1807, visualization system 115 may visually highlight a prediction path from center segment 1801 to selected segment 1807. Note that in FIG. 18A, only the prediction path from center segment 1801 to selected segment 1807 is shown with the cross-hatching or colors corresponding to segments within the prediction path but other manners of visual highlighting are encompassed within the invention, including making segments in the prediction path brighter or differently colored relative to other segments. Legend 1854 will likewise change to provide information specific to the selected segment 1807 including showing a pop up window 1840 displaying further information specific to segment 1807 including a predicted value (or category), expected error in the prediction, histogram, number of instances encompassed in the prediction, a percentage that the number of instances encompassing the prediction represents, and the like. Visualization system 115 may display pop up window 1840 in any of a variety of locations including over selected segment 1807 or beneath legend 1854.

Note further that selection of segment 1807 is merely exemplary and any segment of sunburst 1800A may be selected to achieve similar results, i.e., the highlighting of a prediction path between the selected segment and center segment 1801.

Figure 18B:
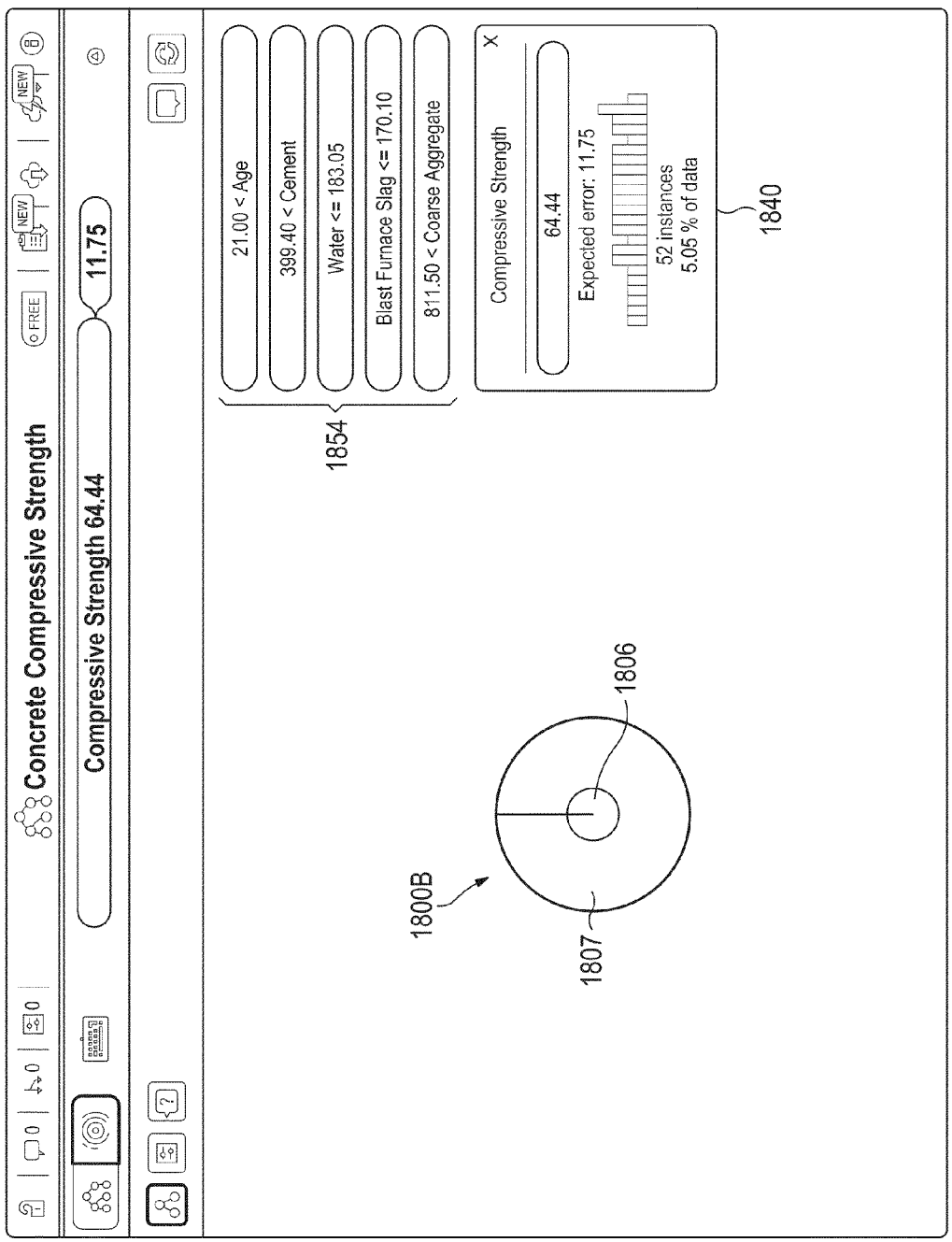
FIG. 18B is an embodiment of a pruned sunburst according to the present invention.

FIG. 18B is an embodiment of a pruned sunburst 1800B. Referring to FIG. 18B, in response to the selection of segment 1807, visualization system 115 may prune, filter, re-render, or redraw sunburst 1800A (shown in FIG. 18A) as pruned (or zoomed in) sunburst 1800B in which is displayed only selected segment 1807 and segment 1806. Note that segment 1806 is a segment one level up on the hierarchy from segment 1807 along the prediction path from segment 1807 to center segment 1801. Note further that visualization system 115 may display segment 1806 as a center segment of sunburst 1800B to enable further re-rendering (zooming out) of sunburst 1800B.

Figure 18C:
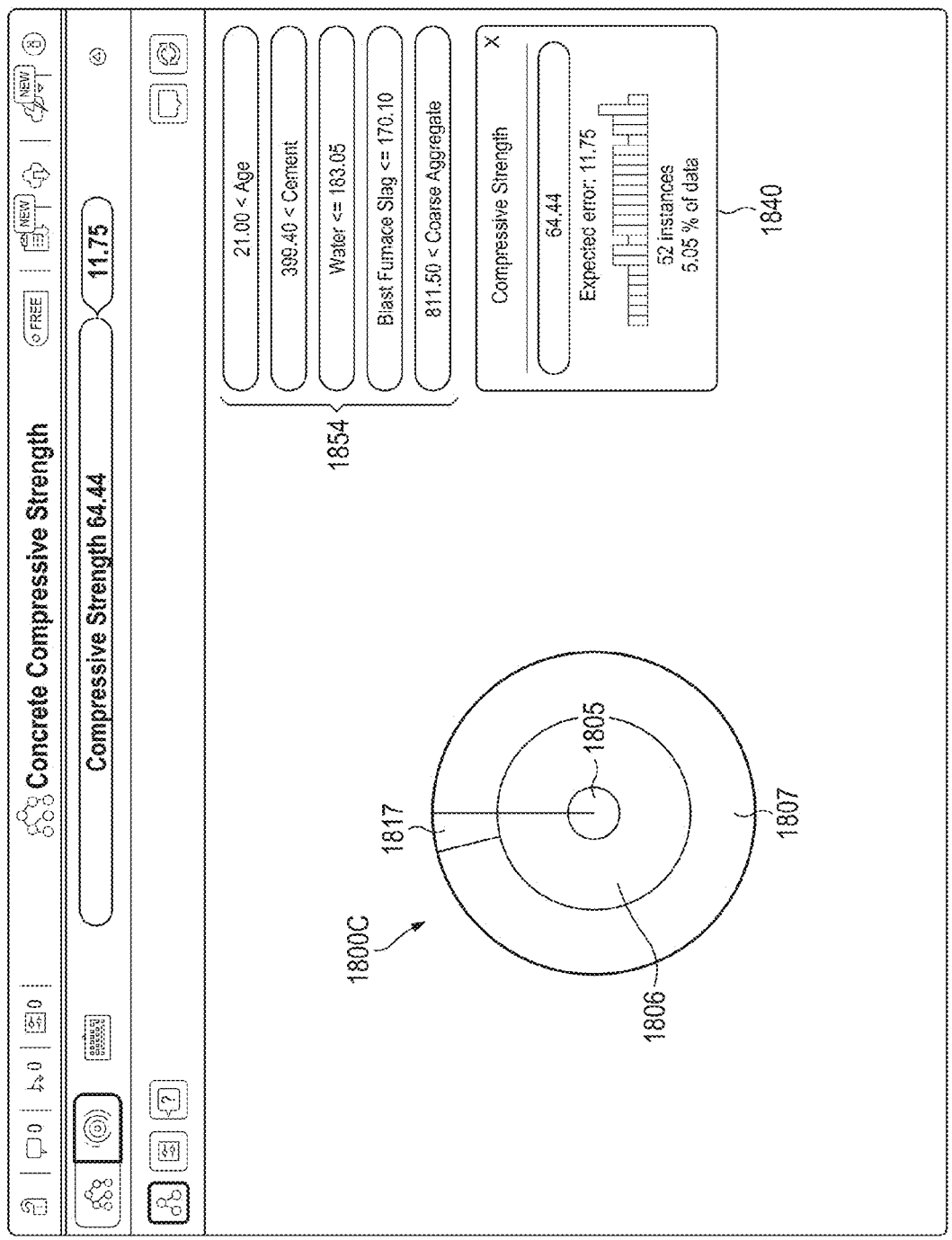
FIG. 18C is an embodiment of another pruned sunburst according to the present invention.

Selection of (center) segment 1806 in sunburst 1800B may result in visualization system 115 re-rendering (zooming out) sunburst 1800B as sunburst 1800C shown in FIG. 18C. Sunburst 1800C comprises segment 1807 and 1817 as outermost segments surrounding segment 1806 and segment 1805. Note that segment 1805 is a segment one level up on the hierarchy from selected segment 1806 along the prediction path from segment 1807 to center segment 1801. Note further that visualization system 115 may display segment 1805 as a center segment of sunburst 1800C to enable further re-rendering (zooming out) of sunburst 1800C.

Figure 18D:
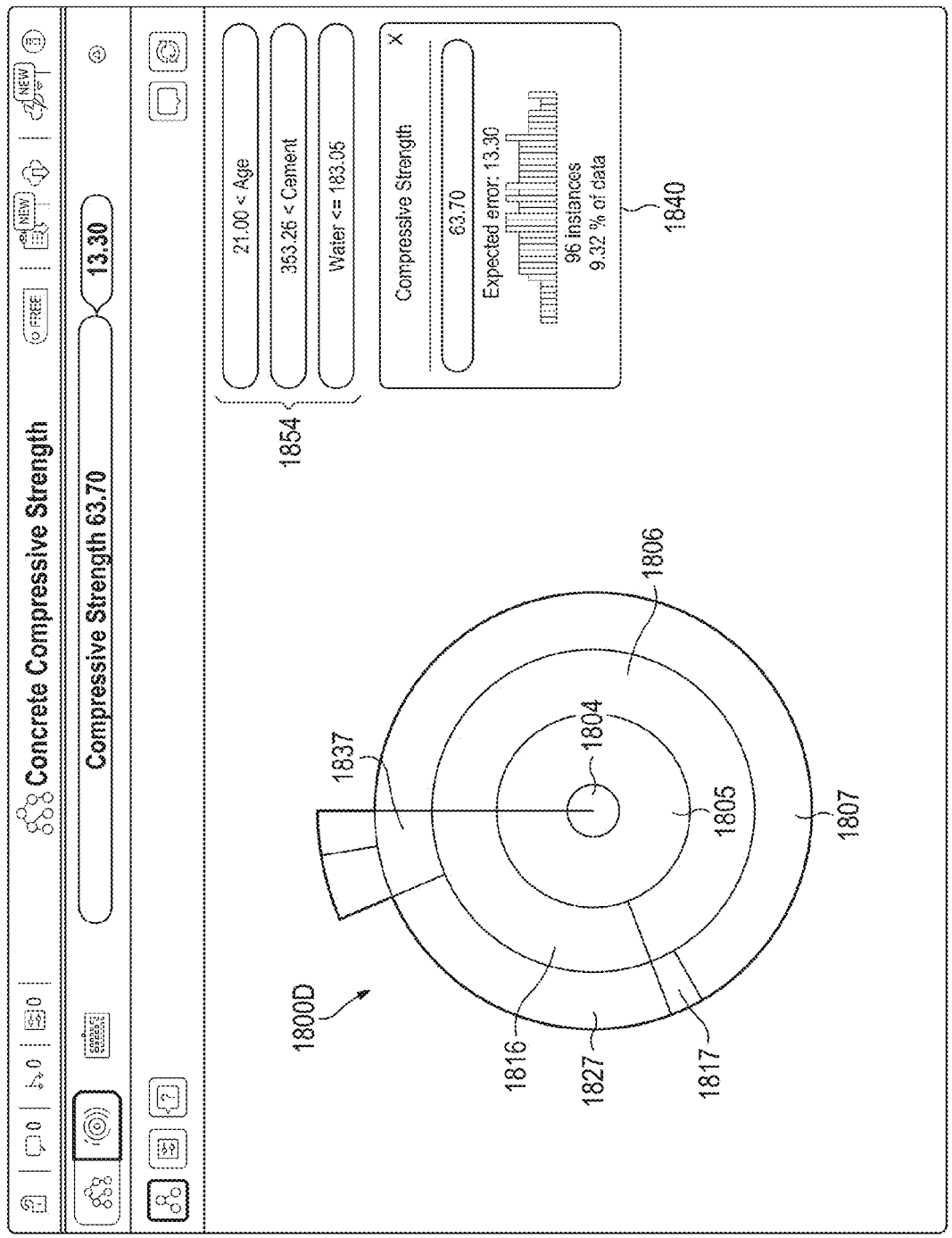
FIG. 18D is an embodiment of yet another pruned sunburst according to the present invention.

Selection of (center) segment 1805 in sunburst 1800C may result in visualization system 115 re-rendering (zooming out) sunburst 1800C as sunburst 1800D shown in FIG. 18D. Sunburst 1800D comprises segment 1807, 1817, 1827, and 1837 as outermost segments surrounding segments 1806, 1816, 1805, and 1804. Note that segment 1804 is a segment one level up on the hierarchy from selected segment 1805 along the prediction path from segment 1807 to center segment 1801. Note further that visualization system 115 may display segment 1804 as a center segment of sunburst 1800D to enable further re-rendering (zooming out) of sunburst 1800D. Generally, selection of a center segment in any sunburst may result in re-rendering (zooming out) of the sunburst with an additional hierarchical level of segments until a full sunburst, e.g., sunburst 1800A, is displayed.

Figure 19:
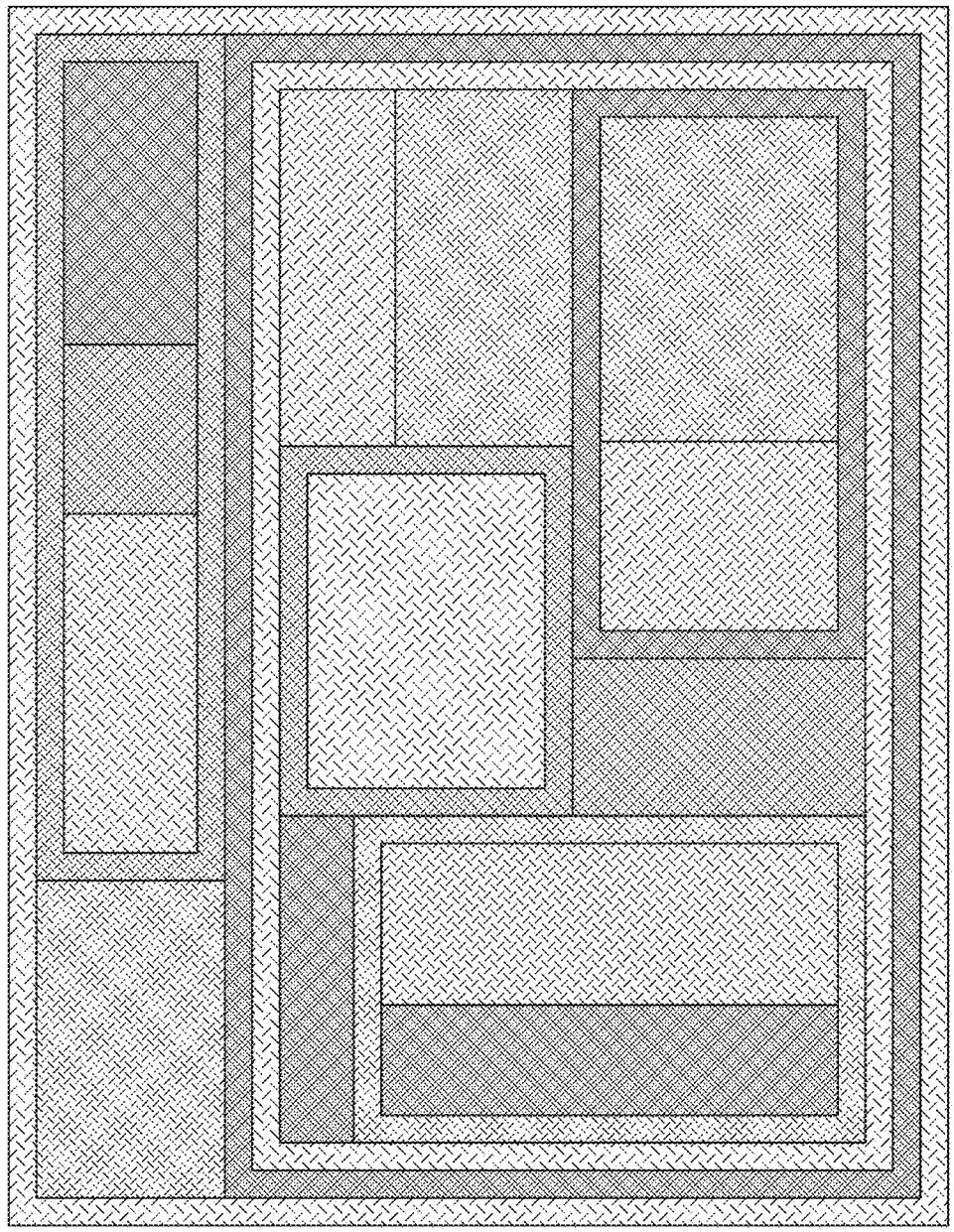
FIG. 19 is an embodiment of a tree map according to the present invention.

FIG. 19 is an embodiment of tree map 1900 according to the present invention. Referring to FIG. 19, tree map 1900 is an alternative space-filling visualization to sunbursts 1700A, 1700B, or 1700C in which hierarchical data may be depicted using nested rectangles. Each branch of the tree is given a rectangle that is tiled with smaller rectangles representing sub branches. Each rectangle may have an area proportional to a first attribute of the data and a color corresponding to a second attribute of the data.

Figure 20:
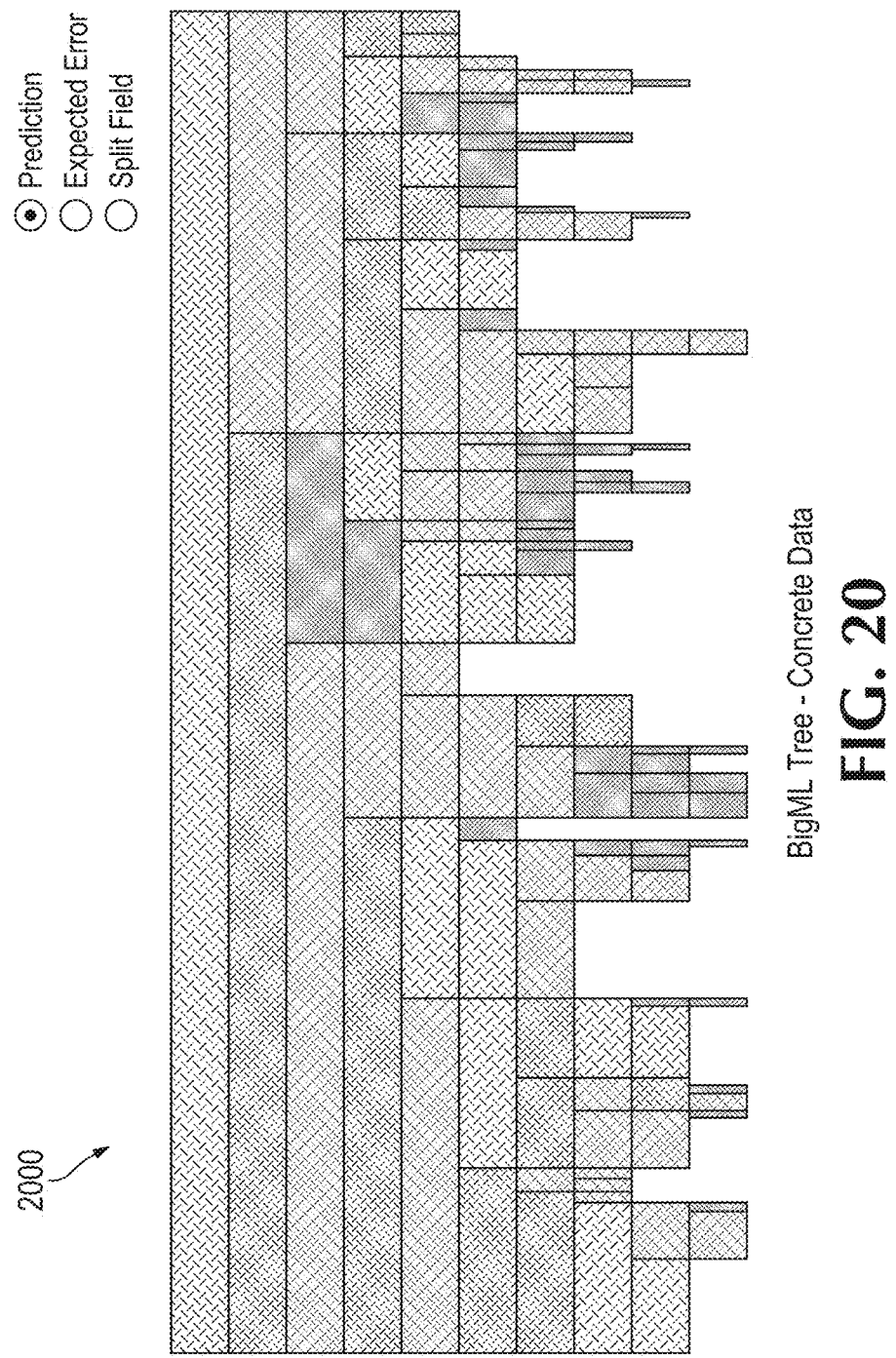
FIG. 20 is an embodiment of an icicle according to the present invention.

FIG. 20 is an embodiment of an icicle 2000 according to the present invention. Referring to FIG. 20, icicle 2000 is another alternative space-filling visualization to sunbursts 1700A, 1700B, or 1700C in which hierarchical data may be depicted as solid bars and their placement relative to adjacent nodes reveals their position in the hierarchy. In icicle 2000, the root node is at the top with child nodes underneath.

Visualization system 115 may generate tree map 1900 or icicle 2000 as well as other like space-filling visualizations instead of sunbursts 1700A, 1700B, or 1700C and may use any space-filling visualization, e.g., sunburst 1700A, 1700B, or 1700C, tree map 1900, or icicle 2000 interchangeably as described herein.

Figure 21:
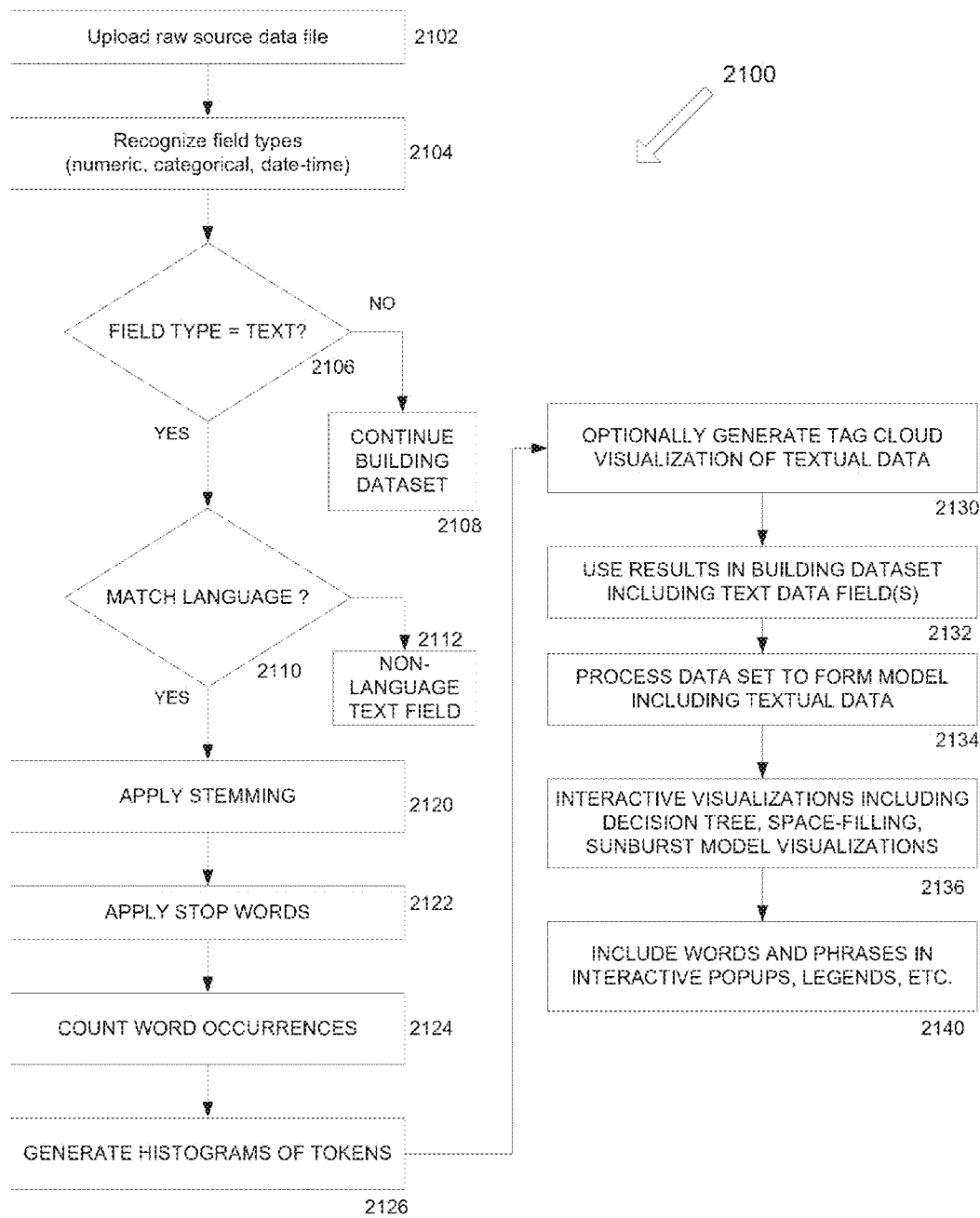
FIG. 21 is a simplified flow diagram of a method for processing raw data, including textual data, for use in generating graphical, interactive visualizations and mathematical models of the data.

FIG. 21 is a simplified flow diagram of a method for processing raw data, including textual data, for use in generating various graphical, interactive visualizations and mathematical models of the data. In the flow diagram 2100, the process begins with importing or uploading a source data file, block 2101. Various file types and formats are known that can be used for this purpose, one example is .csv files. In an embodiment, the process analyzes the source file to determine its format, and recognize field types, block 2104. Preferably, a user may choose fields to ignore in building the dataset, as they may not be helpful in the analysis of interest.

The raw data or "source data" may be processed to form a dataset better suited as input data to create or train a software model of the source data. Part of that process, as noted, is determining a "type" of each data field in the source data; for example, data types may include numeric, integer, categorical, Boolean, etc. Other data types may be used. In some cases, Boolean values may be expressed as integers (0,1) rather than a distinct data type. In the past, text fields have been largely ignored in building datasets. In this description, we discuss how text fields may be processed and used to advantage. A data field may contain text; i.e., actual words, phrases, sentences, or paragraphs in a given language. The text may be encoded in digital form, for example, using ASCII or other known standards.

Referring again to FIG. 21, a field type recognition process determines whether or not a given field in the source data contains text, decision block 2106. If not, processing continues to process other data types, block 2108. If the current field is recognized as containing text, the process attempts to recognize a language of the text, see decision 2110. When processing text fields, in one embodiment, a processor is arranged to first attempt to detect the language of the text. This may be done, for example, by taking a sample of the words (or "tokens") from the text documents and comparing them to dictionaries of various languages (English, Spanish, French, etc.). (Tokens are described below.) The process selects the language which matches the most words in a given sample. If no language matches to a minimum level, the process may designate the data as a non-language text field, block 2112. In the case that the language is recognized, further processing may include the following.

For each language, there may be provided a corresponding stemming algorithm, block 2120. In general, a stemming algorithm may be used to enable our process to take a word (from a text data field) and transform it into the root for the word. For example, an English stemming algorithm would transform the words, "swum", "swam", "swims", and "swimming" into the root "swim". In some embodiments, the stemming process may be customized by a user.

Further, a stop word process, represented by block 2122, may apply a list of "stop words" applicable to the identified language of the text. These are words that are considered relatively meaningless for machine learning purposes such as "of", "a", "the", etc. In some embodiments, the stop word process may be customized by a user, for example, to include or exclude selected words from the stop list. Other refinements may be used, such a distinguishing lower and upper case letters, or not. These and other options may be implemented by user controls (not shown). Another refinement of a tokenization process may elect to use only single words as tokens, or to also allow "full terms" that comprise multiple words, such as city names San Francisco, Mountain View and Little Harbor on the Hillsboro. Some full terms may be hyphenated, for example, Lauderdale-by-the-Sea, FL. In some embodiments, known abbreviations and acronyms may be expanded in appropriate cases.

Preferably, after the stemming and stop word processes, and/or other tokenization steps, an embodiment of process 2100 may count the occurrences of each resulting/remaining word, also called a token, at block 2124. These word occurrence counts may be presented in the form of histograms in a visual summary of a dataset, illustrated below. Block 2126 represents a sub-process of generating histograms of tokens. The word counts may be presented visually in a "tag cloud" graphic, an optional but powerful visualization tool illustrated later, see block 2130. In an embodiment, a user may select a word in the cloud (by click, hover, touch, etc.) and the number of occurrences of the selected word may be displayed, for example, in a popup.

The foregoing processes may be used to build a dataset from the source data, including text data fields, block 2132. The dataset may then be used in building a model of the source data, process block 2134. The resulting model may be presented as a decision tree. When building decision trees, our process may use the word occurrences (token counts) as possible splits, indicated as nodes in a decision tree. The process tests whether a particular word's presence is correlated with a desired prediction or result. If it is, we may choose it as a split. Illustrative examples are given below. Thus users can now factor text into their predictive models, alongside regression, time/date and categorical information. This feature is ideal for building models where text content may play a prominent role (e.g., social media or customer service logs). Further, powerful, interactive visualizations may be provided to users for studying datasets that include textual data. A given dataset and corresponding model may incorporate various combinations of different field types, including text fields.

Finally, FIG. 21 indicates the use of words and phrases in various visualizations including, without limitation, decision tree, space-filling, and sunburst visualizations, block 2136, although these steps are not strictly part of processing raw data to form datasets. Further, words (tokens) may be used in various interactive displays and pop-ups, as further illustrated below, to improve interactive, user-friendly analysis and visualization of data, even from large datasets or "big data."

Big data is an all-encompassing term for any collection of data sets so large and complex that it becomes difficult to process using traditional data processing applications. The challenges include analysis, capture, curation, search, sharing, storage, transfer, visualization, and privacy violations. The trend to larger data sets is due to the additional information derivable from analysis of a single large set of related data, as compared to separate smaller sets with the same total amount of data, allowing correlations to be found to "spot business trends, prevent diseases, combat crime and so on."

Big data is difficult to work with using most relational database management systems and desktop statistics and visualization packages, requiring instead "massively parallel software running on tens, hundreds, or even thousands of servers". What is considered "big data" varies depending on the capabilities of the organization managing the set, and on the capabilities of the applications that are traditionally used to process and analyze the data set in its domain. Big Data is a moving target; what is considered to be "Big" today will not be so years ahead. "For some organizations, facing hundreds of gigabytes of data for the first time may trigger a need to reconsider data management options. For others, it may take tens or hundreds of terabytes before data size becomes a significant consideration." See http://en.wikipedia.org/wiki/Big_data#

Figure 22A:
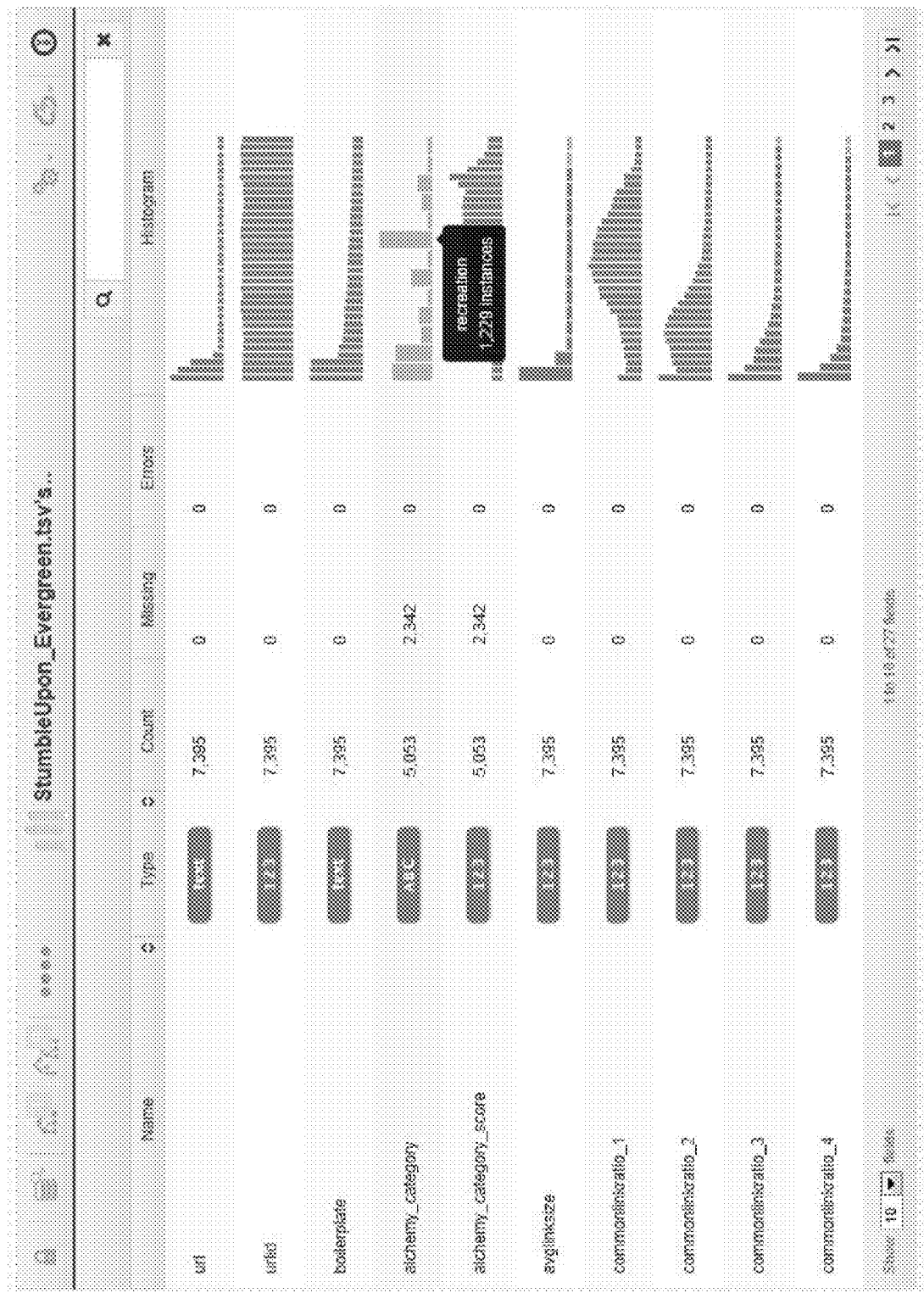
FIG. 22A is an embodiment of a graphical, interactive summary display of a web site dataset including textual data.

FIG. 22A shows an embodiment of a graphical, interactive summary display of a web site dataset including textual data. Here, the source data is a collection of data about some 7,395 web sites. The actual source data comes from an on-line competition called the Stumble Upon Evergreen Classification Challenge, in which 625 teams competed for a $5,000 prize in 2013. The data set can be accessed at kaggle.com. The goal was to build classifier to classify a web site as either evergreen (1) or non-evergreen (0). These are the possible values in the objective field called label. The training set comprised 7,395 urls.

In FIG. 22A, a screen display comprises a generally tabular presentation, the presentation including a series of rows and columns of information. Each row corresponds to one of the data fields of the data; for example, the rows are labeled in the first column (Name) as url, urlid, boilerplate, alchemy_category, etc. This figure actually displays only one of three pages or screens of information, showing 1 to 10 of 27 fields, as indicated at the bottom. More details of the dataset can be found on the web at https://www.kaggle.com/c/stumbleupon/data but a few fields are sufficient for purposes of illustration. As indicated along the headings, the rows preferably may be sorted by name or data type responsive to user input.

The next column (Type) lists the corresponding data type for each row or field, the types may include, without limitation, text, numeric ("123"), and categorical ("ABC") data types. The third column from the left (Count) may list a number of instances of source data having the corresponding data field. In most cases here, all of the 7,395 instances include all of the data fields of interest. However, in some cases the corresponding field may be absent; the column labeled (Missing) may be used to list the number of such instances, for example, in the field (row) alchemy_category, this column shows 2,342 instances missing, which accounts for the lower total count of 5,053. Further, a number of fields having errors may be listed in another column, as shown.

The right column in FIG. 22A (the column order is not critical) displays histograms of instance values for each field. Each vertical bar in a histogram indicates by its height a relative number of instances having a corresponding value in that field, for example, in the alchemy_category row, one can observe that there are 13 possible category values, each shown as a corresponding vertical bar, although other graphical representations may be used.

The display of FIG. 22A may be interactive in various respects. Preferably the display is responsive to user input, which may take various forms, including without limitation voice, touch, mouse hover, mouse or touch panel click, keyboard strokes, etc. For example, hovering over one of the type icons, say "ABC" would invoke a pop-up explanation ("categorical"). As another example, a user may select one of the bars in a histogram. This too may invoke a pop-up with more information. In the drawing, the user selected or hovered over the eighth bar from the left in the alchemy_category field histogram. This selection triggered a pop-up showing the corresponding category (recreation) and the number of instances of that category in the dataset (1,229). In numeric fields, the histograms reflect numeric values, with each bar of column corresponding to a range of values.

Figure 22B:
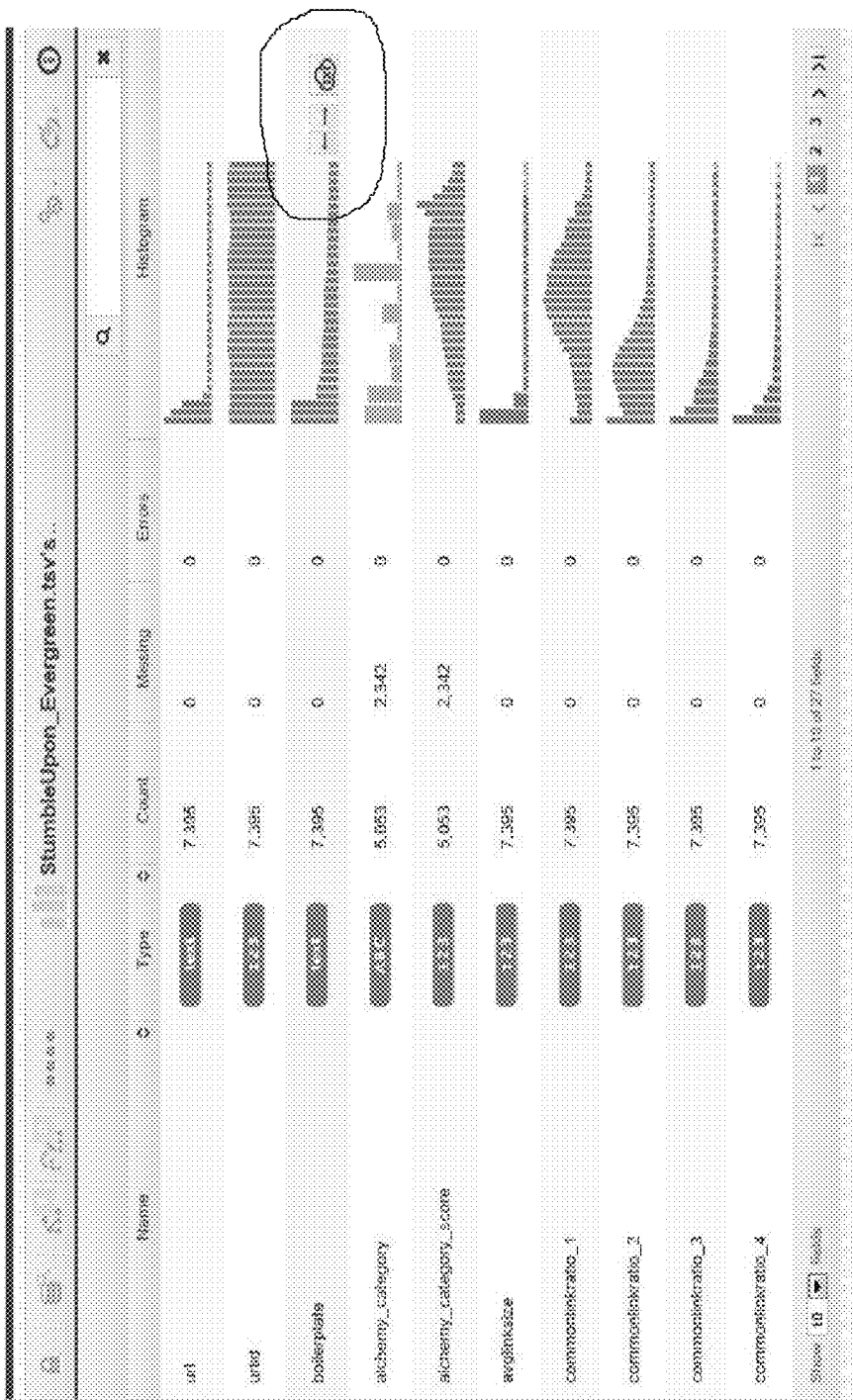
FIG. 22B is another view of the display of FIG. 22A illustrating additional controls for visualizing textual data.

FIG. 22B is another instance of the display of FIG. 22A. Here, the user selected or hovered over the boilerplate row. This may be indicated by highlighting or by a color change over that row. In addition, selection of this row resulted in additional controls appearing adjacent to the histogram, indicated with a circle in the figure. These controls may disappear when the boilerplate row is no longer selected, in order to keep the display uncluttered. These additional controls may be provided in connection with text fields. In some cases, the number of words or tokens reflected in the histogram may exceed a number of bars reasonably of reasonable size. Reasonable size here may mean a size that enables a user to select one of the bars to obtain additional information, as described with regard to FIG. 22A (the recreation category pop-up). In such a case, left and right arrow controls may be provided generally as shown, and may be used to interactively "slide" the histogram horizontally, responsive to user input, to display additional bars.

Figure 22C:
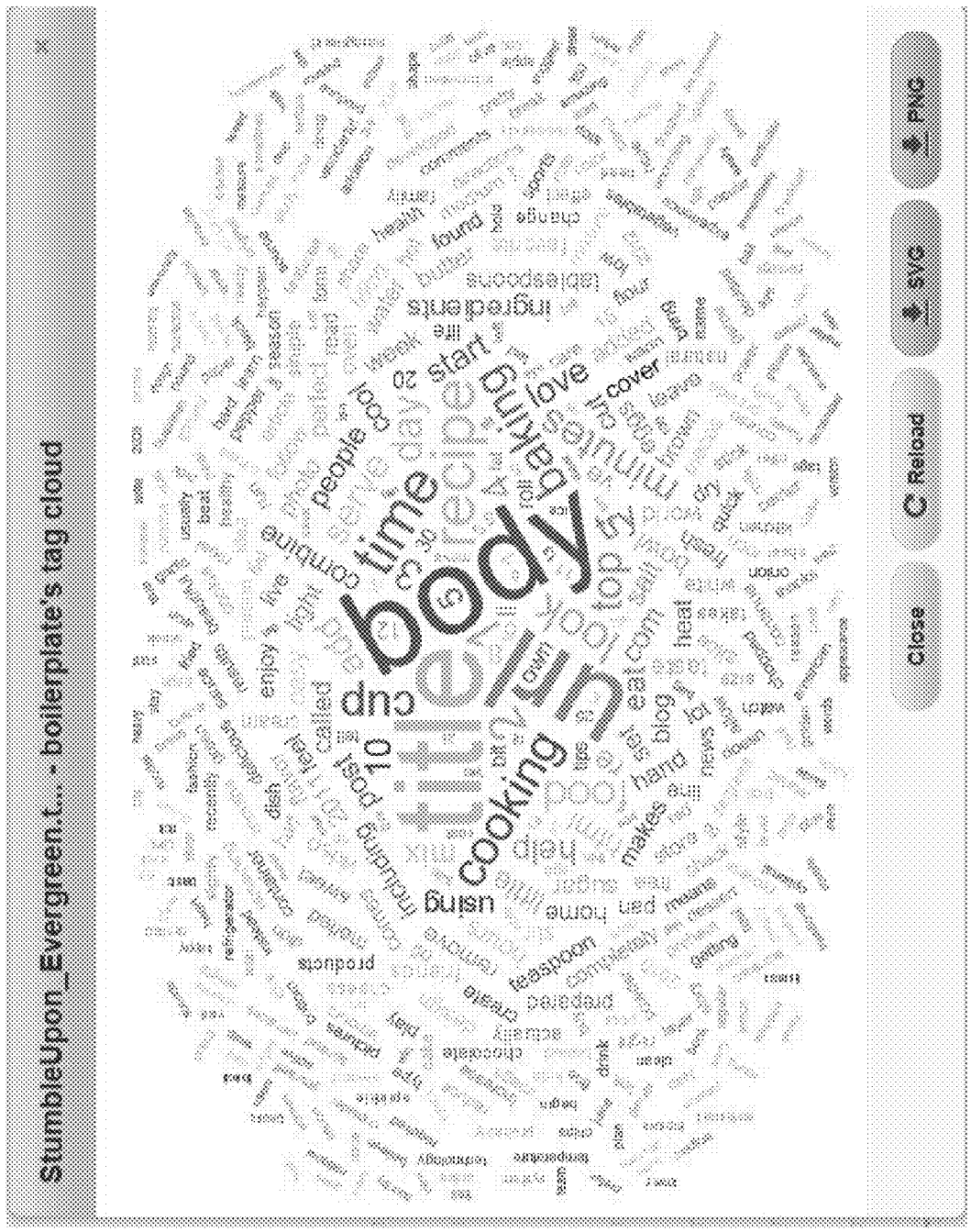
FIG. 22C is an example of a tag cloud displayed in response to user input at the tag cloud control of FIG. 22B.

Referring again to FIG. 22B, another control may take the form of a button, illustrated in this case with the indication "TXT" (representing text) in a cloud. User activation of this button can be used to display a graphic tag cloud representing the words or tokens that occur in this field in the dataset. FIG. 22C shows an embodiment of such a tag cloud for the boilerplate field. In one example, the relative frequency or occurrence count of a word or token may be reflected by the size of the font used to display the word. In addition or alternatively, the occurrence count may affect placement of the word in the tag cloud, for example, with more commonly occurring words displayed near the center. Further, in some embodiments, type colors may be used to help distinguish the words in the tag cloud display. In an embodiment the words may be arranged in a circular or oval collection around a centroid. Finally, buttons or other controls may be provided to enable a user to easily export or save the tag cloud graphic. For example, see the PNG button with a downward arrow for downloading the graphic as a png picture file. All of these interactive graphics are intended to assist a user in "seeing" and analyzing a dataset by readily exploring the most important, common or influential aspects of the data.

Figure 23:
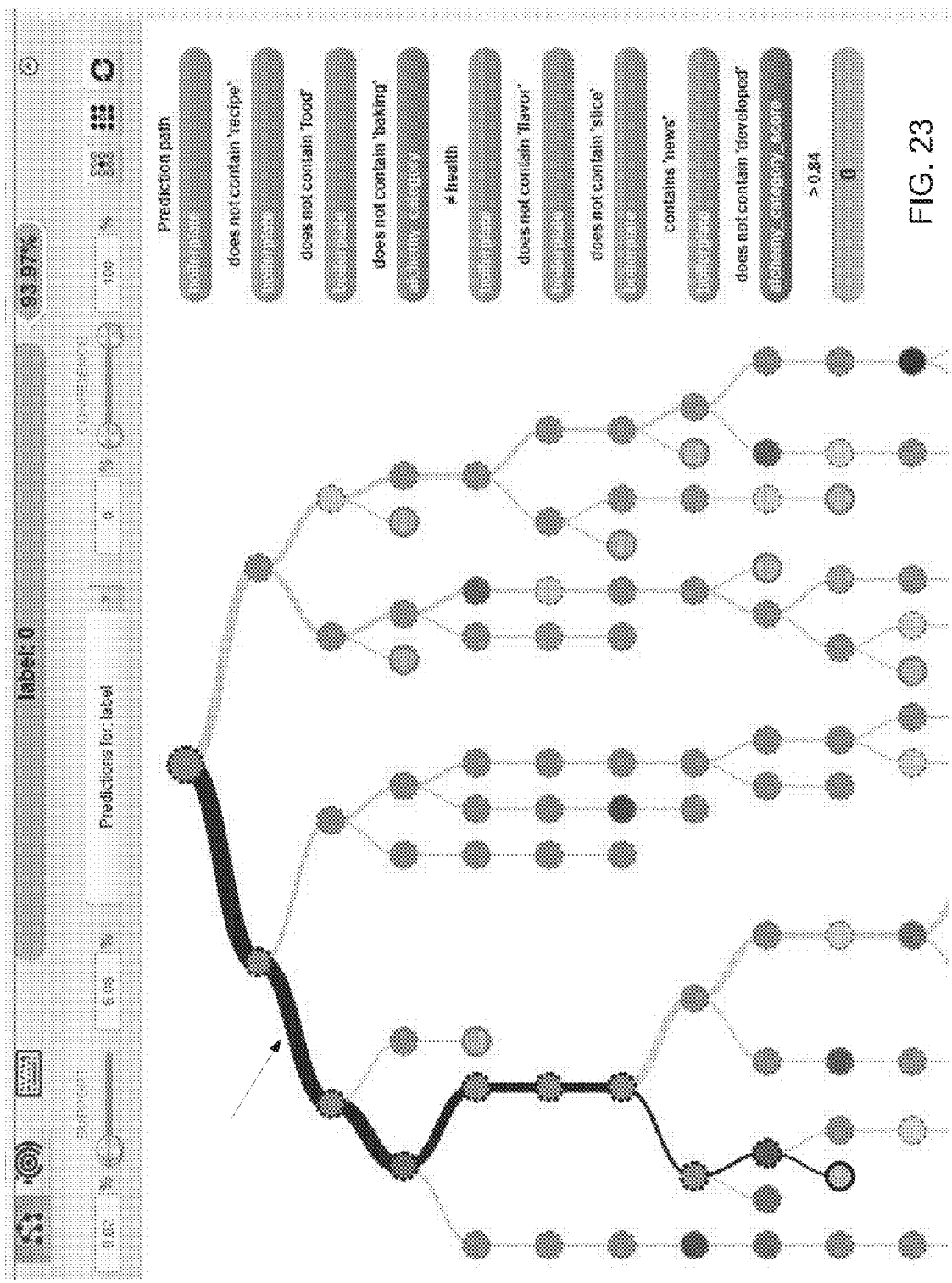
FIG. 23 is an embodiment of a graphical, interactive decision tree based on the dataset of FIG. 22A showing predictions for objective field label value=0, with a selected prediction path highlighted by user input.

FIG. 23 is an embodiment of a graphical, interactive decision tree display of a model based on the dataset of FIG. 22A, showing predictions for the objective field "label" value=0; as noted above this indicates a non-evergreen web site. (The actual display extends below the bottom of this figure.) Here, a prediction path, selected by user input, is highlighted with darker color than the other paths (and indicated by an arrow added to the drawing in the upper left). This prediction path ends at a terminal node—one where the model has sufficient information to reach a conclusion. As discussed earlier, a legend to the right side of the display shows the fields, and corresponding values, of the selected prediction path. In a preferred embodiment, each node of the tree is colored to indicate the field that is used to "split" the data at that node, further identified in the legend at the right in the same color, for easy reference. The legend, at the bottom, shows the objective conclusion label=0, again indicating a non-evergreen website, one likely to have only near term value or traffic.

In this example, the text field boilerplate is very influential in the prediction; it can be seen that the first three nodes in this path all turn on values in this text field. Those questions or criteria are that the boilerplate field does not contain "recipe," and does not contain "food," and does not contain "baking." At the top of the display, it indicates the confidence of the prediction, 93.97%.

Figure 24:
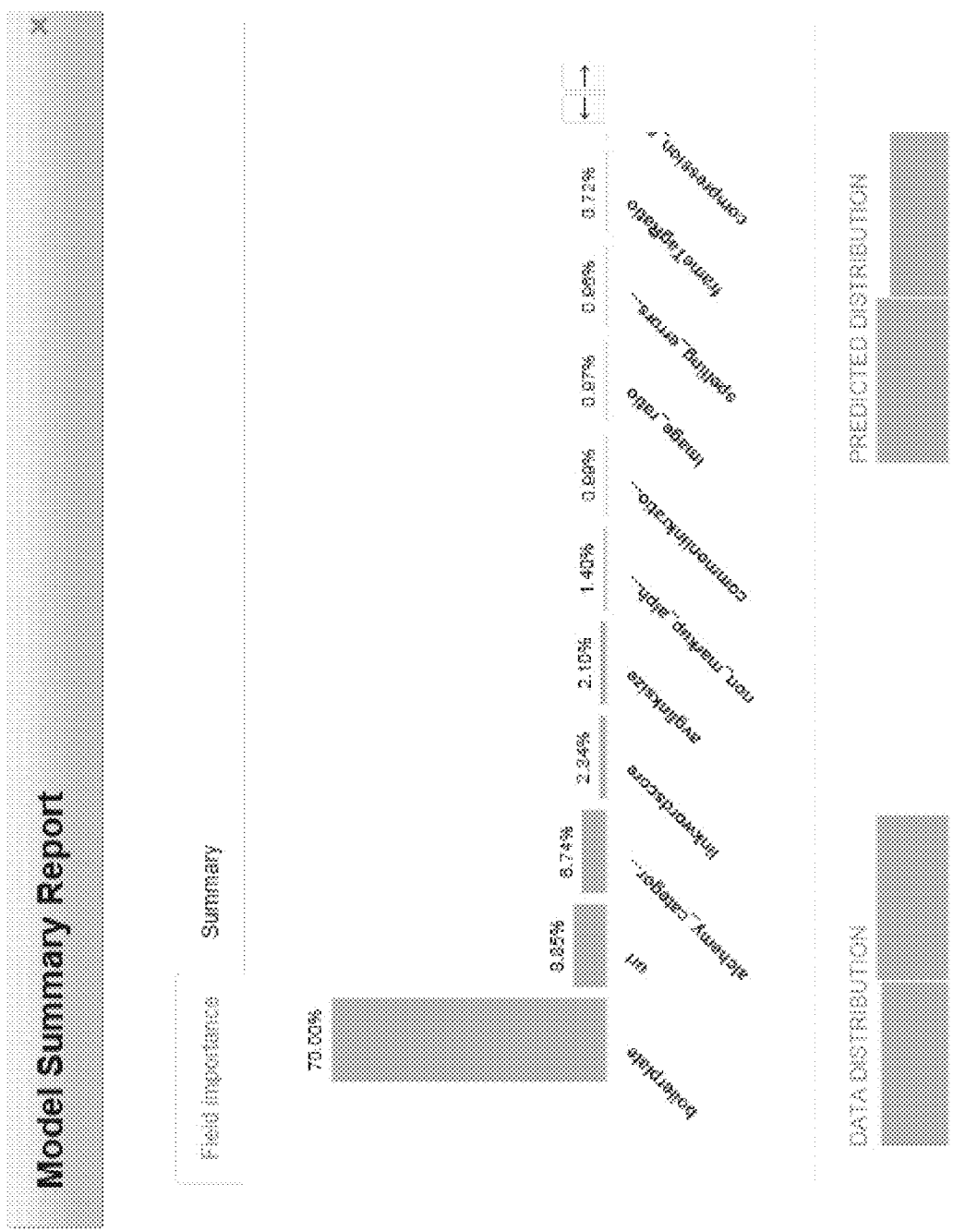
FIG. 24 shows an embodiment of a model summary report display for visualizing the relative importance of data fields in the decision tree of FIG. 23.

FIG. 24 is an embodiment of a model summary' report. This display may be invoked by user input. It shows graphically, for example, in a histogram, the relative importance of each field in the dataset. This shows in another form the relative importance of the boilerplate field, namely 70%, in making the subject prediction. Here again, arrow buttons may be provided as illustrated to enable sliding the histogram horizontally to enable a user to easily view more bars (fields) as desired. This report is another example of enabling a user to interact in an easy, intuitive interface to better understand even large sets of data ("Big data") although the method and processes disclosed herein may be used with smaller datasets as well. The model summary report may also include, as illustrated in the lower left, a histogram of the objective field data distribution. In this case, the objective field, ("label") has only two categories, and the dataset is roughly evenly distributed between them. A histogram of the predicted distribution may be shown as well.

Figure 25:
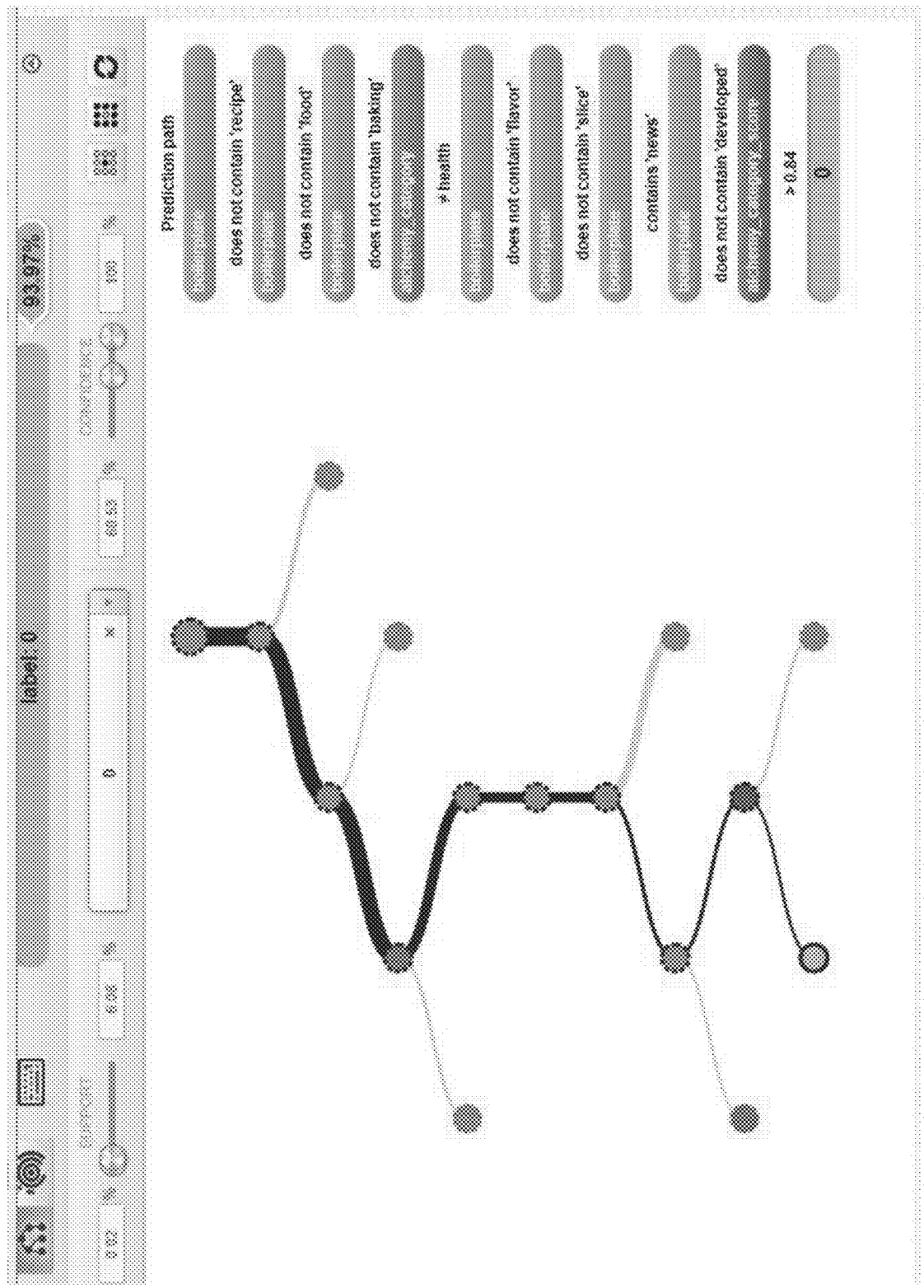
FIG. 25 illustrates one embodiment of a pruned and redrawn portion of the decision tree of FIG. 23, focused on the selected prediction path.

FIG. 25 illustrates one embodiment of a pruned and redrawn portion of the decision tree of FIG. 23, focused on the selected prediction path. Here, the selected prediction path of FIG. 23 is redrawn, larger in size, to utilize a majority of the available display area. Further, the other paths that are not selected in FIG. 23 are omitted from this display, making it very easy to study. The legend on the right is unchanged, as this is the same prediction path that was selected previously. In this way, user input may be used to select and "zoom in" to any desired decision path. In a preferred embodiment, a transition from the display of FIG. 23 to that of FIG. 25 is animated to plainly inform the user of what is being observed.

Figure 26:
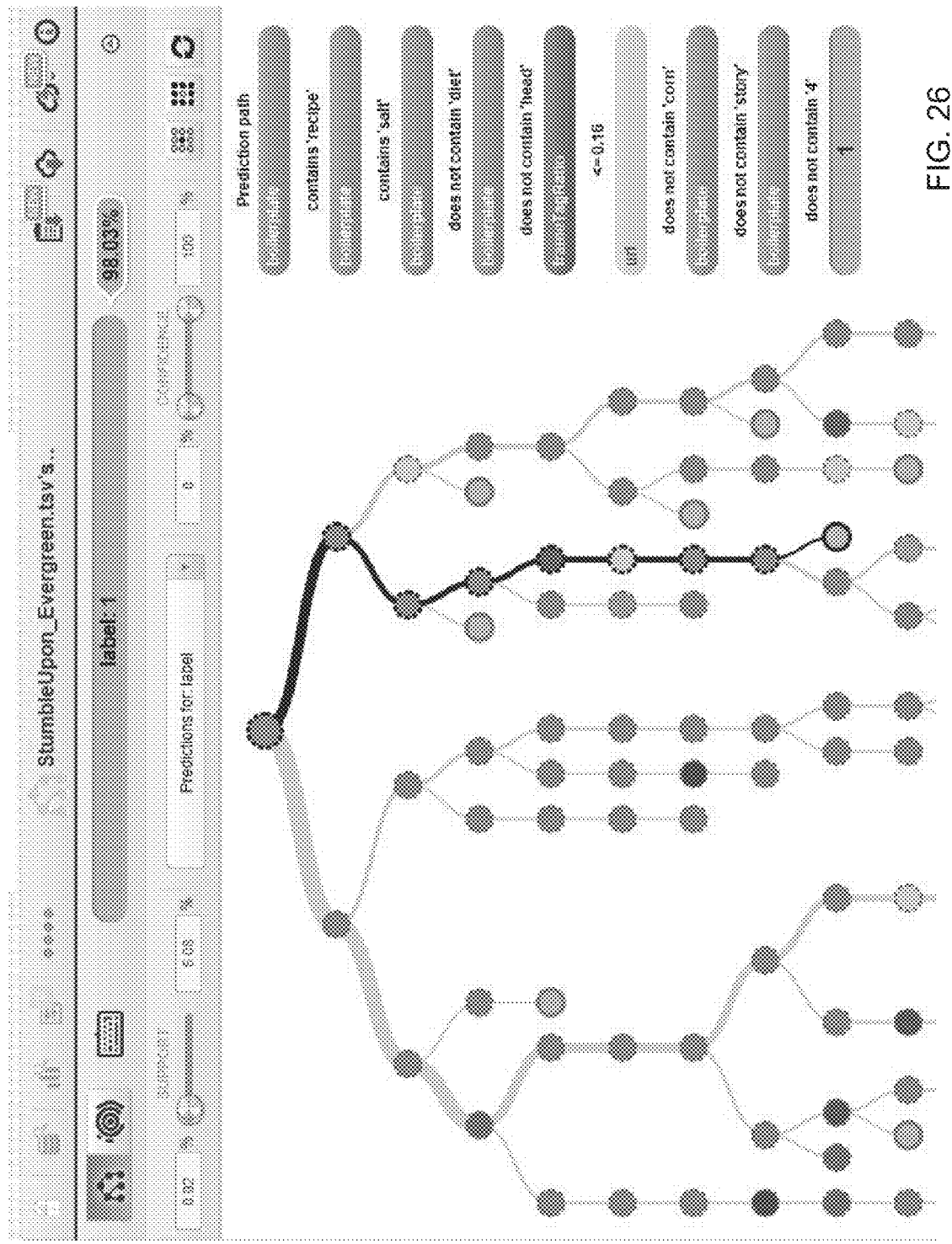
FIG. 26 is an embodiment of a graphical, interactive decision tree based on the dataset of FIG. 22A showing predictions for objective field label value=1.

FIG. 26 is another embodiment of a graphical, interactive decision tree based on the dataset of FIG. 22A, here showing predictions for objective field "label" value=1. Recall this corresponds to an "evergreen" web site, one determined by users as having lasting relevance or value. Here, a prediction path is highlighted once again, having been selected by user input. For this path, the result has a confidence value of 98.03% as shown at the top of the display. It should be noted that, in a preferred embodiment, the decision tree is sized to roughly fill the available display area. This may require automatic resizing as the tree is varied by user input, for example, changes in the support or confidence levels. These may be selected, in one embodiment, by sliders as illustrated in the drawing. Or a user may enter the desired values of support and or confidence directly into the % boxes provided.

In this display example, the tree actually extends further downward, off the drawing figure. However, the tree may be automatically sized to fit within the available width of the display. It can be scrolled vertically so the user can inspect the entire tree. Preferably, the visualization process automatically resizes and redraws the decision tree, or other representation, responsive to the user inputs such as selection of a particular path, confidence level, etc. all to maintain a clear and intuitive visualization of the data. In this display, the selected path again is substantially influence by the boilerplate text field as it determines the first four decision nodes. Compare this to the FIG. 24 model summary report.

Figure 31:
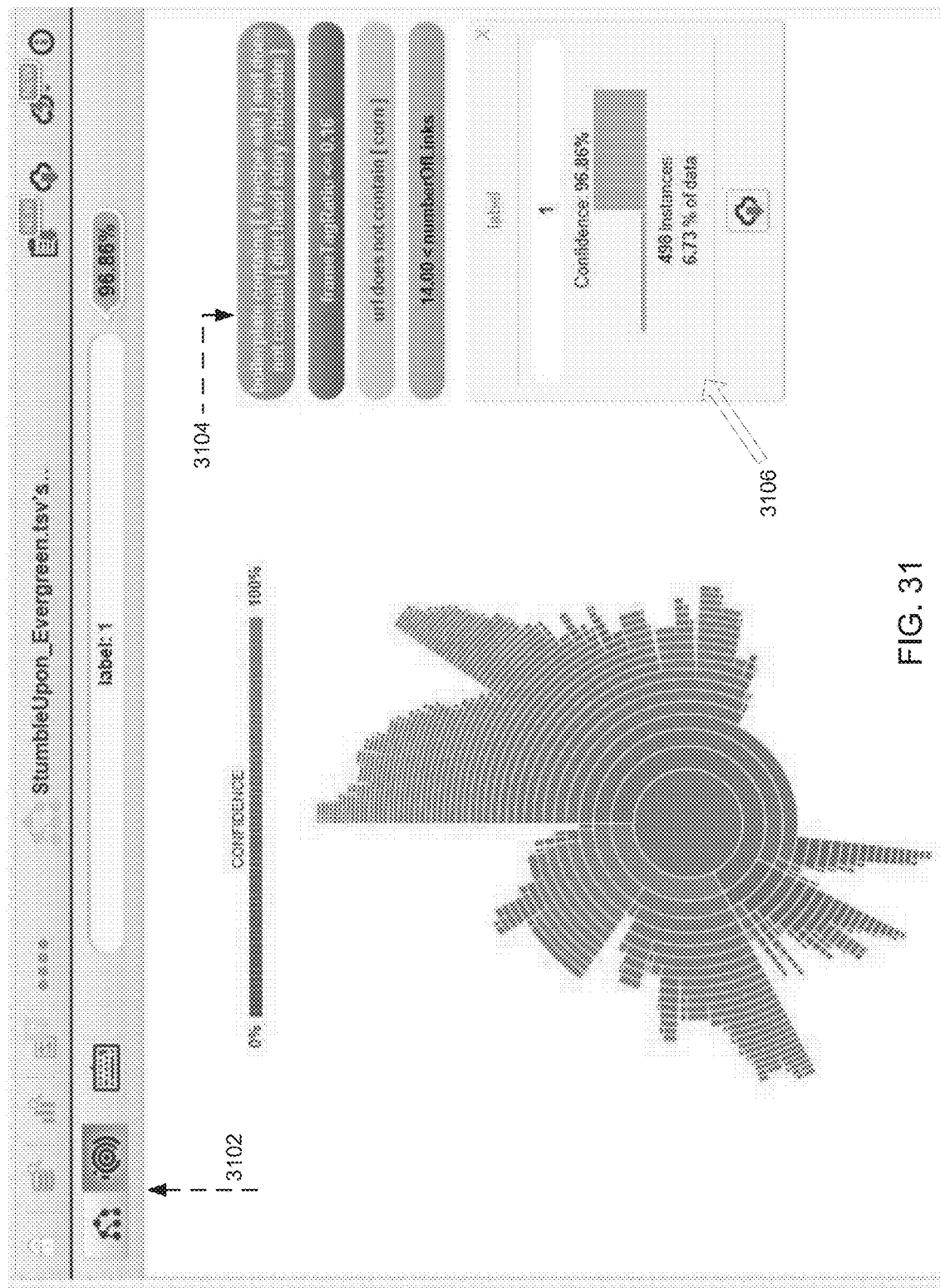
FIG. 31 is an embodiment of a confidence type of sunburst visualization display of a selected prediction path of a model of the dataset discussed with regard to FIG. 22.

FIG. 31 is an example of an embodiment of a sunburst display based on the web site dataset. This may be selected by a sunburst button or the like, for example, in the toolbar, as indicated in the drawing by a dashed arrow 3102. The sunburst display is discussed in detail above. On the right side, the legend 3104 has some features pertinent to text data types. First, the current display (prediction path) begins with multiple branches that are based on words that are, or are not, in the boilerplate field. In this example, that data may be compressed into one display element, viz: "boilerplate contains [4 recipe salt] and does not contain [diet head story chocolate]." is makes the display faster and easier to interpret.

Further, FIG. 31 illustrates another interaction, in which the user has selected the prediction element at the bottom of the legend 3104. The prediction process, responsive to this user input, may display a pop-up panel 3106 to provide additional information about the prediction result. In this example, the panel shows, for the field "label" that the conclusion is value 1, the confidence level is 96.86%, that 498 instances of the dataset meet the criteria of this prediction path (enumerated above in the legend), and that number represents 6.73% of the data.

PATENT DATASET EXAMPLE

Figure 27:
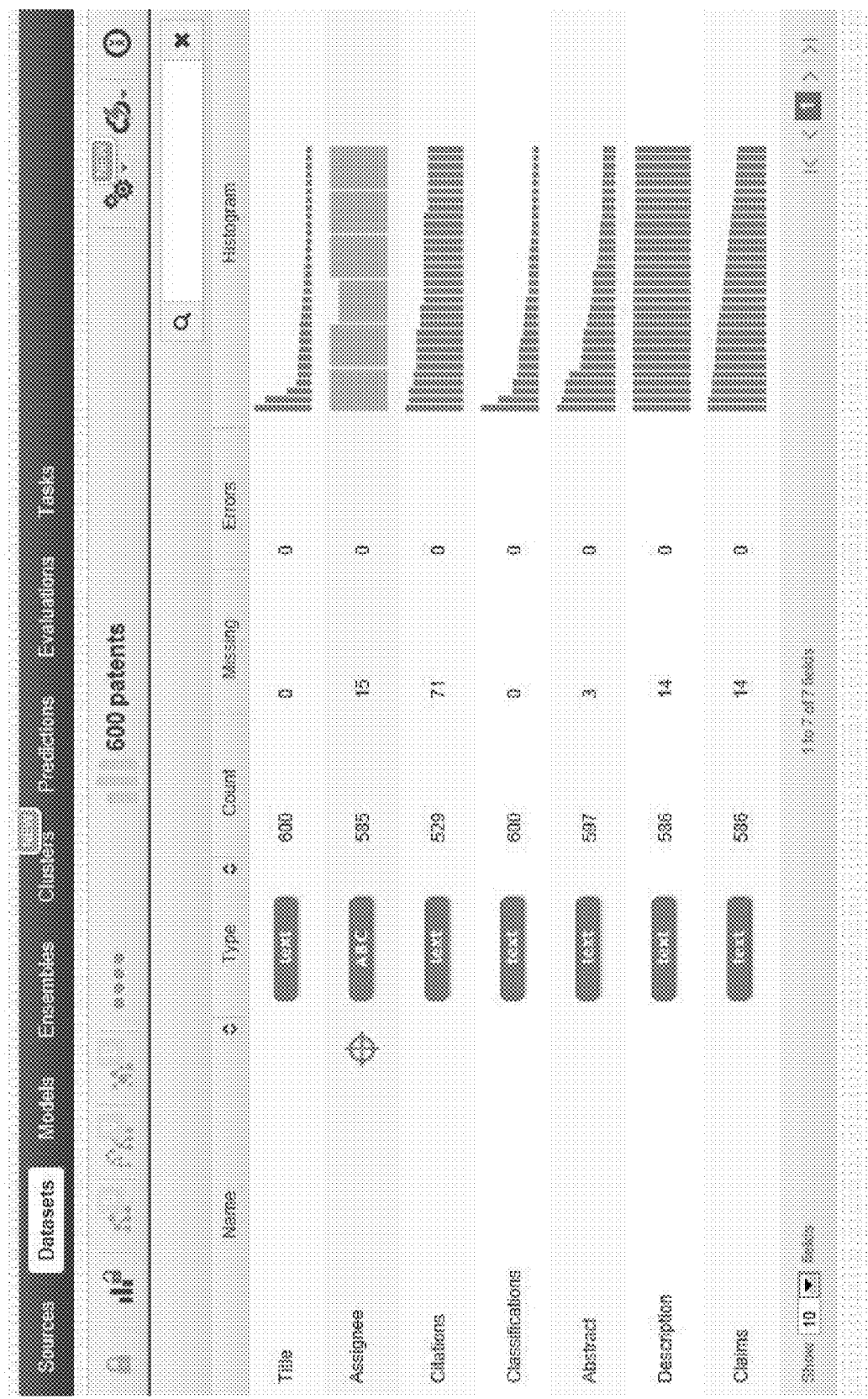
FIG. 27 is an embodiment of a graphical, interactive summary display of a patent dataset comprising textual data fields.

FIG. 27 is an embodiment of a graphical, interactive summary display of a patent dataset. This dataset comprises data, namely six selected text fields, and one objective field (Assignee), from 600 issued patents, downloaded from the United States Patent and Trademark Office. The text fields, as shown in the tabular display rows, are title, citations, classifications, abstract, description and claims. The objective field may indicate by an icon, for example, the sight or target shown. The dataset may be used to build a model to predict the assignee from the other fields of a patent. One can observe a few things from the display; for example, the citations data is absent from 71 of the data instances. We can see that the objective, Assignee, is a categorical type and in this example comprises six possible values, as indicated by the bars in the histogram.

This display preferably is provisioned to be interactive, for example, as described above with regard to the web site dataset. Thus, hovering over the histogram in the Assignee row would invoke, for each bar, the corresponding assignee name and the number of instances. They are shown in the following table.

| ASSIGNEE | INSTANCES |
| --- | --- |
| Apple Inc. | 100 |
| Facebook Inc. | 100 |
| Google Inc. | 85 |
| IBM | 100 |
| Microsoft | 100 |
| Yahoo! Inc. | 100 |

Again, in an actual computer implementation, this information would "pop up" responsive to user input, for example, hovering on the summary display of a patent dataset, of the type illustrated in static form in FIG. 27. One might note that Google has only 85 instances in the dataset; this is indicated in the display where 15 instances are listed as Missing in the assignee row. In other words, all 15 missing instances apparently are owned by Google.

Figure 28:
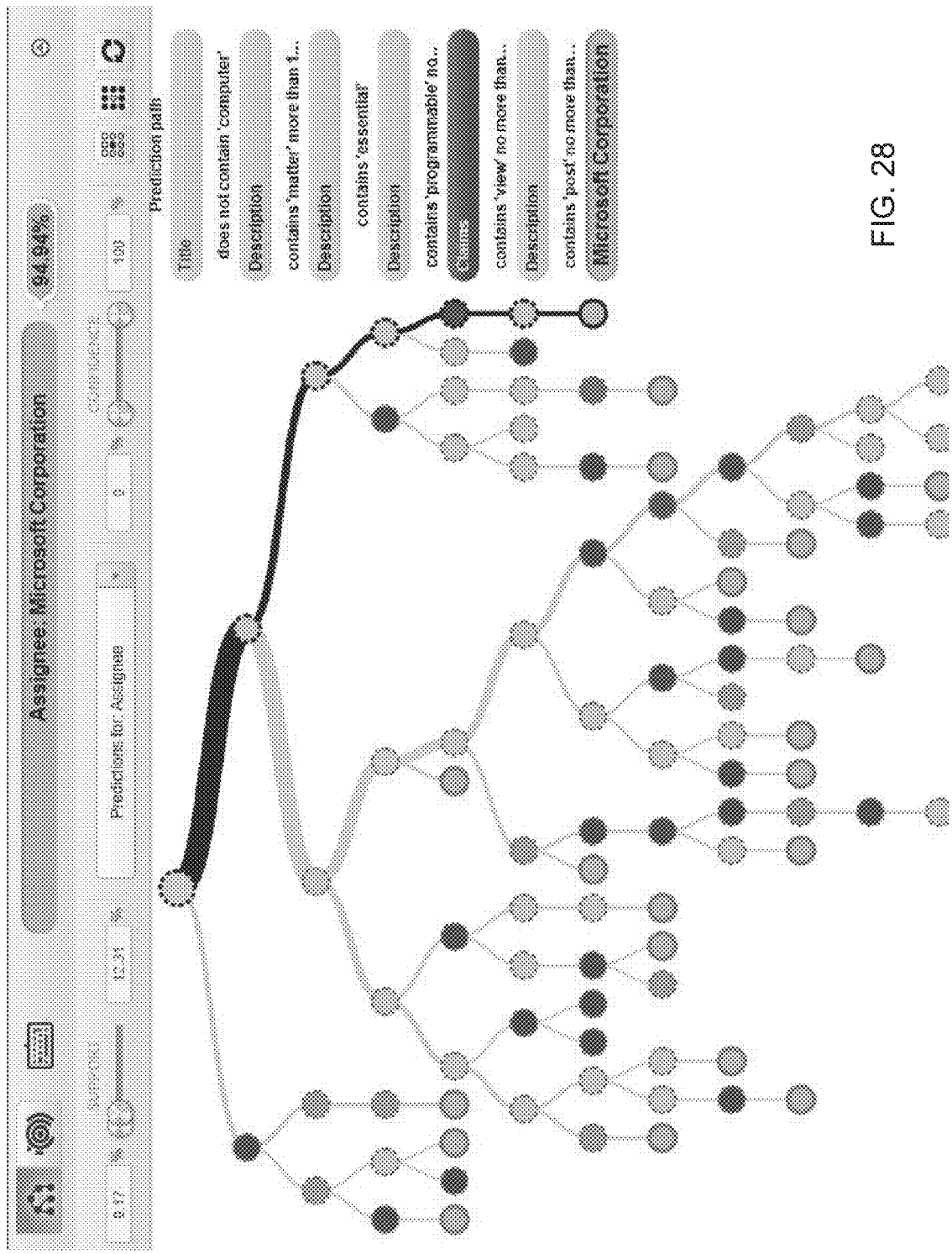
FIG. 28 shows an embodiment of a graphical, interactive decision tree based on the patent dataset of FIG. 27, showing predictions for patent assignee as the categorical objective field, with a selected prediction path highlighted by user input.

FIG. 28 shows an embodiment of a graphical, interactive decision tree based on the patent dataset of FIG. 27, showing a selected prediction path that concludes with a prediction of Microsoft as the Assignee, with 94.94% confidence. The visualization may have some or all of the dynamic, interactive features described above. In this example, all of the data fields (except the objective) are text fields.

Figure 29:
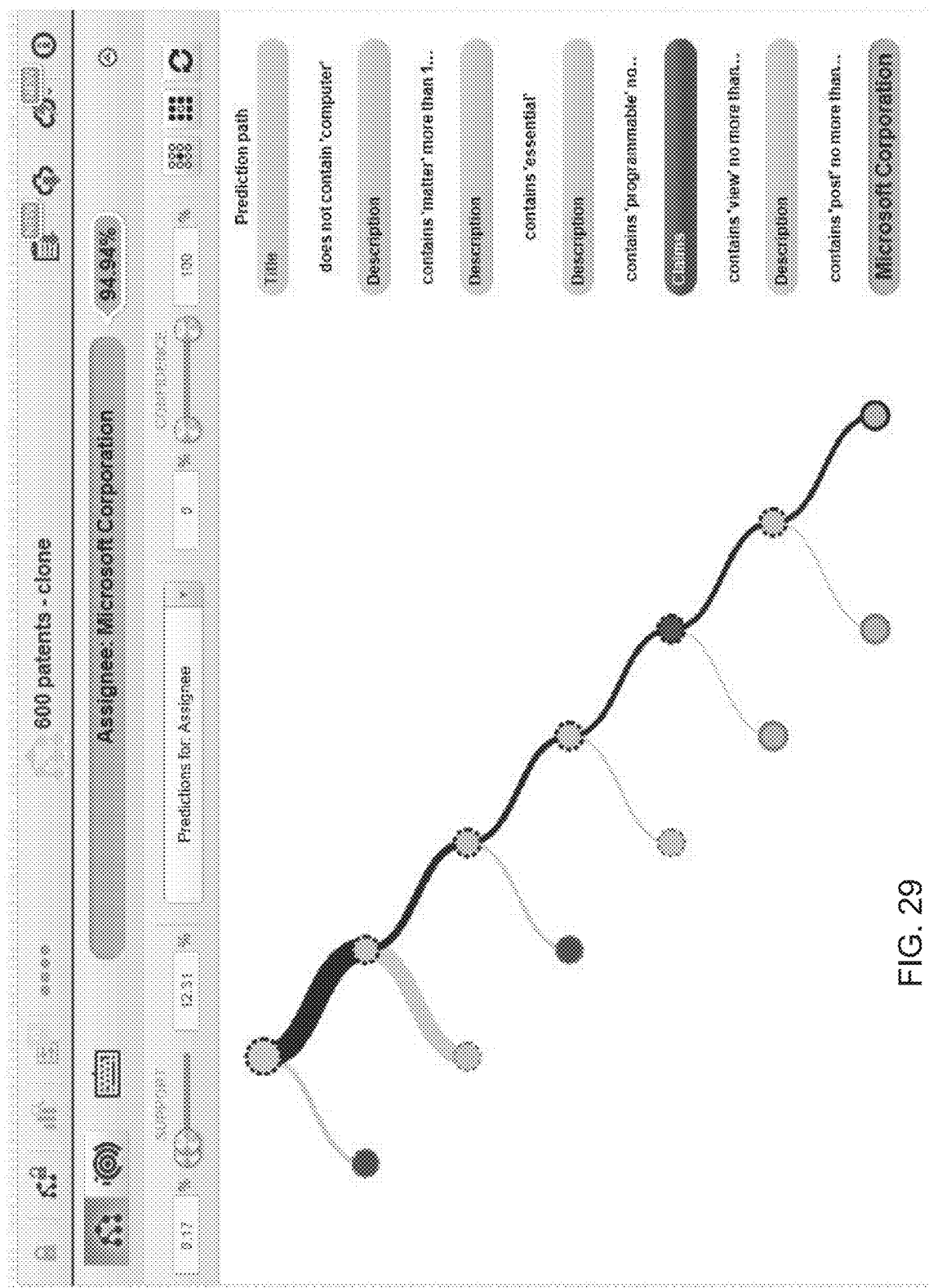
FIG. 29 illustrates one embodiment of a pruned and redrawn portion of the decision tree of FIG. 28, focused on the selected prediction path.

FIG. 29 illustrates one embodiment of a pruned and redrawn portion of the decision tree of FIG. 28, focused on the selected prediction path. The main features of this display, for example, resizing, etc. were described above with regard to the web site model example. The legend on the right shows the text values (words) that are included or excluded at each node or split point in the prediction path.

Figure 30:
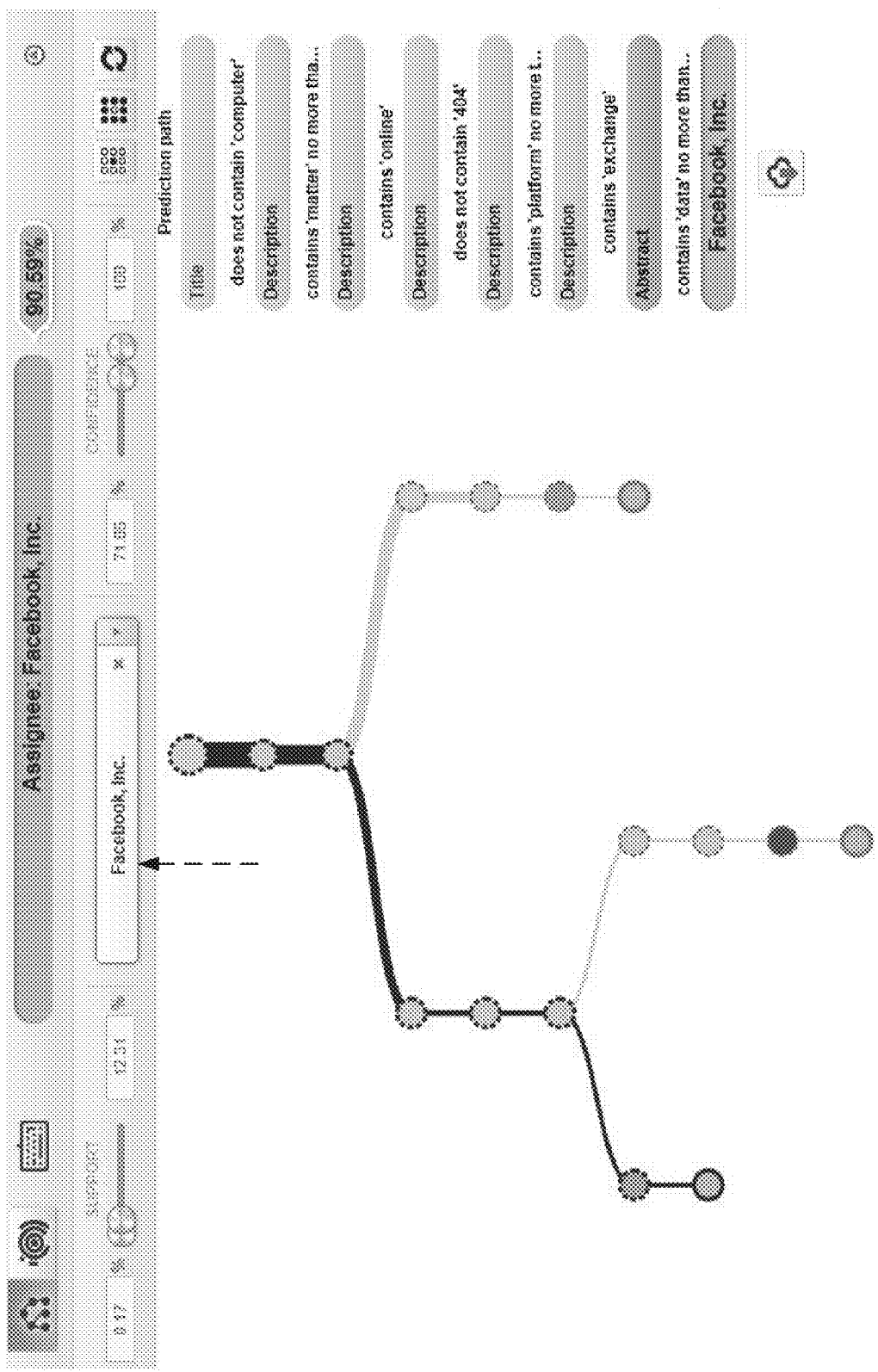
FIG. 30 is another embodiment of a graphical, interactive decision tree based on the patent dataset of FIG. 27, with Facebook selected by user input as the objective field (patent assignee) value.
Figure 32:
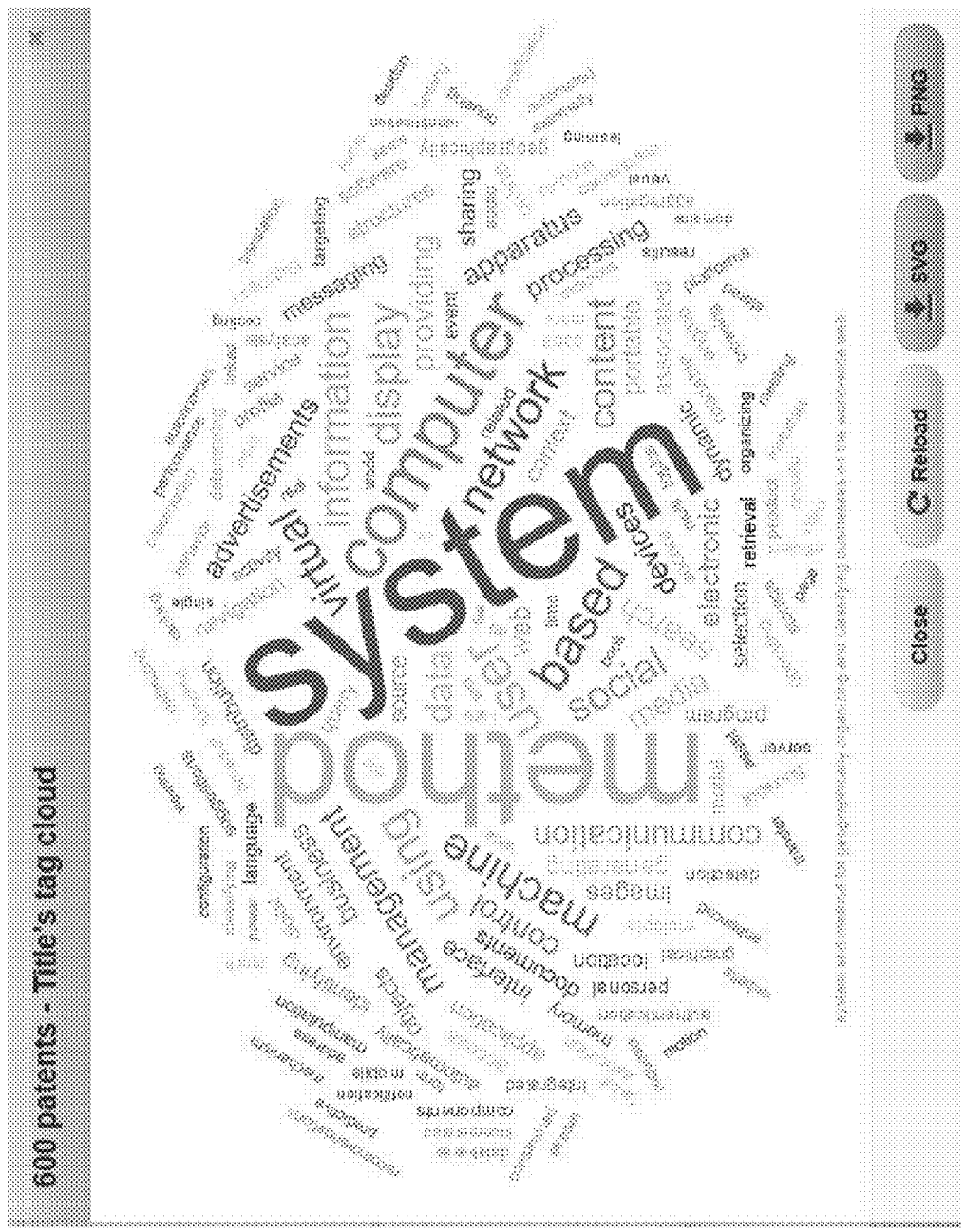
FIG. 32 is an embodiment of a tag cloud display of the title field of the patents dataset.

FIG. 30 is another embodiment of a graphical, interactive decision tree display based on the patent dataset of FIG. 27, with Facebook selected by user input as the objective field (patent assignee) value. In other words, the user selected the value Facebook, Inc. in the objective selection pull-down window in the controls region or toolbar near the top of the display, indicated in the drawing by a dashed arrow. This selection filtered the tree to show only those paths (three of them) that terminate with Facebook, Inc. as the predicted result. Further, the user has selected the left side path, as indicated by the darker color of the path in the drawing. The path thickness, as discussed above, is proportional to the number of instances in that branch. The legend on the right shows the fields and values for each split. Preferably, each node is displayed in a color that matches the corresponding element in the legend for easy reference, although, unfortunately color is not shown in black line art patent drawings. Above the toolbar, the display may show the current result ("Assignee: Facebook, Inc.") and the confidence of the prediction (90.59%). FIG. 32 is an embodiment of a tag cloud display of the title field of the patents dataset.

The foregoing drawing figures and descriptions are merely illustrative and are not intended to limit the numerous variations and combinations of interactive graphical visualizations within the scope of the present disclosure. It will be obvious to those having skill in the art that many changes may be made to the details of the above-described embodiments without departing from the underlying principles of the invention. The scope of the present invention should, therefore, be determined only by the following claims.

The invention claimed is:

1. A method comprising:
accessing a set of sample data instances, each instance comprising a corresponding value for at least some of a plurality of data fields and at least one of the data fields characterized as a text data type;
processing the sample data instances so as to form a dataset, the processing including analyzing the sample data instances to recognize a data type for each of the plurality of data fields, the recognition including selecting the data type from a predetermined set of data types that includes at least a numeric data type, a categorical data type, and a text data type;
generating a visual summary of the dataset on a computing device, the visual summary comprising a tabular presentation including a series of rows and columns of information, each row corresponding to one of the data fields of the sample data, and each column displaying a corresponding parameter in each of the rows, wherein the displayed column parameters include a data field name, a type of the data field named in the row, and a count of sample data instances in the data set that include a value in the named field;
in response to recognizing a text data type for one of the data fields of a sample data instance, matching the values of the text data field to a human language;
based on the matched human language, tokenizing a value of each text data field to form a corresponding token;
incorporating the corresponding token as a new value for the corresponding text data field in the dataset; and
displaying parameters of the text data field in a corresponding row of the visual summary;
wherein processing the sample data further includes
applying a selected tokenization process to form a set of tokens based on the values in the text data fields;
for a given row in the visual summary corresponding to a text data field in the sample data set, tokenizing all of the respective values of the text data field found in the sample data set to form a set of tokens for the given row;
counting a respective number of occurrences of each one of the tokens; and
storing the counted numbers of occurrences.

2. The method of claim 1 wherein:
at least one of the columns displays, in each row, an indication of a corresponding number of instances of the sample data that include the corresponding data field;
at least one of the columns displays, in each row, a corresponding number of instances of the sample data that are missing the corresponding data field; and
at least one of the columns displays, in each row, a corresponding number of instances of the sample data that have an error in the corresponding data field.

3. The method of claim 1:
wherein at least one of the columns displays, in each row, a corresponding histogram of the values of the corresponding data field in the instances of the sample data.

4. The method of claim 1 and further comprising:
generating a tag cloud for a selected text field, and displaying the tag cloud on an electronic display, wherein the tag cloud displays a plurality of the corresponding text field; and
wherein the tokens are displayed in the tag cloud in font sizes that are selected in proportion to the relative frequency of occurrence of each token in the selected text field.

5. The method of claim 4 and further comprising:
responsive to receiving an input selection of a word in the tag cloud display, further displaying a number of occurrences of the selected word in a popup overlying or adjacent to the tag cloud display.

6. A method comprising:
accessing a digital source data file comprising a plurality of records, each record comprising at least one data field;
processing the source data file on a computing device to recognize a data type for each of the data fields;
in response to recognizing a text data type for a particular data field, matching the text of the particular data field to a human language and applying a stemming process corresponding to the matched human language, thereby tokenizing the text to form a corresponding token;
forming a dataset based on the source data file, said forming step including substituting the corresponding token into the dataset in place of each of the tokenized text fields;
displaying an interactive summary of the dataset on a display screen of the computing device;
building a model based at least in part on the dataset;
receiving an indication of a type of visualization to be displayed;
generating a space-filling graphical representation of the model on a computing device, the space-filling graphical representation comprising a plurality of segments arranged to realize the indicated type of visualization; and
displaying the space-filling graphical representation of the model on a display screen of the computing device; and
further displaying a legend adjacent to the space-filling representation of the model.

7. The method of claim 6, further comprising:
providing a color scheme based at least in part on the indicated type of visualization; and
displaying the graphical representation of the model on the display screen using the color scheme.

8. The method of claim 6, wherein the interactive summary display comprises a tabular presentation, the presentation including a series of rows and columns of information, each row corresponding to a respective one of the data fields of the dataset;

and further including displaying a corresponding data type indicator in each row, the data type indicator selected from a set of indicators that includes a first indicator for a text data type and a second indicator, distinct from the first indicator, for a categorical data type.

9. The method of claim 8, wherein the tabular presentation includes:

a first column listing a name of the corresponding field in each row;

a second column listing the corresponding data type indicator in each row; and a third column listing, in each row, a corresponding number of instances of data that have content in the corresponding data field.

10. The method of claim 9, wherein the tabular presentation includes a fourth column in which a respective histogram is displayed in each row that corresponds to a text field, the histogram presenting in graphical form an indication of a relative number of instances of each token of the corresponding field.

11. The method of claim 10, wherein the histogram comprises a series of vertical bars, wherein each bar represents one of the tokens in the corresponding text field, and the relative height of each bar provides a graphic indication of a relative number of instances of the corresponding token.

12. The method of claim 11, wherein the presentation implements an interactive feature that, responsive to user selection of one of the bars of a histogram, automatically displays a pop-up panel that shows the corresponding token represented by the selected bar, and the number of occurrences of the corresponding token.

13. The method of claim 12, wherein the presentation includes, adjacent to a text field histogram, a pop-up user control for scrolling the histogram to present additional bars in the display.

14. The method of claim 9, and further comprising, for a selected row of the presentation that corresponds to a text data type field, generating and displaying a tag cloud representation of the corresponding text data.

15. A visualization method comprising:

accessing a data model based at least in part on a dataset comprising data items, wherein at least one of the data items includes a text data field;

in response to recognizing a text data type for one of the data fields of a sample data instance, matching the values of the text data field to a human language;

based on the matched human language, tokenizing a value of each text data field to form a corresponding token;

incorporating the corresponding token as a new value for the corresponding text data field in the dataset; and displaying parameters of the text data field in a corresponding row of a visual summary of the dataset;

generating a decision tree representation of the data model, wherein the decision tree comprises nodes and branches, wherein at least one of the nodes represents a split based on the content of a text field;

displaying at least a selected portion of the decision tree on an electronic display screen;

highlighting a selected prediction path in the displayed portion of the decision tree; and displaying a legend along with the displayed portion of the decision tree, the legend indicating each split criteria along the selected prediction path;

wherein, for each text field that appears in the legend, a pop-up panel is provisioned to display additional information, responsive to selection of a given text field in the legend, the additional information including a token used to determine the corresponding split in the prediction path.

16. The method of claim 15 wherein the additional information further includes a number of occurrences or count of the token in the dataset.

17. The method of claim 15 wherein the legend identifies the split criteria for each text field in the selected prediction path by displaying a specific token and whether or not the corresponding text field contains the specific token.

18. The method of claim 15 wherein the legend display includes one display element that compresses multiple selection criteria for a given text field into a single display element, the single display element listing, for the given text field, all of the tokens that the text field contains, and all of the tokens that the text field does not contain.

* * * * *